(12) United States Patent
Yoshida

(10) Patent No.: US 7,573,494 B2
(45) Date of Patent: Aug. 11, 2009

(54) IMAGE FORMING APPARATUS, AN OPTICAL SCANNING APPARATUS AND AN IMAGE FORMING METHOD

(75) Inventor: Yoshiki Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 763 days.

(21) Appl. No.: 10/785,117

(22) Filed: Feb. 25, 2004

(65) Prior Publication Data

US 2004/0246329 A1    Dec. 9, 2004

(30) Foreign Application Priority Data

Feb. 28, 2003    (JP)    ............................. 2003-054717

(51) Int. Cl.
 B41J 2/47    (2006.01)
 B41J 2/45    (2006.01)
 B41J 2/385    (2006.01)
(52) U.S. Cl. ..................... 347/235; 347/237; 347/238; 347/225; 347/132
(58) Field of Classification Search .................. 347/235, 347/237, 238, 132, 225
 See application file for complete search history.

(56) References Cited

U.S. PATENT DOCUMENTS

| | | | |
|---|---|---|---|
| 4,933,874 A | 6/1990 | Asada et al. | |
| 4,967,284 A | 10/1990 | Yoshida et al. | |
| 5,027,117 A | 6/1991 | Yoshida et al. | |
| 5,068,676 A | 11/1991 | Yoshida et al. | |
| 5,309,182 A | 5/1994 | Mama et al. | |
| 5,376,994 A | 12/1994 | Mama et al. | |
| 5,796,511 A * | 8/1998 | Allen et al. | 359/305 |
| 6,169,562 B1 * | 1/2001 | Morimoto | 347/232 |
| 2002/0051137 A1 * | 5/2002 | Ema et al. | 358/1.1 |
| 2003/0058479 A1 * | 3/2003 | Takaki | 358/409 |
| 2003/0067533 A1 * | 4/2003 | Omori et al. | 347/248 |
| 2003/0156184 A1 * | 8/2003 | Suzuki et al. | 347/249 |

FOREIGN PATENT DOCUMENTS

| | | |
|---|---|---|
| JP | 2000-121971 | 4/2000 |
| JP | 2000-166598 | 6/2000 |
| JP | 3315474 | 6/2002 |

OTHER PUBLICATIONS

U.S. Appl. No. 10/785,117, filed Feb. 25, 2004, Yoshida.
U.S. Appl. No. 10/882,222, filed Jul. 2, 2004, Yoshida.
U.S. Appl. No. 10/259,384, filed Sep. 30, 2002, Yoshida.
U.S. Appl. No. 10/413,203, filed Apr. 15, 2003, Yoshida.

* cited by examiner

*Primary Examiner*—Stephen D Meier
*Assistant Examiner*—Sarah Al-Hashimi
(74) *Attorney, Agent, or Firm*—Oblon, Spivak, McClelland, Maier & Neustadt, P.C.

(57) ABSTRACT

An image forming apparatus is capable of forming a clear image by using laser beams projected from a plurality of laser light sources. The image forming apparatus forms an electrostatic latent image on a medium to be scanned by laser beams, which are projected from a plurality of laser light sources and periodically deflected by a rotational deflecting unit, so that the laser beams scan the medium, which is uniformly charged and moving in a sub-scanning direction, in a main-scanning direction perpendicular to the sub-scanning direction. A pixel clock generating unit generates pixel clocks, which are used for controlling timings of projection of the laser beams, separately for each of the laser light sources, and for performing a phase change of each of the pixel clocks; and a phase control unit that controls independently each of the pixel clocks.

56 Claims, 38 Drawing Sheets

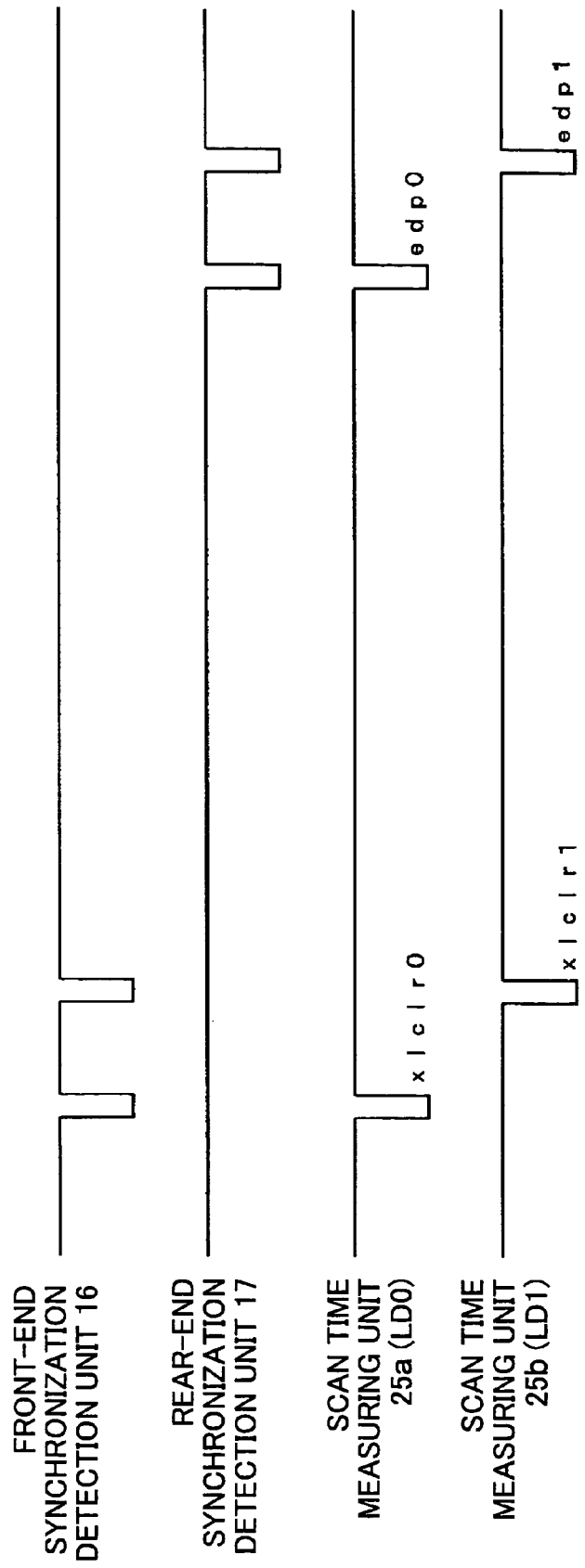

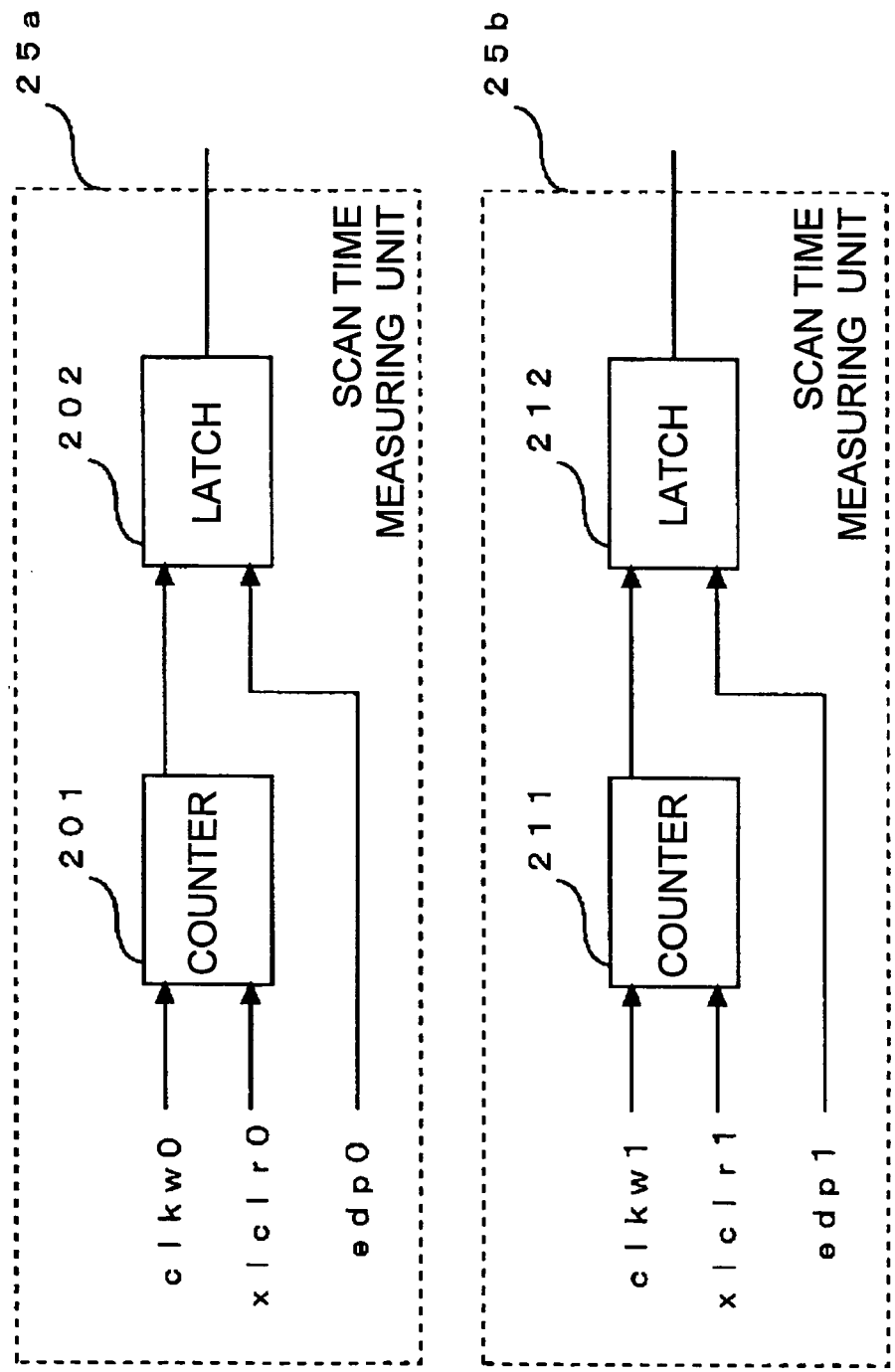

IMAGE FORMING APPARATUS, AN OPTICAL SCANNING APPARATUS AND AN IMAGE FORMING METHOD

BACKGROUND OF THE INVENTION

1. Field of the Invention

The present invention generally relates to image forming apparatuses and, more particularly, to an image forming apparatus using electrophotography such as a laser printer equipped with an optical scanner using a laser, a digital copy machine or a facsimile machine.

2. Description of the Related Art

Conventionally, there is a laser beam method as one of methods with which an image forming apparatus forms a visible image. According to the laser beam method used in an image forming apparatus, an optical scanning apparatus irradiates a laser beam onto a photoconductor (a medium to be scanned) so as to form an image.

A description will be given below, with reference to FIG. 1, of an image forming operation performed by an image forming apparatus using a conventional laser beam method. FIG. 1 is an illustration for explaining an image forming operation performed by an image forming apparatus using a conventional laser beam method.

In the image forming apparatus, an electric charger (not shown in the figure) such as a roller-type contact charger uniformly charges a photoconductor. A laser light source irradiates a laser beam onto a rotating polygon mirror (rotational polygon mirror). The polygon mirror deflects periodically the laser beam projected from the laser light source. The laser beam passes through a fθ lens and scans a surface of the photoconductor in a main scanning direction while the photoconductor is moving or rotating in a sub-scanning direction. Static electricity in portions of the surface of the photoconductor onto which the laser beam is irradiated is removed by the laser beam, thereby forming a pattern of static electricity (electrostatic latent image) on the surface of the photoconductor.

It should be noted that a controller (not shown in the figure) sends image data corresponding to each page to a laser drive circuit as an image signal (video signal) on an individual line (one scanning line) basis. Then, the laser drive circuit performs a modulating operation by outputting the image signal to the laser light beam in synchronization with a pixel clock (write clock). The pixel clock is supplied to the laser drive circuit from a pixel clock generating circuit (not shown in the figure) via a phase synchronization circuit (not shown in the figure). The pixel clock generating circuit and the phase synchronization signal constitute image clock generating means and phase setting means.

A description will now be given, with reference to FIG. 2, of a relationship between the pixel clock and the phase change (phase setting) of the pixel clock. FIG. 2 is a timing chart showing a relationship between a conventional pixel clock and a phase change thereof.

A pixel clock generating circuit generates and outputs a pixel clock clkw in synchronization with a synchronization detection signal supplied by a synchronous detection sensor. The pixel clock clkw is generated from a reference clock clko (an original clock generated by an oscillator (not shown in the figure)), which is n times (four times in FIG. 2) of the frequency of the pixel clock clkw, by toggling the reference clock clko to a high level (H) and a low level (L) at each 4 pulses of clko according to a counting control. In the above-mentioned optical scanning apparatus, when forming beam spots of the laser beam on the surface to be scanned so as to write an electrostatic latent image, the write density of the beam spots is adjusted to be uniform.

However, if an environmental fluctuation such as a temperature change, etc. arises in the atmosphere of the fθ lens, the fθ lens is distorted, which results in a change in an index of refraction. Additionally, if an environmental fluctuation such as a temperature change, etc. arises in the atmosphere of the laser light source, the wavelength of the laser beam emitted by the laser light source is changed. Therefore, the fθ lens is configured and arranged to refract the laser beam at a predetermined angle according to the wavelength of the laser beam incident thereon. For this reason, as shown in FIG. 1, an error occurs in the refractive angle of the laser beam incident on the fθ lens. Such an error in the refractive angle causes an error in a write magnification per one main scanning period of the laser beam by the polygon mirror, which may give an undesired influence to an output image. In order to eliminate such an undesired influence, a phase change to shift the phase of the pixel clock clkw is performed so as to correct the write magnification of the laser beam.

In the above-mentioned optical scanning apparatus, the pixel clock generating circuit performs a phase control using an external pulse train xpls so as to perform the phase change to shift the phase of the pixel clock clkw. There are two kinds of pulse train as the external pulse train xplsp, one is an external pulse train xplsp for advancing the phase of the pixel clock clkw and the other is an external pulse train xplsm for delaying the phase of the pixel clock clkw. For example, in a case in which the pixel clock clkw is generated from the reference clock clko, the pixel clock clkw, which is usually generated with 8 pulses of clko, is generated with 9 pulses of clko or 7 pulses of clko by increasing or decreasing the number of count of the pulses of the external pulse train xplsp or xplsm. By changing the number of counts by increasing or decreasing the number of counts, the frequency of the pixel clock clkw is made 8/7 times (an advance control) or 8/9 times (a delay control), which can shift the pixel clock clkw after the phase change. This provides an effect in view of one main scanning line that an entire magnification is increased or decreased as Tm−7/8 (advancing control) or Tm+9/8 (delay control), where Tm is a total time of main scanning of one line. Thus, the optical scanning apparatus can form an image on a desired position on the photoconductor without being influenced by the environment fluctuation.

Moreover, the pixel clock generating circuit is provided with a pulse generating circuit which generates the above-mentioned external pulse train xpls. The pulse generating circuit generates the external pulse train (hereinafter, may be simply referred to as pulses) xpls in response to positions at which the phase change is to be applied to the pulse train of the pixel clock clkw.

A description will now be given, with reference to FIG. 3, of an operation of generating the external pulse train by the pulse generating circuit. FIG. 3 is a block diagram of a conventional pulse generating circuit.

The pulse generating circuit shown in FIG. 3 comprises comparators 1001 and 1002 and counters 1003 and 1004.

In the pulse generating circuit, a pulse generation interval (period) is set to the comparator 1001 and a pulse number num is set to the comparator 1002 by an engine CPU (not shown in the figure) so as to perform the following operation when one scan of a laser beam is performed in the main scanning direction by the polygon mirror.

The counter 1003 starts a counting operation to count a number of pulses of the pixel clocks clkw (count value i) in accordance with an input of a clear signal xlclr generated from a synchronization detection signal by a circuit, which is not shown in the figure, at a time of input of the clear signal xlclr as a reference, and stops the counting operation when a stop signal is supplied by the comparator 1002. The comparator 1001 compares the count value i of the counter 1003 with the previously set pulse generation interval (hereinafter, may be referred to as a setting value) prd, and generates the pulse xpls each time the count value i reaches the setting value prd. The counter 1004 counts the number (count value j) of the pulses xpls generated by the comparator 1001. The comparator 1002 compares the count value j of the counter 1004 with the previously set pulse number (hereinafter, may be referred to as a setting value) num, and generates the stop signal when the count value j reaches the setting value num.

FIG. 4 is a flowchart of an operation of the pulse generating circuit shown in FIG. 3. A description will now be given, with reference 3 to FIGS. 3 and 4, of an operation of generating the external pulse train xpls performed by the conventional pulse generating circuit.

First, counters 1003 and 1004 reset count values i and j to "1", respectively, when a power supply to the pulse generating circuit is turned on (step S1001).

Thereafter, the counter 1003 waits for an input of a clear signal xlclr (No of step S1002), and after the clear signal xlclr is input (Yes of step S1002), the counter 1003 counts up (+1) the count value i each time a pulse of the pixel clock clkw is input.

A comparator 1001 performs the process of step S1003 until the count value i reaches the setting value prd (No of step S1004).

The comparator 1001 will generate the pulse xpls, when the count value i reaches the setting value prd (Yes of step S1004). The counter 1003 returns the count value i to "1" according to the input of the pulse xpls (step S1005).

Additionally, as a result of the comparison between the count value j of the counter 1004 and the setting value num by the comparator 1002 (step S1006), if the count value j has not reached the setting value num (No of step S1006), the counter 1004 counts up (+1) the count value j according to the input of the pulse xpls (step S1007).

Thereafter, the counters 1003 and 1004 and the comparator 1001 repeat the above-mentioned operation, and the comparator 1002 generates a stop signal when the count value j reaches the setting value num. Thus, the pulse generating circuit ends the operation (hereinafter, this operation is referred to as "pulse generating operation").

Here, Japanese Patent No. 3315474 discloses a conventional technique related with a phase control of the pixel clock in an image forming apparatus. In the image forming apparatus disclosed in this patent document, there are provided a plurality of detection sensors that detect a laser beam moving in a main-scanning direction, and a scanning time or a count number of the clock is measured from a time when the laser beam is detected by one of the detection sensors and until the laser beam is detected by another one of the detection sensors so as to correct a write clock frequency in accordance with the result of the measurement.

Additionally, there is a multi-beam method for forming an image on a photoconductor using more than two laser light sources among laser beam methods for forming an image by irradiating a laser beam onto a scan surface of a photoconductor.

The image forming apparatus using the multi-beam method increases a speed of forming a latent image by writing beam spots on more than two main-scanning lines simultaneously.

FIG. 5 is an illustration showing an image forming operation performed by a conventional image forming apparatus using the multi-beam method. FIG. 5 shows an example in which two laser beams are irradiated by two laser light sources LD0 and LD1. As shown in FIG. 5, the two laser light sources LD0 and LD1 irradiate laser beams onto a rotating polygon mirror. The polygon mirror deflects periodically the laser beams projected from the laser light sources LD0 and LD1. The deflected laser beams transmit through a fθ lens and repeatedly scan a surface of a photoconductor to be scanned that is rotating in a sub-scanning direction while uniformly charging the surface of the photoconductor. Portions irradiated by the laser beams on the photoconductor are electrically discharged, thereby forming an electrostatic latent image.

Japanese Laid-Open Patent Application No. 2000-166598 discloses a multi-beam light source apparatus and an optical scan apparatus using the above-mentioned multi-beam method. In this patent document, there are provided two light source parts each of which has two light source elements, and an offset of projecting axes of the two light source parts is corrected by adjusting a relative angle of light beams projected from the two light sources.

However, there are the following problems in the image forming apparatus using the multi-beam method in which a plurality of laser light sources shares a single optical system and a single image carrier.

As mentioned above, a fluctuation occurs in the refraction index of a group of lenses including the fθ lens and the wavelength of the laser beams projected from the laser light sources. Therefore, an error occurs in the write magnification of each of the laser beams projected from the plurality of laser light beams per one scanning period, and, thus, there is a problem in that positions of the images written by the laser light beams are shifted from each other. Consequently, a line extending in the sub-scanning direction appears as it wobbles and a noise is generated in an entire image, and, thus, there is a problem in that an unclear image is formed.

Additionally, the group of lenses including the fθ lens forming an optical system are made in consideration of refraction of a specific wavelength. Therefore, if a plurality of laser light sources share a single optical system and a single image carrier in the image forming apparatus using the multi-beam method, a plurality of laser beams that emit laser beams having the same wavelength must be selected and provided in the image forming apparatus.

However, it is difficult to prepare a certain number of laser light sources that emit laser beams having accurately the same wavelength, and, thus, there is a problem in that the formed image is unclear.

SUMMARY OF THE INVENTION

It is a general object of the present invention to provide an improved and useful image forming apparatus in which the above-mentioned problems are eliminated.

A more specific object of the present invention is to provide an image forming apparatus which is capable of forming a clear image by using laser beams projected from a plurality of laser light sources.

In order to achieve the above-mentioned objects, there is provided according to one aspect of the present invention an image forming apparatus that forms an electrostatic latent image on a medium to be scanned by laser beams, which are projected from a plurality of laser light sources and periodically deflected by a rotational deflecting unit, so that the laser beams scan the medium, which is uniformly charged and moving in a sub-scanning direction, in a main-scanning direction perpendicular to the sub-scanning direction, the image forming apparatus comprising: a pixel clock generating unit that generates pixel clocks, which are used for controlling timings of projection of the laser beams, separately for each of the laser light sources, and for performing a phase change of each of the pixel clocks; and a phase control unit that controls independently each of the pixel clocks.

In the above-mentioned image forming apparatus, the phase control unit may generate control pulse signals for controlling the phase change of the pixel clocks generated by the pixel clock generation means, respectively, and may output the control pulse signals to the pixel clock generation means, and the pixel clock generating unit may perform the phase change of the pixel clocks when the control pulse signals are supplied thereto.

The image forming apparatus according to the present invention may further comprise an operation unit that inputs setting values, which indicate an interval and a number of pulses of the control pulse signals for each of the laser light sources, wherein the phase control unit generates the control pulse signals of the pixel clocks, respectively, based on the setting values input by the operation unit, and outputs the control pulse signals to the pixel clock generating unit.

The image forming apparatus according to the present invention may further comprise: an operation unit that inputs setting values, which indicate an interval and a number of pulses of the control pulse signals for performing the phase change on one of the laser light sources; and a setting value computing units that computes setting values for other laser light sources other than the one of the laser light sources by adding values, which is previously specified for each of the other laser light sources, to the setting values for the one of the laser light sources input by the operation unit, wherein the phase control unit generates and outputs the control pulse signals corresponding to the respective laser light sources based on the setting values input by the operation means and the setting values computed by the setting value computing unit.

The image forming apparatus according to the present invention may further comprise a synchronization detection unit that detects the laser beams from the laser light sources at a position outside an image formation area where the electrostatic latent image is formed on the medium to be scanned in the main-scanning direction and for outputting a synchronization detection signals, which specify scan start positions of the laser beams in the main-scanning direction, respectively, wherein the pixel clock generating unit generates the pixel clocks in synchronization with the synchronization detection signals.

The image forming apparatus according to the present invention may further comprise: a synchronization detection unit that detects the laser beams from the laser light sources at positions outside an image formation area where the electrostatic latent image is formed on the medium to be scanned in the main-scanning direction, the synchronization detection unit including a first synchronization detection unit and a second synchronization detection unit located opposite to the first synchronization detection unit with respect to the image formation area; a scan time measuring unit that measures a scan time after the first synchronization detection unit detects the laser beam until the second synchronization detection unit detects the laser beam on an individual laser light source basis; and a scan time comparison unit that compares the scan time of each of the laser light sources measured by the scan time measuring unit with a value indicating a reference of the scan time so as to compute setting values based on a result of the comparison, the setting values indicating an interval and a number of pulses of each of the control pulse signals, wherein the phase control unit generates and outputs the control pulse signals corresponding to the respective laser light sources base on the setting values computed by the scan time comparison unit.

In the above-mentioned image forming apparatus, the scan time comparison unit may compute a number of pulses to be increased or decreased with respect to each of the control pulse signals by multiplying a value, which is obtained by subtracting the reference of the scan time from the measured scan time, by a period of a respective one of the pixel clocks and dividing the multiplied value by a time unit of the phase change.

Additionally, in the above-mentioned image forming apparatus, the synchronization detection unit may detect the laser beams from the laser light sources, respectively, at a position outside an image formation area where the electrostatic latent image is formed on the medium to be scanned in the main-scanning direction so as to output synchronization detection signals, which specify scan start positions of the respective laser beams in the main-scanning direction, and the pixel clock generating unit generates the pixel clocks in synchronization with the synchronization detection signals.

The image forming apparatus according to the present invention may further comprise: a synchronization detection unit that detects the laser beams from the laser light sources at positions outside an image formation area where the electrostatic latent image is formed on the medium to be scanned in the main-scanning direction, the synchronization detection unit including a first synchronization detection unit and a second synchronization detection unit located opposite to the first synchronization detection unit with respect to the image formation area; a scan time measuring unit that measures a scan time after the first synchronization detection unit detects the laser beam until the second synchronization detection unit detects the laser beam on an individual laser light source basis; and a scan time comparison unit that compares the scan time of each of the laser light sources measured by the scan time measuring unit with a value indicating a reference of the scan time so as to compute setting values for the one of the laser light sources based on a result of the comparison, the setting values indicating an interval and a number of pulses of the control pulse signal of the one of the laser light sources; and a setting value computing unit that computes each of the setting values of the other laser light sources by adding setting values, which is previously specified for each of the other laser light sources, to the setting values for the one of the laser light sources, wherein the phase control unit outputs the control pulse signals corresponding to the other laser light sources base on the setting values computed by the setting value computing unit.

In the above-mentioned image forming apparatus, the scan time comparison unit may compute a number of pulses to be increased or decreased with respect to each of the control pulse signals by multiplying a value, which is obtained by subtracting the reference of the scan time from the measured scan time, by a period of a respective one of the pixel clocks and dividing the multiplied value by a time unit of the phase change.

In the above-mentioned image forming apparatus, the synchronization detection unit may detect the laser beams from the laser light sources, respectively, at a position outside an image formation area where the electrostatic latent image is formed on the medium to be scanned in the main-scanning direction so as to output synchronization detection signals, which specify scan start positions of the respective laser beams in the main-scanning direction, and the pixel clock generating unit may generate the pixel clocks in synchronization with the synchronization detection signals.

In the image forming apparatus according to the present invention, the phase control unit may control a phase of each of the pixel clocks so that the phase is changed by a time unit shorter than a period of each of the pixel clocks.

In the image forming apparatus according to the present invention, the phase control unit may vary an output timing of the control pulse signals for each scan period.

In the above-mentioned image forming apparatus, the phase control unit may vary the output timing of the control pulse signals by a fixed unit time each time when one scan period has passed.

In the above-mentioned image forming apparatus, the phase control unit may vary the output timing of the control pulse signals based on the unit time that is obtained as a product of a value, which is obtained by subtracting a product of the interval of pulses and the number of pulses of each of the control signal pulses from the scan period, and a product of a fractional number having a numerator of a positive integer and a denominator of a positive integer, and wherein the output timing of the control pulse signals after change matches the output timing before change for the number of the denominator.

The image forming apparatus according to the present invention, the phase control unit may vary a phase of each of the pixel clocks for each divided period obtained by dividing one scan period of each of the laser light sources.

Additionally, there is provided according to another aspect of the present invention an image forming apparatus that forms an electrostatic latent image on a medium to be scanned by laser beams, which are projected from a plurality of laser light sources and periodically deflected by a rotational deflecting unit, so that the laser beams scan the medium, which is uniformly charged and moving in a sub-scanning direction, in a main-scanning direction perpendicular to the sub-scanning direction, the image forming apparatus comprising: a pixel clock generating unit that generates pixel clocks for performing independently a modulation control of each of the laser light sources, and changes independently a phase of each of the pixel clocks of the laser light sources based on control pulse signals supplied thereto.

The above-mentioned image forming apparatus may further comprise a synchronization detection unit that detects the laser beams from the laser light sources at a position outside an image formation area where the electrostatic latent image is formed on the medium to be scanned in the main-scanning direction and for outputting a synchronization detection signals, which specify scan start positions of the laser beams in the main-scanning direction, respectively, wherein the pixel clock generating unit may generate the pixel clocks in synchronization with the synchronization detection signals.

In the above-mentioned optical scanning apparatus, the synchronization detection unit may detect the laser beams at two positions outside the image formation area in the main-scanning direction, and may output the synchronization detection signals for measuring a scan time spent on scanning between the two positions.

In the above-mentioned image forming apparatus, the pixel clock generating unit may control a phase of each of the pixel clocks so that the phase is changed by a time unit shorter than a period of each of the pixel clocks.

In the above-mentioned image forming apparatus, the pixel clock generating unit may vary an output timing of the control pulse signals for each scan period.

In the above-mentioned image forming apparatus, the pixel clock generating unit may vary the output timing of the control pulse signals by a fixed unit time each time when one scan period has passed.

In the above-mentioned image forming apparatus, the pixel clock generating unit may vary the output timing of the control pulse signals based on the unit time that is obtained as a product of a value, which is obtained by subtracting a product of the interval of pulses and the number of pulses of each of the control signal pulses from the scan period, and a product of a fractional number having a numerator of a positive integer and a denominator of a positive integer, and wherein the output timing of the control pulse signals after change matches the output timing before change for the number of the denominator.

Additionally, there is provided according to another aspect of the present invention an image forming method that forms an electrostatic latent image on a medium to be scanned by laser beams, which are projected from a plurality of laser light sources and periodically deflected in a rotational deflecting process, so that the laser beams scan the medium, which is uniformly charged and moving in a sub-scanning direction, in a main-scanning direction perpendicular to the sub-scanning direction, the image forming apparatus comprising: a pixel clock generation step of generating pixel clocks, which are used for controlling timings of projection of the laser beams, separately for each of the laser light sources; a phase control step of controlling independently a phase control of each of the pixel clocks; and a phase change step of performing the phase change of each of the pixel clocks in accordance with the phase control step.

In the above-mentioned image forming method, the phase control step may generate control pulse signals for controlling the phase change of the pixel clocks generated in the pixel clock generation step, respectively, and outputs the control pulse signals to the pixel clock generation step, and the pixel clock generation step may perform the phase change of the pixel clocks when the control pulse signals are supplied thereto.

The image forming method according to the present invention may further comprise an input step of inputting setting values, which indicate an interval and a number of pulses of the control pulse signals for each of the laser light sources, wherein the phase control step generates the control pulse signals of the pixel clocks, respectively, based on the setting values input in the input step, and outputs the control pulse signals to the pixel clock generation step.

The above-mentioned image forming method may further comprise a synchronization detection step of detecting the laser beams from the laser light sources at a position outside an image formation area where the electrostatic latent image is formed on the medium to be scanned in the main-scanning direction and outputting a synchronization detection signals, which specify scan start positions of the laser beams in the main-scanning direction, respectively, wherein the pixel clock generation step may generate the pixel clocks in synchronization with the synchronization detection signals.

The image forming method according to the present invention may further comprise: an input step of inputting setting values, which indicate an interval and a number of pulses of the control pulse signals for performing the phase change on one of the laser light sources; and a setting value computation step of computing setting values for other laser light sources other than the one of the laser light sources by adding values, which is previously specified for each of the other laser light sources, to the setting values for the one of the laser light sources input in the input step, wherein the phase control step generates and outputs the control pulse signals corresponding to the respective laser light sources based on the setting values input in the input step and the setting values computed in the setting value computation step.

The above-mentioned image forming method further comprise a synchronization detection step of detecting the laser beams from the laser light sources at a position outside an image formation area where the electrostatic latent image is formed on the medium to be scanned in the main-scanning direction and outputting a synchronization detection signals, which specify scan start positions of the laser beams in the main-scanning direction, respectively, wherein the pixel clock generation step may generate the pixel clocks in synchronization with the synchronization detection signals.

The image forming method according to the present invention may further comprise: a first synchronization detection step of detecting the laser beams from the laser light sources at a first position outside an image formation area where the electrostatic latent image is formed on the medium to be scanned in the main-scanning direction; a second synchronization detection step of detecting the laser beams from the laser light sources at a second position outside the image formation area; a scan time measuring step of measuring a scan time after the laser beam is detected in the first synchronization detection step and until the laser beam is detected in the second synchronization detection step on an individual laser light source basis; and a scan time comparison step of comparing the scan time of each of the laser light sources measured by the scan time measuring means with a value indicating a reference of the scan time so as to compute setting values based on a result of the comparison, the setting values indicating an interval and a number of pulses of each of the control pulse signals, wherein the phase control step generates and outputs the control pulse signals corresponding to the respective laser light sources base on the setting values computed in the scan time comparison step.

In the above-mentioned image forming method, the scan time comparison step may compute a number of pulses to be increased or decreased with respect to each of the control pulse signals by multiplying a value, which is obtained by subtracting the reference of the scan time from the measured scan time, by a period of a respective one of the pixel clocks and dividing the multiplied value by a time unit of the phase change.

In the above-mentioned image forming method, the first synchronization detection means may detect the laser beams from the laser light sources, respectively, at the first position so as to output synchronization detection signals, which specify scan start positions of the respective laser beams in the main-scanning direction, and the pixel clock generation step generates the pixel clocks in synchronization with the synchronization detection signals.

The image forming method according to the present invention may further comprise: a first synchronization detection step of detecting the laser beams from the laser light sources at a first position outside an image formation area where the electrostatic latent image is formed on the medium to be scanned in the main-scanning direction; a second synchronization detection step of detecting the laser beams from the laser light sources at a second position outside the image formation area; a scan time measuring step of measuring a scan time after the laser beam is detected in the first synchronization detection step and until the laser beam is detected in the second synchronization detection step on an individual laser light source basis; a scan time comparison step of comparing the scan time of each of the laser light sources measured in the scan time measuring step with a value indicating a reference of the scan time so as to compute setting values for the one of the laser light sources based on a result of the comparison, the setting values indicating an interval and a number of pulses of the control pulse signal of the one of the laser light sources; and a setting value computation step of computing each of the setting values of the other laser light sources by adding setting values, which is previously specified for each of the other laser light sources, to the setting values for the one of the laser light sources, wherein the phase control step outputs the control pulse signals corresponding to the other laser light sources base on the setting values computed in the setting value computation step.

In the above-mentioned image forming method, the scan time comparison step may compute a number of pulses to be increased or decreased with respect to each of the control pulse signals by multiplying a value, which is obtained by subtracting the reference of the scan time from the measured scan time, by a period of a respective one of the pixel clocks and dividing the multiplied value by a time unit of the phase change.

In the above-mentioned image forming method, the scan time comparison step may compute a number of pulses to be increased or decreased with respect to each of the control pulse signals by multiplying a value, which is obtained by subtracting the reference of the scan time from the measured scan time, by a period of a respective one of the pixel clocks and dividing the multiplied value by a time unit of the phase change.

In the image forming method according to the present invention, the phase control step may control a phase of each of the pixel clocks so that the phase is changed by a time unit shorter than a period of each of the pixel clocks.

In the image forming method according to the present invention, the phase control step may vary an output timing of the control pulse signals for each scan period.

In the above-mentioned image forming method, the phase control step may vary the output timing of the control pulse signals by a fixed unit time each time when one scan period has passed.

In the above-mentioned image forming method, the phase control step may vary the output timing of the control pulse signals based on the unit time that is obtained as a product of a value, which is obtained by subtracting a product of the interval of pulses and the number of pulses of each of the control signal pulses from the scan period, and a product of a fractional number having a numerator of a positive integer and a denominator of a positive integer, and wherein the output timing of the control pulse signals after change matches the output timing before change for the number of the denominator.

In the image forming method according to the present invention, the phase change step may vary a phase of each of the pixel clocks for each divided period obtained by dividing one scan period of each of the laser light sources.

Other objects, features and advantages of the present invention will become more apparent from the following detailed description when read in conjunction with the accompanying drawings.

BRIEF DESCRIPTION OF THE DRAWINGS

FIG. 14 is a time chart showing signals output from a front-end synchronization detection unit and a rear-end synchronization detection unit according to the second embodiment of the present invention;

FIG. 16 is a block diagram of scan time measuring units according to the second embodiment of the present invention;

DETAILED DESCRIPTION OF THE PREFERRED EMBODIMENTS

First Embodiment

A description will now be given of an image forming apparatus according to a first embodiment of the present invention. The image forming apparatus according to the present embodiment forms an electrostatic latent image on a surface of a medium that is uniformly charged and moving in a sub-scanning direction by scanning laser beams projected from a plurality of laser light sources in a main-scanning direction, which is perpendicular to the sub-scanning direction. The image forming apparatus independently generates pixel clocks, which is used for timing control of emission of each of the laser light sources, for each of the laser fight beams, and performs a phase change control of each pixel clock independently.

Figure 6:
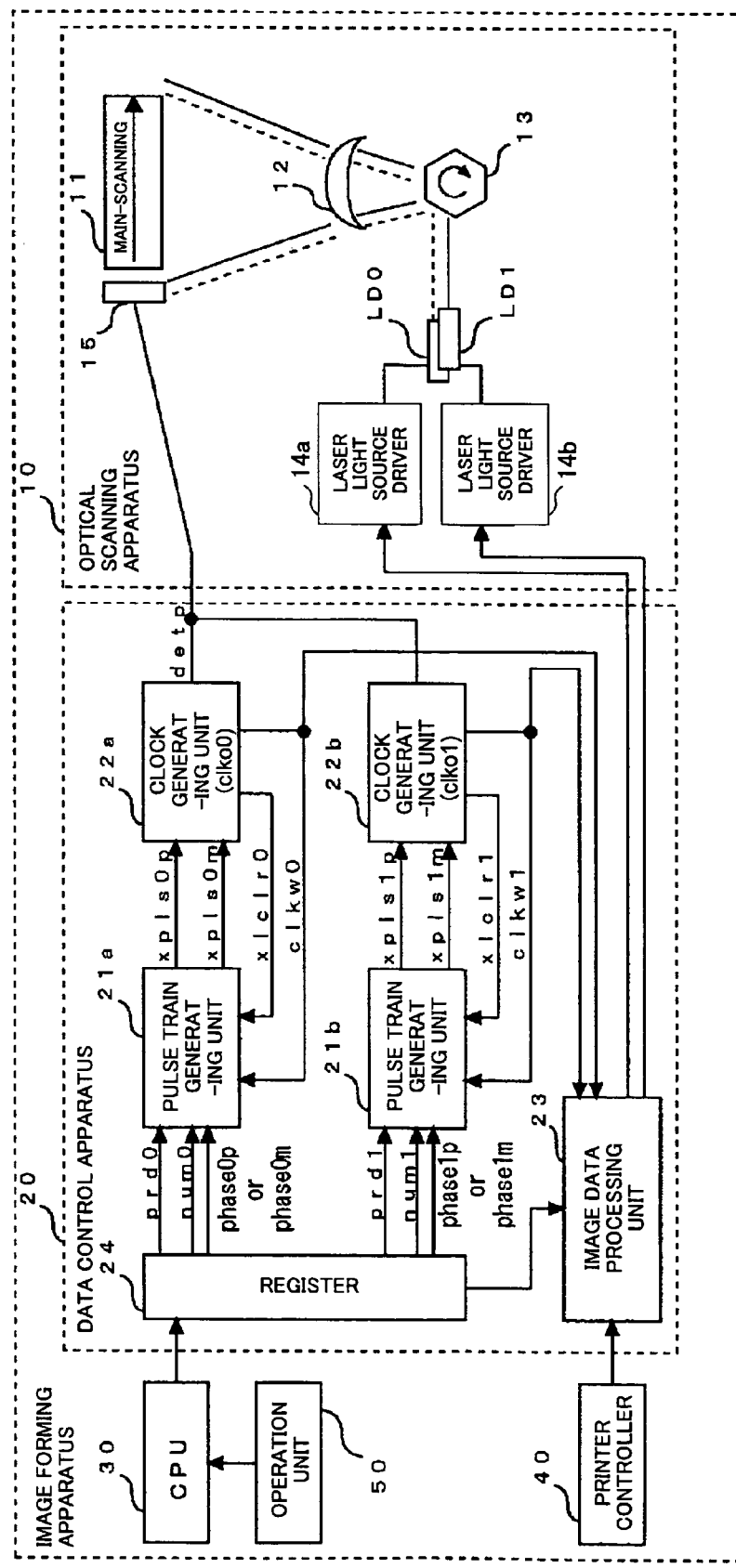
FIG. 6 is a block diagram of an image forming apparatus according to a first embodiment of the present invention.

A description will be given below, with reference to FIG. 6, of a structure of the image forming apparatus according to the present invention. FIG. 6 is a block diagram of the image forming apparatus according to the first embodiment of the present invention.

As shown in FIG. 6, the image forming apparatus comprises an optical scanning apparatus 10, a data control apparatus 20, a central processing unit (CPU) 30, a printer controller 40, and an operation unit 50 as an input means. It should be noted that the structure of the image forming apparatus shown in FIG. 6 is simplified for the sake of easy understanding, and may comprises structural elements other than that shown in FIG. 6.

The optical scanning apparatus 10 is a unit that forms an image using laser beams. The optical scanning apparatus 10 comprises a photoconductor 11 serving as a medium to be scanned, an fθ lens 12, a polygon mirror 13, laser light source drivers 14a and 14b, synchronization detection driver 15 and laser light sources LD0 and LD1.

Each of the laser light sources LD0 and LD1 is an element that emits a laser beam, and can be a light-emitting element such as a laser diode.

The photoconductor 11 is formed of a material (a layer of an optical semiconductor) having an electric characteristic that is changeable by irradiation of a light onto a surface thereof. For example, the photoconductor can be a photoconductor drum 11 that rotates in a sub-scanning direction.

The fθ lens 12 is provided for forming an image on a surface of the photoconductor 11 by focusing the laser beams reflected by the polygon mirror 13. The fθ lens 12 deflects the laser beams having a specific wavelength at a predetermined refraction angle.

The polygon mirror 13 is a mirror having a polyhedral shape that is rotatable at a constant speed by a motor (not shown in the figure). The polygon mirror 13 changes the reflection angle of the laser beams projected from the laser light sources LD0 and LD1 in accordance with a rotation thereof so that scan the laser beams on the surface of the photoconductor 11 to be scanned in the main-scanning direction.

Laser light source drivers 14a and 14b drive the laser light sources LD0 and LD1, respectively, and operate according to image signals from the data control apparatus 20. More specifically, after the laser beams are detected by the synchronization detection unit 15 and a predetermined time has passed after a synchronization detection signal detp is supplied from the synchronization detection unit 15 to the data control apparatus 20, the laser light source drivers 14a and 14b start a modulation (ON/OFF) control of the laser light sources LD0 and LD1 in accordance with the image signals from the data control apparatus 20 so as to emit the laser beams, respectively. Thus, if there is a variation in an angle between adjacent reflection surfaces of the polygon mirror 13, a write start position can always be at the same position of the surface to be scanned and a write end position can always be at the same position.

The synchronization detection unit 15 is provided outside an image area of the surface of the photoconductor 11 to be scanned along a path of the laser beams in the main-scanning direction (for example, immediately before or after the scanning start position) so as to detect the laser beams passed through the fθ lens 12 and irradiated thereon. Upon detection of the laser beams, the synchronization detection unit 15 generates the synchronization detection signal detp, which defines the write start position of the laser beams in the main-scanning direction for always set the write start position at the same point on the surface to be scanned, and outputs the signal detp to the data control apparatus 20.

The data control apparatus 20 outputs image signals for controlling the laser light source drivers 14a and 14b so as to control the laser beam write operation by the optical scanning apparatus 10. The data control apparatus 20 comprises pulse train generating units 21a and 21b serving as phase control means, clock generating units 22a and 22b serving as pixel clock generating means, an image data processing unit 23, and a register 24.

The clock generating unit 22a generates a pixel clock clkw0 in synchronization with the synchronization signal detection signal detp supplied by the synchronization detection unit 15, and outputs the pixel clock clkw0 to the pulse generating unit 21a and the image date processing unit 23. The clock generating unit 22a generates the pixel clock clkw0 by toggling a high level (H) and a low level (L) of a reference clock (original clock) clko0, which is generated by an oscillator (not shown in the figure) provided in the clock generating unit 22a and has a frequency M times the frequency of the pixel clock clkw0. Thus, it is possible to arrange the scan start position of each scanning line on the photoconductor 11 at the same position. Additionally, upon detection of the synchronization detection signal detp input from the synchronization detection section 15, the clock generating unit 22a outputs a clear signal xlclr0 to the pulse train generating unit 21a.

The clock generating unit 22b generates a pixel clock clkw0 in synchronization with the synchronization signal detection signal detp supplied by the synchronization detection unit 15, and outputs the pixel clock clkw1 to the pulse train generating unit 21b and the image date processing unit 23. The clock generating unit 22b generates a pixel clock clkw1 by toggling a high level (H) and a low level (L) of a reference clock (original clock) clko1, which is generated by an oscillator (not shown in the figure) provided in the clock generating unit 22b and has a frequency N times the frequency of the pixel clock clkw1. Thus, it is possible to arrange the scan start position of each scanning line on the photoconductor 11 at the same position. Additionally, upon detection of the synchronization detection signal detp input from the synchronization detection section 15, the clock generating unit 22b outputs a clear signal xlclr1 to the pulse train generating unit 21b.

The pulse train generating unit 21a generates an external pulse train (hereinafter may be simply referred to as "pulse") xpls0, which is a control signal (control pulse signal) for applying a phase change at a desired timing with respect to the pixel clock clkw0 generated by the clock generating unit 22a, and outputs the pulse xpls0 to the clock generating unit 22a.

More specifically, the pulse train generating unit 21a starts a counting operation of the pixel clock clkw0 upon an input of the clear signal xlclr0, and outputs the external pulse train xpls0 to the clock generating unit 22a when a count value thereof reaches a predetermined setting value prd0 (prd0 indicates an interval of generation of the external pulse train xpls0). Thus, the pulse train generating unit 21a is capable of changing a phase of the pixel clock clkw0 at the timing of outputting the external pulse train xpls0. The pulse train generating unit 21a stops the generation of the external pulse train xpls0 when a number of the output external pulse train xpls0 reaches the a predetermined setting value num0 (num0 indicates the number of pulses of the external pulse train xpls0 and is represented by a positive integer).

The pulse train generating unit 21b generates an external pulse train (hereinafter may be simply referred to as "pulse") xpls1, which is a control signal (control pulse signal) for applying a phase change at a desired timing with respect to the pixel clock clkw1 generated by the clock generating unit 22b, and outputs the pulse xpls1 to the clock generating unit 22b.

More specifically, the pulse train generating unit 21b starts a counting operation of the pixel clock clkw0 upon an input of the clear signal xlclr1, and outputs the external pulse train xpls0 to the clock generating unit 22b when a count value thereof reaches a predetermined setting value prd1 (prd1 indicates an interval of generation of the external pulse train xpls1). Thus, the pulse train generating unit 21b is capable of changing a phase of the pixel clock clkw1 at the timing of outputting the external pulse train xpls1. The pulse train generating unit 21b stops the generation of the external pulse train xpls1 when a number of the output external pulse train xpls1 reaches the a predetermined setting value num1 (num1 indicates the number of pulses of the external pulse train xpls1 and is represented by a positive integer).

The image data processing unit 23 applies image processing to the input image data by using various sets of information (information regarding a half-tone process, information for designating an image area based on a print paper size) used for image formation input from the register 24. Moreover, the image data processing unit 23 outputs the image signal input from the printer controller 40 to the laser light source driver 14a in synchronization with the pixel clock clkw0. Further, the image data processing unit 23 outputs the image signal input from the printer controller 40 to the laser light source driver 14b in synchronization with the pixel clock clkw1.

The operation unit 50 serving as an input means is used for inputting information, and can be a group of key switches such as a touch panel or a keyboard. The operation unit 50 inputs the setting values prd0, prd1, num0 and num1.

The CPU 30 is constituted by a microcomputer which comprises a central processing unit, a program ROM (read only memory), etc., and generally controls the engine unit (the image forming apparatus) including the optical scanning apparatus 10 and the data control apparatus 20. The CPU 30 serves as scanning time comparing means and setting value calculating means. The CPU 30 outputs and sets the information input from the operation unit 50 to the register 24. Specifically, an operator of the image forming apparatus inputs the pulse generation intervals (periods) prd0 and prd1 of the external pulse trains xpls0 and xpls1, and pulse generation numbers num0 and num1 of the external pulse trains xpls0 and xpls1 by using the input keys of the operation unit 50, etc. The CPU 30 sets the input setting values prd0, prd1, num0 and num1 to the register 24. The CPU 30 outputs the phase delay control signal phase0$p$ for delaying the phase of the pixel clock clkw0 and a phase progress control signal phase0$m$ to the resister 24 base on the external pulse train xpls0 output from the pulse train generating unit 21a. Additionally, the CPU 30 outputs the phase delay control signal phase1$p$ for delaying the phase of the pixel clock clkw1 and a phase progress control signal phase1$m$ to the resister 24 based on the external pulse train xpls1 output from the pulse train generating unit 21a.

The register 24 serves as a storing medium for temporarily storing the setting values prd0, prd1, num0 and num1 set by the CPU 30, and outputs the setting values prd0 and num0 to the pulse train generating unit 21a and outputs the setting values prd1 and num1 to the pulse train generating unit 21b. Additionally, the register 24 outputs the phase delay control signal phase0$p$ and the phase progress control signal phase0$m$ input by the CPU 30 to the pulse train generating unit 21a, and also outputs the phase delay control signal phase1$p$ and the phase progress control signal phase1$m$ input by the CPU 30 to the pulse train generating unit 21b. Further, the register 24 outputs various sets of information (information regarding a half-tone process, information for designating an image area based on a print paper size) used for image formation input by the CPU 30 to the image data processing unit 23.

The printer controller 40 sends the image data corresponding to a signal page to the image data processing unit as an image signal (video signal) on an individual line (scan line) basis.

Figure 7A:
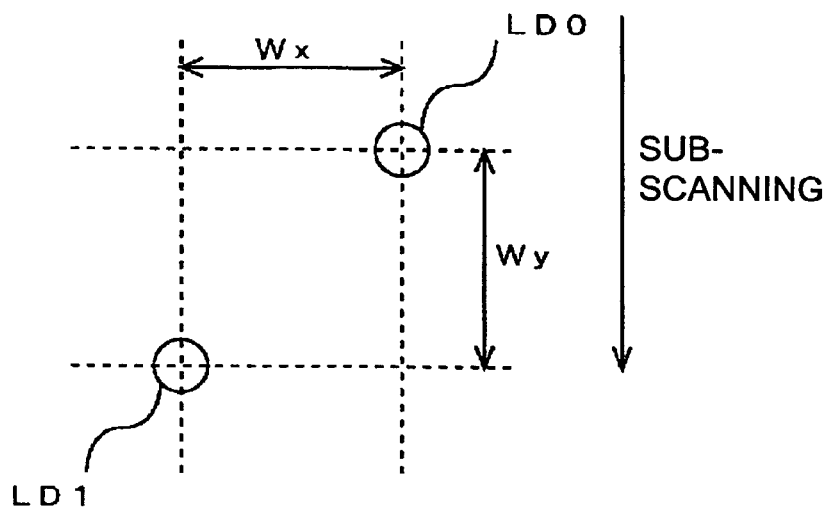
FIG. 7A is an illustration showing a positional relationship between two laser light sources in the first embodiment of the present invention.
Figure 7B:
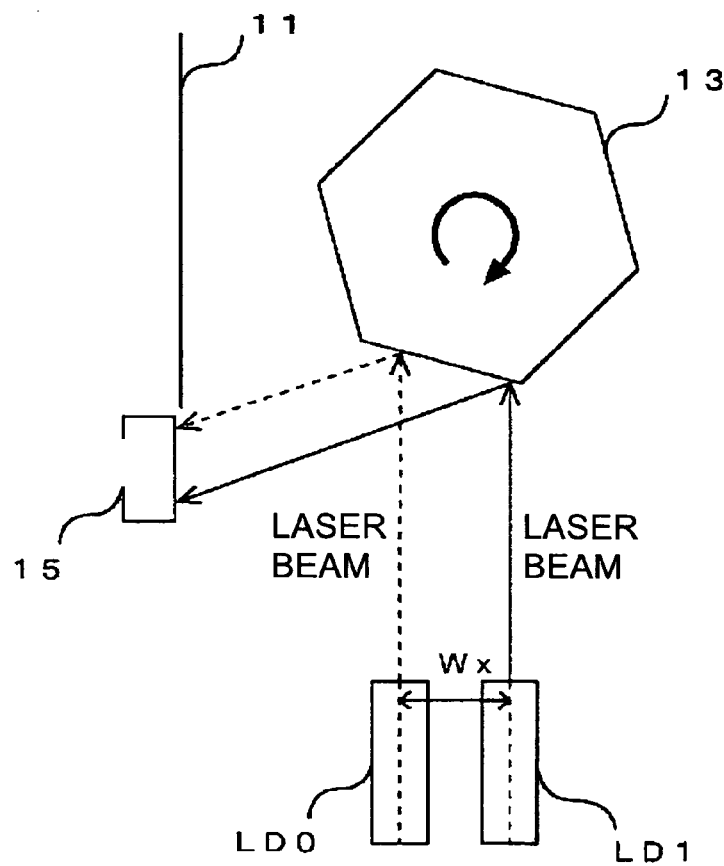
FIG. 7B is an illustration for explaining laser beam irradiation by the laser light sources in the first embodiment of the present invention.

A description will now be given, with reference to FIGS. 7A and 7B, of a positional relationship between the laser light sources LD0 and LD1. FIG. 7A is an illustration showing a positional relationship between the laser light sources LD0 and LD1 in the first embodiment of the present invention. FIG. 7B is an illustration for explaining the laser beam irradiation by the laser light sources LD0 and LD1 in the first embodiment of the present invention.

In the present embodiment, as shown in FIG. 7A, the laser light sources LD0 and LD1 are arranged relative to each other with a distance Wx in the main-scanning direction and a distance Wy in the sub-scanning direction. Even if a plurality of laser light sources must be arranged with a predetermined distance due to a limitation in design, the laser beams can be irradiated with a desired line pitch (an interval of laser beams in the sub-scanning direction) so as to form an image by the laser beams by arranging the plurality of laser light sources with a certain distance in the main-scanning direction as shown in FIG. 7A.

When the two laser light sources LD0 and LD1 are arranged at the interval Wx in the main-scanning direction as shown in FIG. 7A, there is generated a difference between the irradiated positions on the polygon mirror 13 by the two laser light sources LD0 and LD1 as shown in FIG. 7B. Accordingly, if the laser light sources LD0 and LD1 project the laser beams at the same timing, the laser beam from the light source LD0 always incident on the synchronization detection unit 15 before the laser beam from the laser light source LD1.

Figure 8:
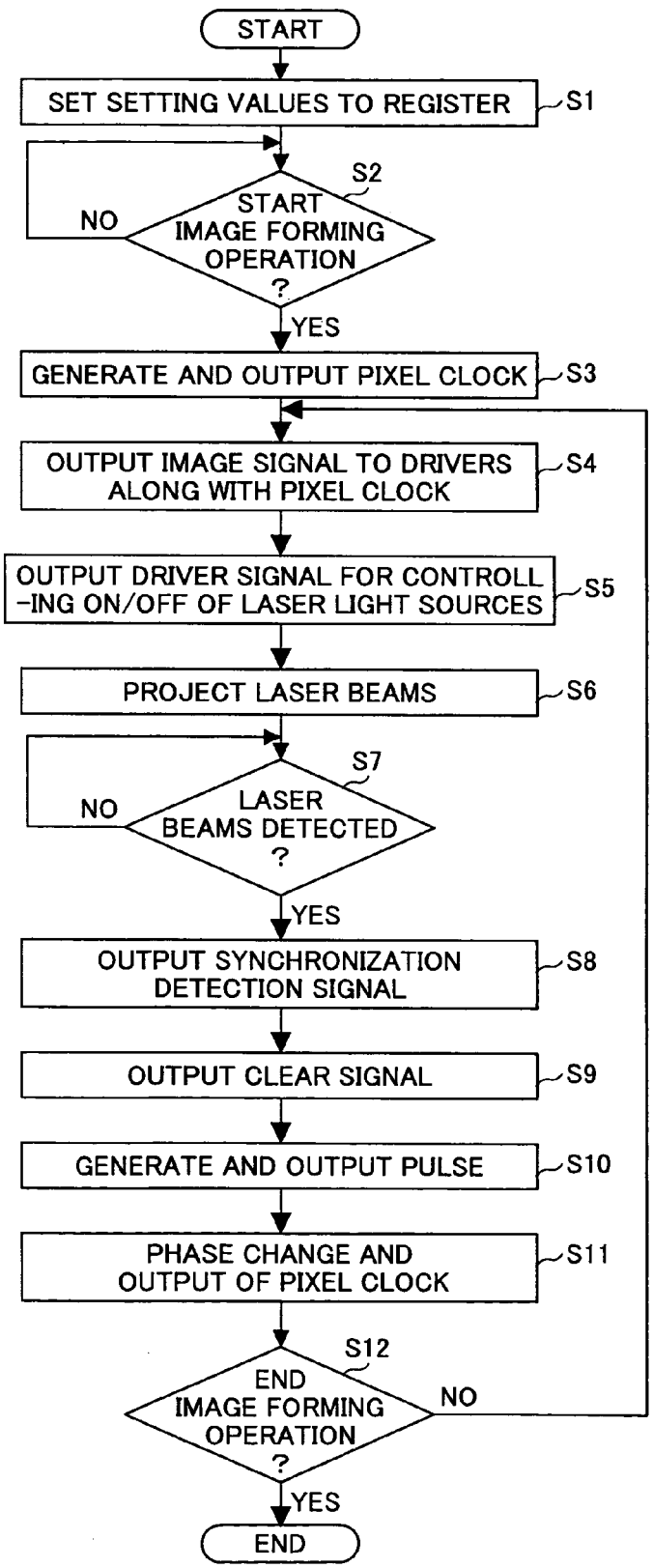
FIG. 8 is a flowchart of an image forming operation performed by the image forming apparatus according to the first embodiment of the present invention.

A description will now be given, with reference to FIG. 8, of an image forming operation performed by the image forming apparatus according to the present embodiment. FIG. 8 is a flowchart of an image forming operation performed by the image forming apparatus according to the first embodiment of the present invention.

First, the CPU 30 sets the setting values prd0, prd1, num0 and num1 input by the operation unit 50 to the register 24 (step S1). The register 24 outputs the corresponding setting values to the pulse train generating units 21a and 21b.

When a start request of the image forming operation is input by the operation unit 50 (Yes of step S2), that is, for example, if a start key provided in the operation unit 50 is selected, the image forming apparatus starts the image forming operation.

The clock generating units 22a and 22b generate the pixel clocks clkw0 and clkw1 based on the basic clocks clko0 and clko1, respectively. The clock generating unit 22a outputs the generated pixel clock clkw0 to the pulse train generating unit 21a and the image data processing unit 23. Additionally, the clock generating unit 22b outputs the generated pixel clock clkw1 to the pulse train generating unit 21b and the image data processing unit 23 (step S3).

The image data processing unit 23 outputs the image signal input from the printer controller 40 to the laser light source drivers 14a and 14b in synchronization with the input pixel clocks clkw0 and clkw1, respectively (step S4).

The laser light source drivers 14a and 14b output drive control signals for controlling ON/OFF of illumination of the laser light sources LD0 and LD1, respectively, in accordance with the input timing of the image signal from the image data processing unit 23 based on the pixel clocks after the phase change and the contents of data of the image signal.

The laser light sources LD0 and LD1 project laser beams to the polygon mirror 13 based on the control by the laser light source drivers 14a and 14b, respectively (step S6). It should be noted that a lens (cylindrical lens) for condensing the laser beams may be provided between the laser light sources LD0 and LD1 and the polygon mirror 13.

The laser beam projected from the laser light sources LD0 and LD1 are deflected by the polygon mirror 13, transmit through the fθ lens 12 and are incident on the synchronization detection unit 15, and, thereafter, the laser beams are incident on the surface of the photoconductor 11 to be scanned. When the synchronization detection unit 15 detests the laser beams (Yes of step S7), the synchronization detection unit 15 outputs the synchronization detection signal detp to the clock generating units 22a and 22b (step S8). As mentioned above in the present embodiment, since the laser beam from the laser light source LD0 is incident on the synchronization detection unit 15 always before the laser beam from the laser light source LD1, the synchronization detection unit 15 outputs the synchronous detection signal detp to the clock generating unit 22a at the time of the first detection of the laser beams and also outputs the synchronization detection signal detp to the clock generating unit 22b at the time of the second detection of the laser beams.

If the synchronous detection signal detp is input, the clock generating units 22a and 22b generate the clear signals xlclr0 and xlclr1, and outputs them to the pulse train generating units 21a and 21b, respectively (step S9).

Upon reception of the clear signals xlclr0 and xlclr1, the pulse train generating units 21a and 21b start the count of the pixel clocks clkw0 and clkw1, respectively. The pulse train generating units 21a and 21b output the external pulse trains xpls0 and xpls1 to the clock generation sections 22a and 22b when the count values of the pixel clocks reach the setting values prd0 and prd1, respectively. The pulse train generating units 21a and 21b repeat the generation and output of the external pulse trains until the count values reach settings num0 and num1, respectively (step S10).

When the external pulse trains xpls0 and xpls1 are input, the clock generating units 22a and 22b applies a phase change (delay/progress) to the pixel clocks clkw0 and clkw1 at the input timing (step S11). It should be noted that the phase change can be performed as a partial phase change, which can change a phase at a high level or a low level of each pixel clock by a time unit that is smaller than one period (hereinafter, referred to as "pixel clock period") of the pixel clock.

The clock generating unit 22a outputs the pixel clock clkw0, which was subjected to the phase change, to the pulse train generating unit 21a and the image data processing unit 23. Additionally, the clock generating unit 22b outputs the pixel clock clkw1, which was subjected to the phase change, to the pulse train generating unit 21b and the image data processing unit 23.

Thereafter, the image data processing unit 23 sends the image signal from the printer controller 40 to the laser light source drivers 14a and 14b in synchronization with the pixel clocks after the phase change. The laser light source drivers 14a and 14b perform a luminescence control of the laser light sources LD0 and LD1 according to the input timing of the image signal based on the pixel clocks after the phase change. The above-mentioned operation is repeated until a stop command of the image formation operation is supplied by the CPU 30 (No of step S12).

Figure 9:
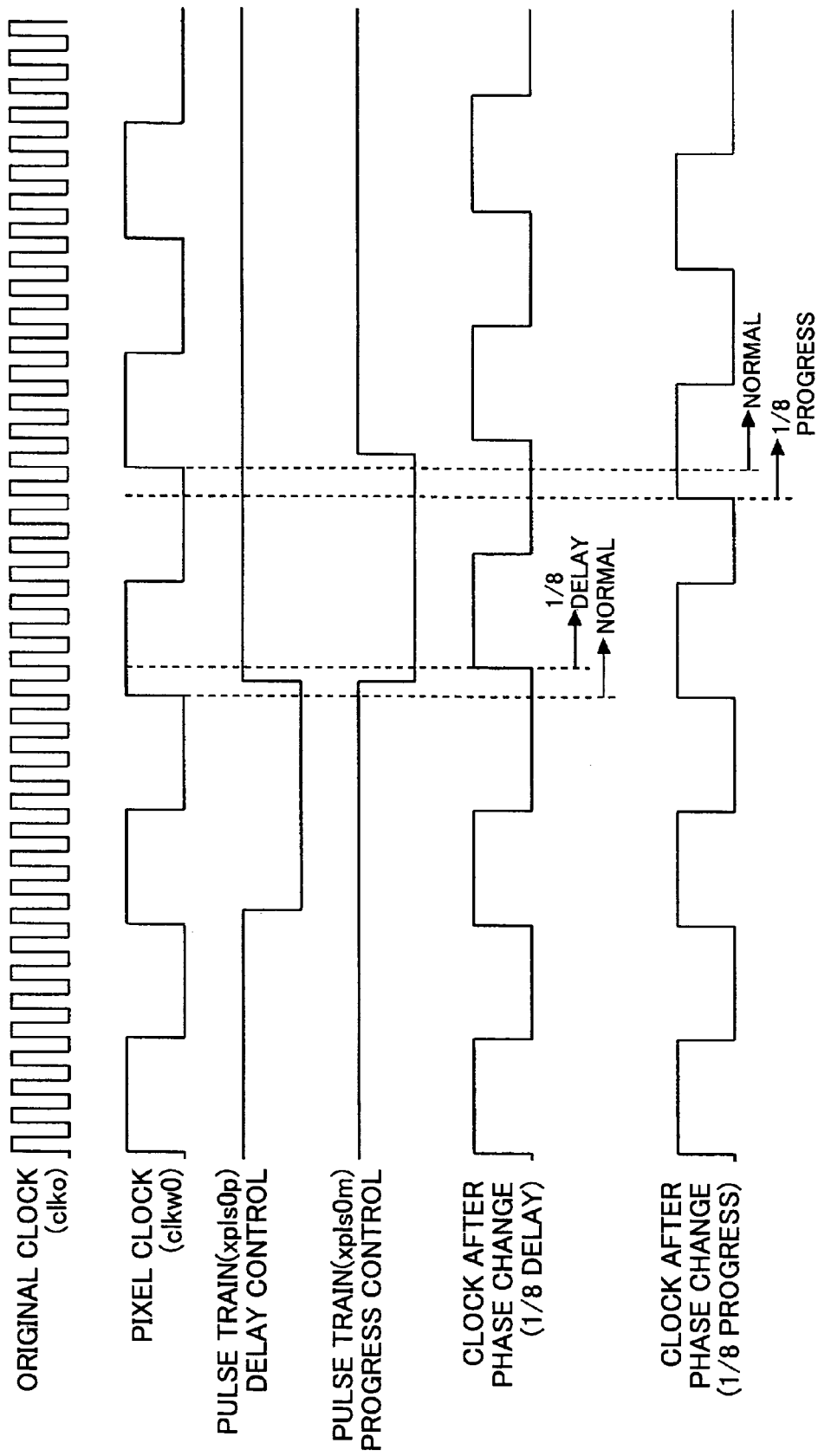
FIG. 9 is a timing chart showing an example of a relationship between a pixel clock and a phase change thereof.

A description will now be given, with reference to FIG. 9, of a relationship between the pixel clock and the phase change (phase setting). FIG. 9 is a timing chart showing an example of the relationship between the pixel clock and the phase change thereof.

The clock generating unit 22a generates the pixel clock clkw0 by using the reference clock clko0, which is M times (four times in FIG. 9) the frequency of the pixel clock clkw0, and outputs the pixel clock clkw0 to the pulse generating unit 21a and the image date processing unit 23 in synchronization with the synchronization signal detection signal detp supplied by the synchronization detection unit 15. The clock generating unit 22a generates the pixel clock clkw0 by toggling a high level (H) and a low level (L) of a reference clock (original clock) clko0, which is generated by an oscillator (not shown in the figure) provided in the clock generating unit 22a and has the frequency M times (four times in the example of FIG. 9) the frequency of the pixel clock clkw0 at each M×clok0 according to a count control.

The pulse train generating units 21a and 21b perform the phase control using the external pulse trains xpls0 and xpls1 so as to achieve the phase change, which shifts the phase of the pixel clocks clkw0 and clkw1, respectively.

The pulse train generating unit 21a outputs either the external pulse train xpls0p for delaying the phase angle of the pixel clock clkw0 or the external pulse train xpls0m for progressing the phase angle of the pixel clock clkw0, as an external pulse train xpls0. On the other hand, the pulse train generating unit 21b outputs either the external pulse train xpls1p for delaying the phase angle of the pixel clock clkw1 or the external pulse train xpls1m for progressing the phase angle of the pixel clock clkw1, as an external pulse train xpls1.

For example, when generating the pixel clock clkw0 from the reference clock clko0, the pixel clock clkw, which is normally generated with 8clko, is generated with 9clko or 7clko by increasing or decreasing the count value i by inputting the external pulse train xpls0 (external pulse train xpls0p or xpls0m). That is, the pulse train generating unit 21a can shift the phase of the pixel clock clkw0 after the phase change by changing the phase by increasing the count value i while outputting the external pulse train xpls0m to the clock generating unit 22a. When considering one scan line in the main-scanning direction, the above-mentioned approach provides an effect that an entire magnification is increased with Tm-7/8 (progress control), where Tm is a time of an entire scan line. On the other hand, if the pulse train generating unit 21a outputs the external pulse train xpls0p to the clock generating unit 22a and changes the phase by decreasing the count value i, the frequency of the pixel clock clkw0 is increases to 8/9 times (delay control), which achieves a shift of the pixel clock clkw0 after the phase change. When considering one scan line in the main-scanning direction, the above-mentioned approach provides an effect that an entire magnification is decreased with Tm+7/8 (delay control). Thus, the optical scanning apparatus 10 does not depend on an environmental fluctuation, and the image forming apparatus is capable of forming an image accurately on a desired position on the photoconductor.

It should be noted that although the relationship between the reference clock clko0, the pixel clock clkw0 and the external pulse train xpls0 and the phase change of the pixel clock clko1 have been explained with reference to FIG. 9, the relationship between the reference clock clko1, the pixel clock clkw1 and the external pulse train xpls1 and the phase change of the pixel clock clkw1 are the same and description thereof will be omitted.

Figure 10:
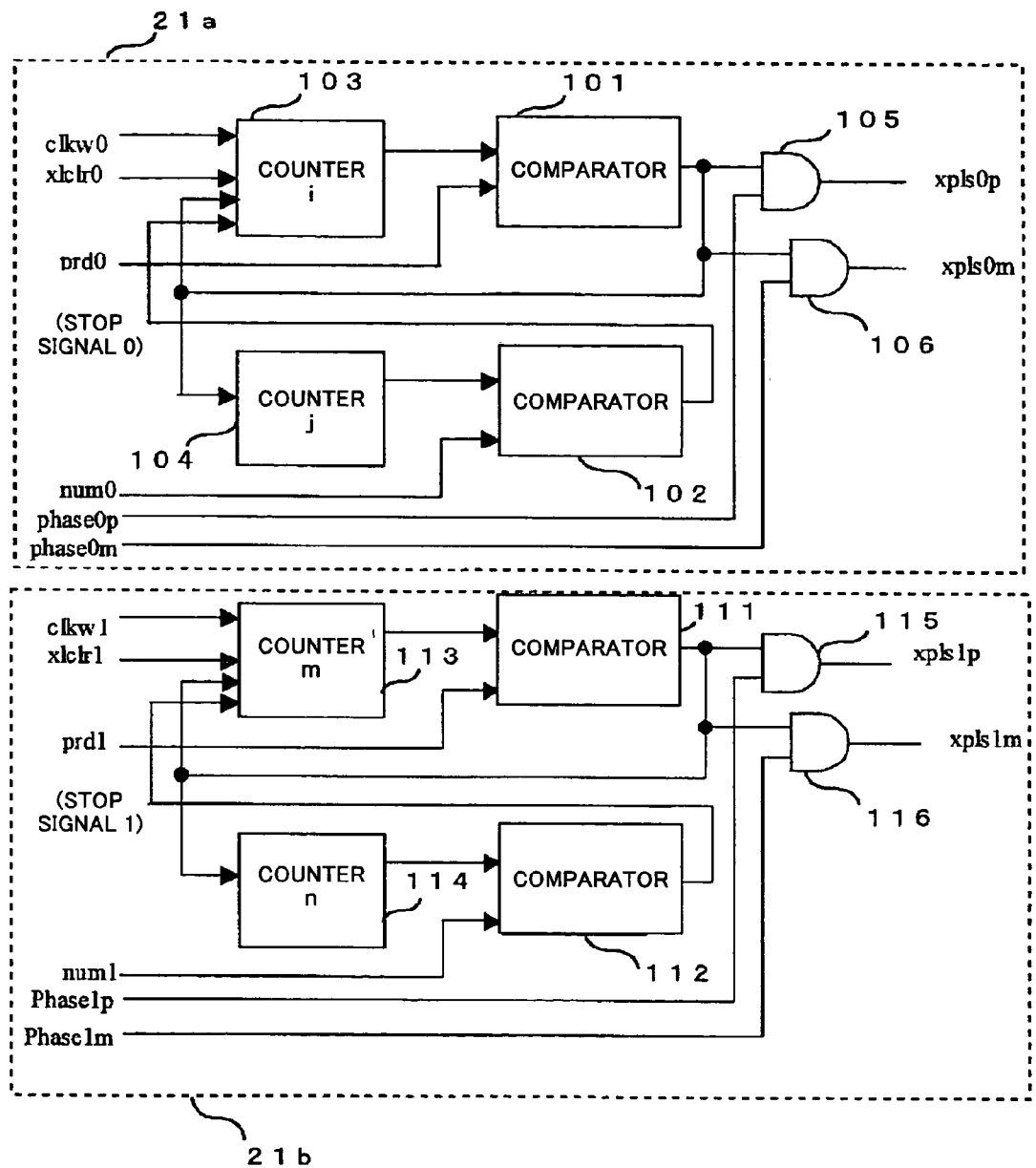
FIG. 10 is a block diagram of pulse train generating units according to the first embodiment of the present invention.

A description will now be given, with reference to FIG. 10, of structures of the pulse train generating units 21a and 21b. FIG. 10 is a block diagram of the pulse train generating units 21a and 21b according to the first embodiment of the present invention.

First, the pulse train generating unit 21a will be described. The pulse train generating unit 21a comprises comparators 101 and 102, counters 103 and 104, and AND circuits 105 and 106.

The counter 103 inputs the clear signal xlclr0 produced by the clock generating unit 22a from the synchronization detection signal detp, counts the number of pulses of the pixel clocks clkw0 similarly input from the clock generating unit 22a on the basis of the input time, and outputs the count value i to the comparator 101.

The setting value prd0 is input to the comparator 101 from the register 24, and is retained in the comparator 101. The comparator 101 compares the setting value prd0 with the count value i from the counter 103, and generates and outputs the external pulse train xpls0 when the count value i reaches the setting value prd0 (or when the count value i becomes greater than the setting value prd0).

The counter 104 receives the external pulse train xpls0 output from the comparator 101, counts the number of times of inputs (number of times of generations of the external pulse train xpls0), and outputs the count value j to the comparator 102.

The setting value num0 is input to the comparator 102 from the register 24, and is retained in the comparator 102. The comparator 102 compares the setting value num0 with the count value j from the counter 104, and generates and outputs the stop signal 0 for stopping the counting operation of the counter 103 when the count value j reaches the setting value num0 (or when the count value j becomes greater than the setting value num0).

The pulse xpls0 is input to the AND circuit 105 from the comparator 101. If the phase delay control signal phase0p is supplied from the register 24 at this time, the AND circuit 105 outputs the input pulse xpls0 to the clock generating unit 22a as a pulse xpls0p for the phase delay control.

The pulse xpls0 is input to the AND circuit 106 from the comparator 101. If the phase delay control signal phase0m is supplied from the register 24 at this time, the AND circuit 106 outputs the input pulse xpls0 to the clock generating unit 22a as a pulse xpls0m for the phase progress control.

Next, the pulse train generating unit 21b will be described. The pulse train generating unit 21b comprises comparators 111 and 112, counters 113 and 114, and AND circuits 115 and 116.

The counter 113 inputs the clear signal xlclr1 produced by the clock generating unit 22b from the synchronization detection signal detp, counts the number of pulses of the pixel clocks clkw1 similarly input from the clock generating unit 22b on the basis of the input time, and outputs the count value m to the comparator 111.

The setting value prd1 is input to the comparator 111 from the register 24, and is retained in the comparator 111. The comparator 111 compares the setting value prd1 with the count value m from the counter 113, and generates and outputs the external pulse train xpls1 when the count value m reaches the setting value prd1 (or when the count value m becomes greater than the setting value prd1).

The counter 114 receives the external pulse train xpls0 output from the comparator 111, counts the number of times of inputs (number of times of generations of the external pulse train xpls1), and outputs the count value n to the comparator 112.

The setting value num1 is input to the comparator 112 from the register 24, and is retained in the comparator 112. The comparator 102 compares the setting value num1 with the count value n from the counter 114, and generates and outputs the stop signal 1 for stopping the counting operation of the counter 113 when the count value n reaches the setting value num1 (or when the count value n becomes greater than the setting value num1).

The pulse xpls1 is input to the AND circuit 115 from the comparator 111. If the phase delay control signal phase0p is supplied from the register 24 at this time, the AND circuit 115 outputs the input pulse xpls1 to the clock generating unit 22b as a pulse xpls1p for the phase delay control.

The pulse xpls1 is input to the AND circuit 116 from the comparator 111. If the phase delay control signal phase1m is supplied from the register 24 at this time, the AND circuit 116 outputs the input pulse xpls1 to the clock generating unit 22b as a pulse xpls1m for the phase progress control.

Figure 11:
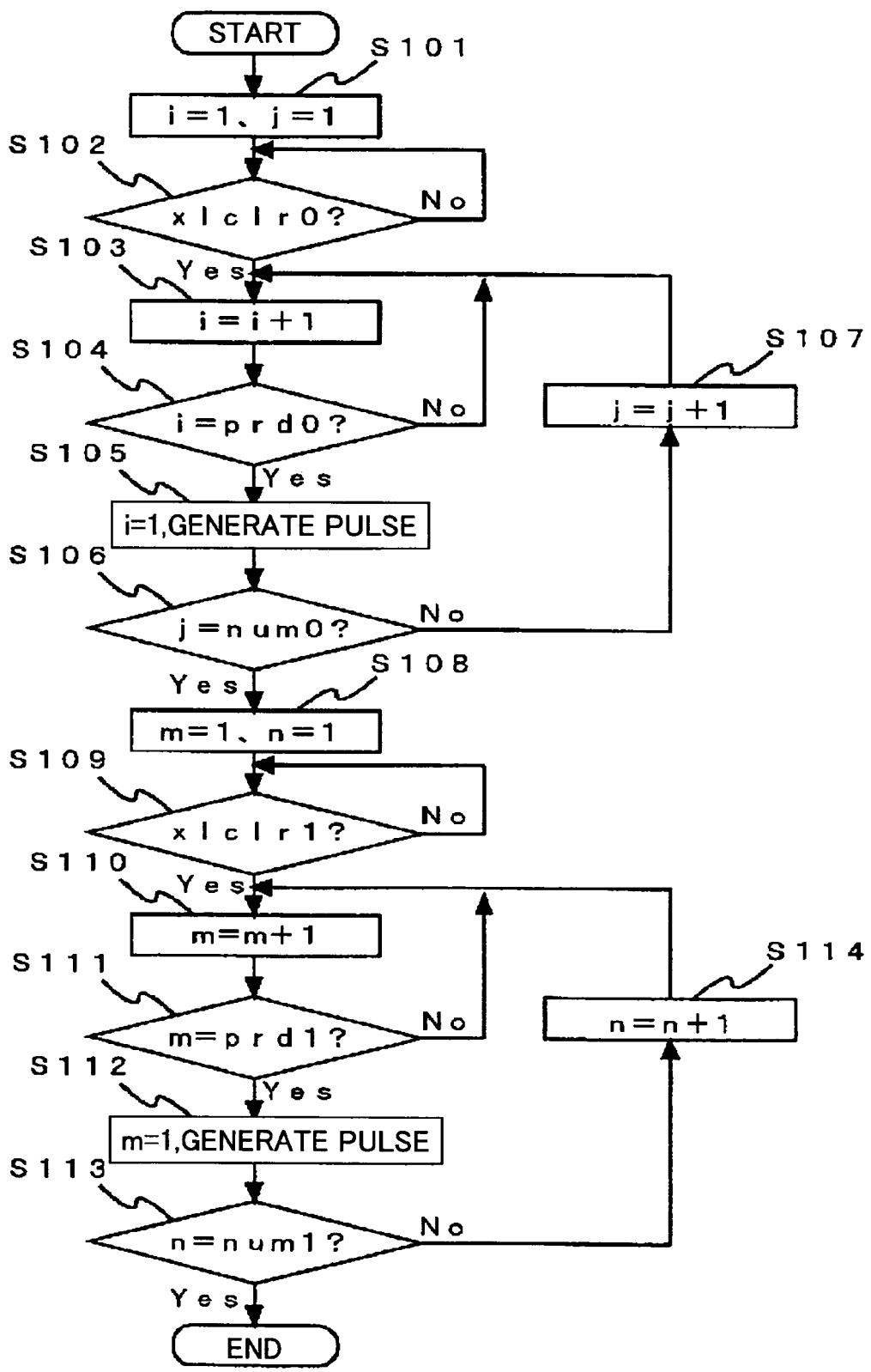
FIG. 11 is a flowchart of an operation of the pulse train generating units according to the first embodiment of the present invention.

A description will now be given, with reference to FIG. 9 and FIG. 11, of an operation to generate the external pulse trains xpls0 and xpls1 by the pulse train generating units 21a and 21b according to the present embodiment. FIG. 11 is a flowchart of operations of the pulse train generating units 21a and 21b according to the first embodiment of the present invention.

First, the counters 103 and 104 reset the count values i and j to "1", respectively, when a power is supplied to the pulse train generating unit 21a (step S101).

Thereafter, the counter 103 waits for an input the clear signal xlclr0 (No of step S102), and after the clear signal xlclr0 is input (Yes of step S102), the counter 103 counts up or increments (+1) the count value i by 1 each time the pixel clock clkw0 is input (step S103).

The comparator 101 performs the process of step S103 until the count value i reaches the setting value prd0 (No of step S104).

The comparator 101 generates the pulse xpls0 when the count value i reaches the setting value prd0 (or when the count value i becomes greater than the setting value prd0). The counter 103 returns the count value i to "1" upon input of the pulse xpls0 (step S105). The pulse xpls0 generated by the comparator 101 is supplied to the AND circuits 105 and 106. At this time, when setting the pulse xpls0 as xpls0p for a phase delay control, the phase delay control signal phase0p is supplied to the AND circuit 105. On the other hand, when setting the pulse xpls0 as xpls0m for a phase progress control, the phase progress control signal phase0m is supplied to the AND circuit 106. The AND circuit 105 outputs the pulse xpls0p for the phase delay control to the clock generating unit 22a if the phase delay control signal phase0p is input when the pulse xpls0 is supplied. The AND circuit 106 outputs the pulse xpls0m for the phase progress control to the clock generating unit 22b if the phase progress control signal phase0m is input when the pulse xpls0 is supplied.

As a result of comparison of the comparator 102 comparing the count value j of the counter 104 with the setting value num0, if the count value j has not reached the setting value num0 or the count value j is smaller than the setting value num0 (No of step S106), the counter 104 counts up or increments (+1) the count value j when the pulse xpls0 is input (step S107).

Thereafter, the counters 103 and 104 and the comparator 101 repeat the above-mentioned operations, and if the count value j reaches the setting value num0 (Yes of step S106), the comparator 102 generates the stop signal 0 and outputs the stop signal 0 to the counter 103. When the stop signal 0 is supplied to the counter 103, the counter 103 stops the count operation.

Next, the counters 113 and 114 reset the count values m and n to "1", respectively, when a power is supplied to the pulse train generating unit 21b (step S108).

Thereafter, the counter 113 waits for an input the clear signal xlclr1 (No of step S109), and after the clear signal xlclr1 is input (Yes of step S109), the counter 113 counts up or increments (+1) the count value m by 1 each time the pixel clock clkw1 is input (step s110).

The comparator 111 performs the process of step S113 until the count value m reaches the setting value prd1 (No of step S111).

The comparator 111 generates the pulse xpls1 when the count value m reaches the setting value prd1 or when the count value m becomes greater than the setting value prd1 (Yes of step S). The counter 113 returns the count value m to "1" upon input of the pulse xpls1 (step S112).

As a result of comparison of the comparator 112 comparing the count value n of the counter 104 with the setting value num1, if the count value n has not reached the setting value num1 or the count value n is smaller than the setting value num1 (No of step S113), the counter 114 counts up or increments (+1) the count value n when the pulse xpls1 is input (step S114).

Thereafter, the counters 113 and 114 and the comparator 111 repeat the above-mentioned operations, and if the count value n reaches the setting value num1 (Yes of step S113), the comparator 112 generates the stop signal 1 and outputs the stop signal 1 to the counter 113. When the stop signal 1 is supplied to the counter 113, the counter 113 stops the count operation.

It should be noted that besides the above-mentioned method, there is a method of generating a fixed pulse train using a random access memory (RAM) table to output data by counting addresses with the pixel clocks clkw0 and clkw1.

Additionally, although the pulse train generating unit 21b starts the operation of generating the external pulse train xpls1 after the pulse train generating unit 21a ended the operation of generating the external pulse train xpls0 in the example of FIG. 11, the operations of the pulse train generating units 21a and 21b can be performed concurrently.

Figure 12:
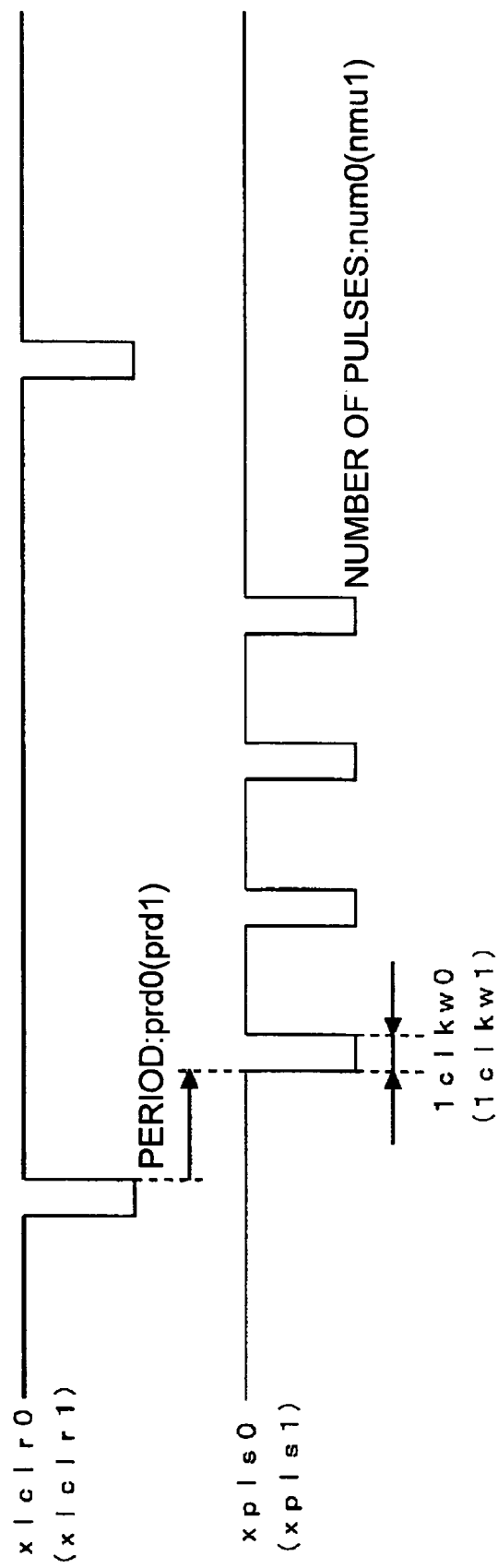
FIG. 12 is a timing chart showing a relationship between a clear signal and an external pulse train according to the first embodiment of the present invention.

FIG. 12 is a timing chart showing a relationship between the clear signal xlclr0 and the external pulse train xpls0 according to the first embodiment of the present invention.

As shown in FIG. 12, the pulse train generating unit 21a starts the output of the external pulse train xpls0 after the setting value prd0 has passed after the input of the clear signal xlclr0. At this time, the pulse train generating unit 21a outputs the external pulse train xpls0 having a pulse width of 1clkw0 until an input of a following external pulse train xpls0 at a period prd0 with a number of pulses num0.

Although the image forming apparatus performs scanning using the two laser light sources LD0 and LD1 in the present embodiment, the number of laser is not limited to two and three or more laser light sources may be used. In such a case, a laser light source driver, a pulse train generating unit and a clock generating unit are provided for each laser light source so as to perform a phase change on an individual laser light source basis.

As explained above, according to the present embodiment, in the image forming apparatus using two or more laser light sources so as to perform image formation according to a multi-beam method, the pulse train generating unit and the clock generating unit are provided for each laser light source so as to perform the phase change of the laser beams on an individual laser light source basis. Each pulse train generating unit and each clock generating unit perform the phase change of the pixel clock, which controls a projection timing of the laser beam of the laser light sources, respectively, based on the predetermined setting values (setting values indicating the period and the number of the phase changes). Therefore, even if the wavelengths of the laser beams projected from a plurality of laser light sources provided in the image forming apparatus are different from each other, a high-quality image can be formed on a medium to be scanned by using a common optical system.

Second Embodiment

In the first embodiment of the present invention, the synchronization detection unit 15, which aligns the scan start positions in the main scanning direction, outside the area of the surface of the photoconductor 11 to be scanned along the scanning paths of the laser beams in the main-scanning direction. In the second embodiment of the present invention, two synchronization detection units (a front-end synchronization detection unit 16 and a rear-end synchronization detection unit 17) are provided outside the area of the surface of the photoconductor 11 to be scanned along the scanning paths of the laser beams in the main-scanning direction. By measuring the time (the number of clocks) corresponding to a scan between the front-end synchronization detection unit 16 and the rear-end synchronization detection units 17, an error in the write magnification of the laser light sources LD0 and LD1 is measured.

Figure 13:
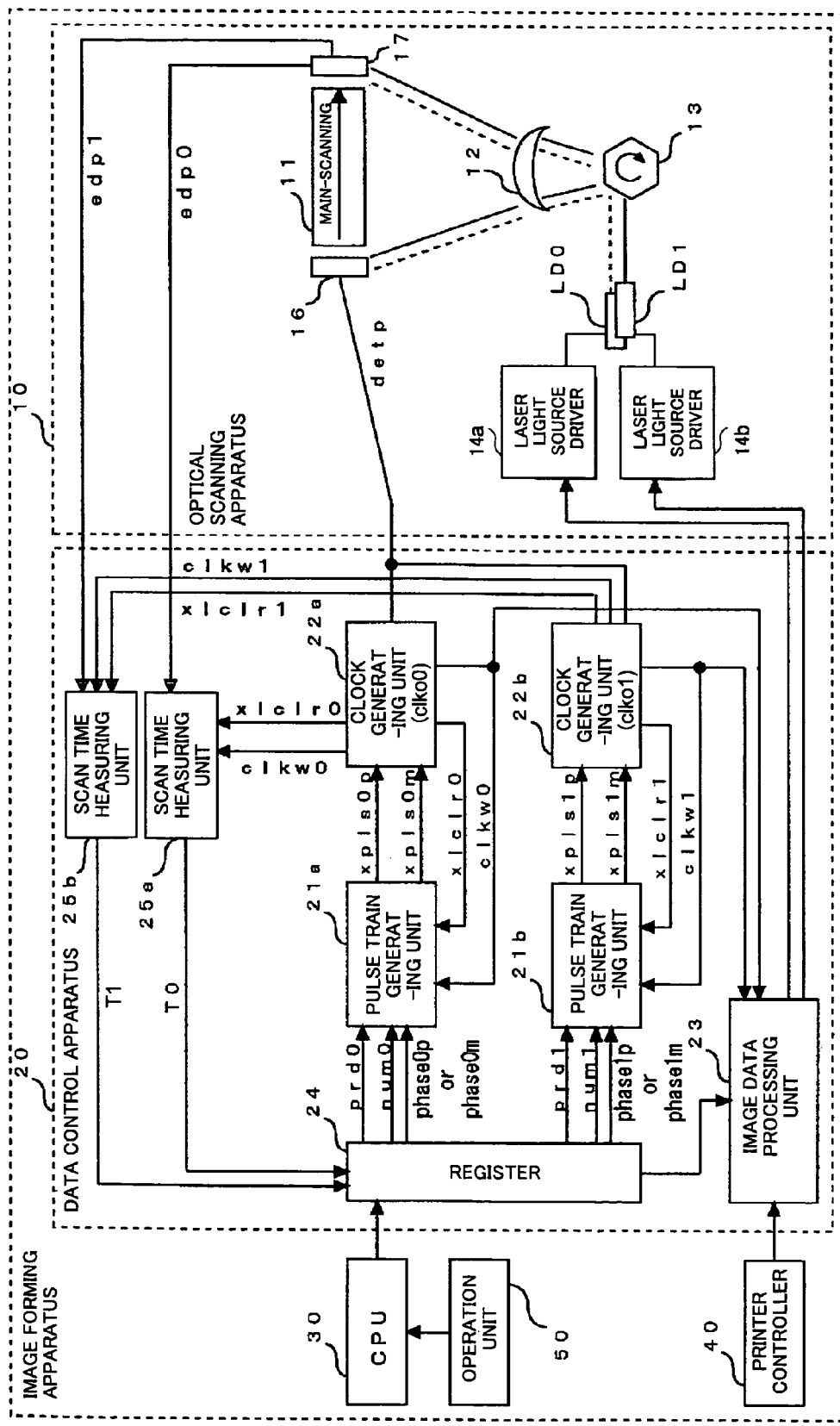
FIG. 13 is a block diagram of an image forming apparatus according to a second embodiment of the present invention.

A description will now be given, with reference to FIG. 13, of a structure of an image forming apparatus according to the second embodiment. FIG. 13 is a block diagram of the image forming apparatus according to the second embodiment of the present invention. It should be noted that, unless it is specifically mentioned below, the structure and operation of the image forming apparatus according to the present embodiment are the same as that of the first embodiment of the present invention.

As shown in FIG. 13, the image forming apparatus comprises an optical scanning apparatus 10, a data control apparatus 20, a CPU 30, a printer controller 40, and an operation unit 50 serving as input means. It should be noted the structure of the image forming apparatus shown in FIG. 13 is simplified, and the image forming apparatus may comprise parts other than the parts shown in FIG. 8.

The optical scanning apparatus 10 performs image formation by laser beams. The optical scanning apparatus comprises a photoconductor 11 serving as a medium to be scanned, an fθ lens 12, a polygon mirror 13 serving as rotational deflection means, laser light source drivers 14a and 14b, the front-end synchronization detection unit 16 as synchronous detection means and a rear-end synchronization detection unit 17, and laser light sources LD0 and LD1.

The optical scanning apparatus 10 according to the present embodiment is provided with the front-end synchronization detection unit 16 and the rear-end synchronization detection unit 17 instead of the synchronization detection unit 15 in the first embodiment.

The front-end synchronization detection unit 16 is provided outside (immediately preceding the scan start position) the image area of the surface of the photoconductor 11 to be scanned along the paths of the laser beams in the main-scanning direction. Similar to the synchronization detection unit 15 in the first embodiment, the front-end synchronization detection unit 16 detects the laser beams transmitting through the fθ lens 12 and irradiated thereon. Upon detection of the laser beams from the laser light sources LD0 and LD1, the front-end synchronization detection unit 16 generates the synchronization detection signal detp, which specifies the write start positions of the laser beams in the main-scanning direction (for aligning the write start positions always at the same position on the surface to be scanned), and outputs the signal detp to the data control apparatus 20.

The rear-end synchronization detection unit 17 is provided outside (immediately proceeding the scan start position) the image area of the surface of the photoconductor 11 to be scanned along the paths of the laser beams in the main-scanning direction. The rear-end synchronization detection unit 17 detects the laser beams from the laser light source LD0 and LD1 after scanning of one scan period is completed. The rear-end synchronization detection unit 17 outputs, when detecting the laser beams, a scan end signals edp0 and edp1, which indicate the completion of the scan corresponding to one scanning period (one scan line), to scanning time measuring units 25a and 25b.

It is assumed that other parts provided in the optical scanning apparatus 10 have the same structures as the first embodiment, and performs the same operations.

The data control apparatus 20 outputs the image signal for controlling the laser light source drivers 14a and 14b so as to control the laser beam write operation performed by the optical scanning apparatus 10. The data control apparatus 20 comprises pulse train generating units 21a and 21b serving as scan time measuring means, clock generating units 22a and 22b serving as pixel clock generating means, an image data processing unit 23, a register 24, and the scan time measuring units 25a and 25b serving as scan time measuring means.

The data control apparatus 20 according to the second embodiment has the same structure as the data control apparatus 20 according to the first embodiment except for the scan time measuring units 25a and 25b added thereto.

Similar to the first embodiment, the clock generating unit 22a outputs the pixel clock clkw0 and the clear signal xlclr0 to the pulse train generating unit 21a, and also outputs the pixel clock clkw0 and the clear signal xlclr0 to the scan time measuring unit 25a.

The clock generating unit 22b outputs the pixel clock clkw1 and the clear signal xlclr1 to the pulse train generating unit 21b, and also outputs the pixel clock clkw1 and the clear signal xlclr1 to the scan time measuring unit 25b.

The pixel clock clkw0 and the clear signal xlclr0 are supplied to the scan time test measuring unit 25a from the clock generating unit 22a. Additionally, the scan end signal dep0 is supplied to the scan time measuring unit 25a from the rear-end synchronization detection unit 17. The scan time measuring unit 25a measures the time (the number of pulses of the pixel clock) T0 (measured value T0: T0 is a positive integer) after the clear signal xlclr0 is input until the scan end signal edp0 is input, and outputs the measure value T0 to the register 24.

The pixel clock clkw1 and the clear signal xlclr1 are input to the scan time measuring unit 25b from the clock generating unit 22b. Additionally, the scan end signal dep1 is supplied to the scan time measuring unit 25b from the rear-end synchronization detection unit 17. The scan time measuring unit 25b measures the time (the number of pulses of the pixel clock) T1 (measured value T1: T1 is a positive integer) after the clear signal xlclr1 is input until the scan end signal edp1 is input, and outputs the measure value T1 to the register 24.

The register 24 serves as a memory medium temporarily storing, in addition to the setting values prd0, prd1, num0 and num1 set by the CPU 30, the measured values T0 and T1 supplied from the respective scan time measuring unit 25a and 25b. Additionally, the register 24 retains a reference value Tref, which indicates a time period after the clear signal xlclr0 is input until the scan end signal edp0 is input in a state where there is no error in the write magnification. The reference value Tref is a positive integer indicating a predetermined time period (number of clock pulses). The register 24 outputs the setting values prd0 and num0 to the pulse train generating unit 21a, and outputs the setting values prd1 and num1 to the pulse train generating unit 21b.

The CPU 30 is a microcomputer, which comprises a central processing unit, a program ROM, etc., and generally controls an entire engine unit containing the optical scanning apparatus 10 and the data control apparatus 20. The CPU 30 serves as scan time comparison means and setting value computation means. Similar to the first embodiment, the CPU 30 sets the setting values prd0, prd1, num0 and num1 input through the operation unit 50 to the register 24. In the present embodiment, the CPU 30 further computes a difference between the write magnifications of the laser light sources LD0 and LD1 using the reference value Tref and measured values T0 and T1 retained in the register 24. Based on the difference between the write magnifications, the CPU 30 computes new setting values prd0, prd1, num0 and num1, and sets them in the register 24. The pulse train generating unit 21a newly generates the external pulse train xpls0 based on the setting values prd0 and num0 newly set in the register 24. Similarly, the pulse train generating unit 21b newly generates the external pulse train xpls1 based on the setting values prd1 and num1 newly set in the register 24. Thus, according to the present embodiment, the time period after the laser beams are incident on the front-end synchronization detection unit 16 until the laser beams are incident on the rear-end synchronization detection unit 17 is measured, the differences between the reference value Tref and each of the measured values T0 and T1 are computed, and a number of pulses of the external pulse train to be generated is determined based on the computed differences. Therefore, the write magnification difference caused by a plurality of laser light sources can be automatically corrected, which enables an easy control of a deterioration of an image caused by the write magnification difference.

Figure 15A:
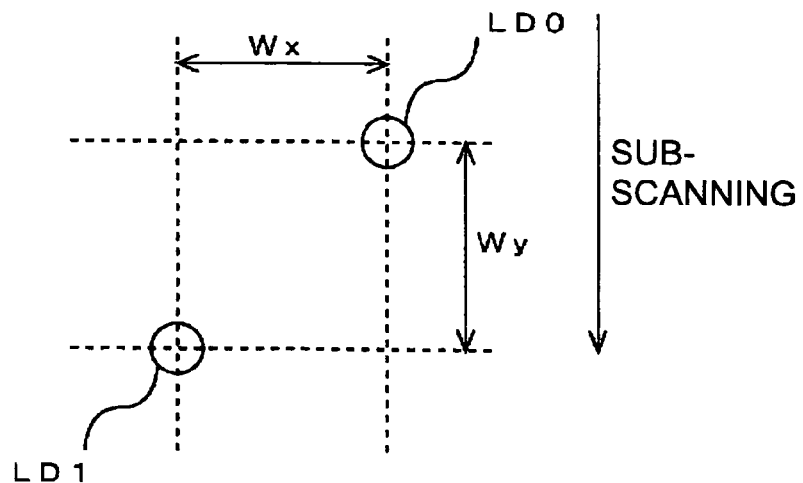
FIG. 15A is an illustration showing a positional relationship between two laser light sources according to the second embodiment of the present invention.
Figure 15B:
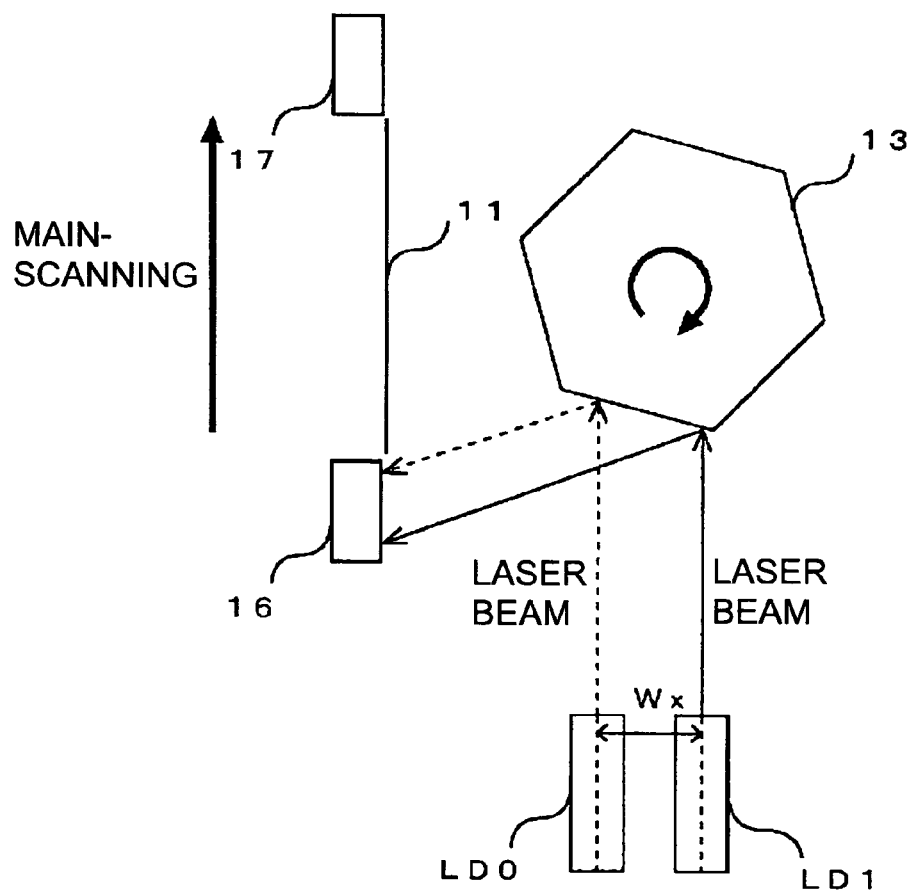
FIG. 15B is an illustration showing laser beam irradiation by the laser light sources according to the second embodiment of the present invention.

A description will now be given, with reference to FIGS. 14, 15A and 15B, of an operation of measuring the measured value T0 and T1 of the laser light sources LD0 and LD1 by the scan time measuring units 25a and 25b. FIG. 14 is a time chart showing the signals output from the front-end synchronization detection unit 16 and the rear-end synchronization detection unit 17 according to the second embodiment of the present invention. FIG. 15A is an illustration showing a positional relationship between the laser light sources LD0 and LD1 according to the second embodiment of the present invention. FIG. 15B is an illustration showing the laser beam irradiation by the laser light sources LD0 and LD1 according to the second embodiment of the present invention.

As shown in FIG. 14, the front-end synchronization detection unit 16 and the rear-end synchronization detection unit 17 detect incidence of the laser beams projected from the laser light sources LD0 and LD1. At this time, the front-end synchronization detection unit 16 and the rear-end synchronization detection unit 17 detect the laser beam from the laser light source LD1 after the detection of the laser beam from the laser light source LD0.

A description will be given of a structure in which the front-end synchronization detection unit 16 and the rear-end synchronization detection unit 17 always detect the laser beam from the laser light source D0 prior to the laser beam from the laser light source D1.

As shown in FIGS. 15A and 15B, the laser light source LD0 is located at a distance Wx apart from the laser light source LD1 in the main-scanning direction. Using the distance Wx, positions on the polygon mirror 13 on which the laser beams are incident are shifted from each other. That is, the laser beam from the laser light source LD0 is caused to be incident on a position on the upstream side of a position on which the laser beam from the laser light source LD1 is incident in a rotating direction of the polygon mirror 13. Thus, the laser beam from the laser light source LD0 is caused to always be incident on the front-end synchronization detection unit 16 and the rear-end synchronization detection unit 17 at an earlier timing than the laser beam from the laser light source LD1.

Moreover, it is also possible to cause the laser beam from the laser light source LD0 always be incident on the front-end synchronization detection unit 16 and the rear-end synchronization detection unit 17 at an earlier timing than the laser beam from the laser light source LD1 by controlling the laser light sources LD0 and LD1 so that the laser light source D0 always projects the laser beam earlier than the laser light source LD1. A description will be given below of such an operation.

First, the laser light source LD0 projects a laser beam. Upon detection of the incidence of the laser beam (from the laser light source LD0), the front-end synchronization detection unit 16 outputs a signal, which indicates that the laser beam from the laser light source LD0 is incident, to the laser light source driver 14b. Upon reception and recognition of the signal indicating the incidence of the laser beam from the laser light source LD0, the laser light source driver 14b starts projection of the laser beam of the laser light source LD1. Thus, since laser light source LD1 projects the laser beam after the laser beam from the LD0 is detected by the front-end synchronization detection unit 16, it becomes possible to always cause the laser beam from the laser light source LD0 always be incident on the front-end synchronization detection unit 16 and the rear-end synchronization detection unit 17 at an earlier timing than the laser beam from the laser light source LD1.

The image forming apparatus may have one or both of the above-mentioned two mechanisms (the adjustment of the incidence position to the polygon mirror 13 and the adjustment of the projection timing of the laser beams).

A description will now be given, with reference to FIG. 16, of a structure of the scan time measuring units 25a and 25b. FIG. 16 is a block diagram of the scan time measuring units 25a and 25b according to the second embodiment of the present invention.

The scan time measuring unit 25a comprises a counter 201 and a latch 202. The pixel clock clkw0 and the clear signal xlclr0 are supplied to the counter 201 from the clock generating unit 22a. The scan end signal edp0 is supplied to the latch 202 from the rear-end synchronization detection unit 17. The counter 201 starts a count of the pixel clock clkw0 on the basis of the time of the clear signal xlclr0 being supplied thereto. The latch 202 latches the count value (the number of pulses of the pixel clock) of the counter 201 at the input time when the scan end signal edp0 is supplied thereto. The latch 202 outputs the count value as the measured value (time) T0 to the register 24. The count value corresponds to a number of pulses of the pixel clock from the time the clear signal xlclr0 is input to the counter 201 to the time the scan end signal endp0 is input to the latch 202.

The scan time measuring unit 25b comprises a counter 211 and a latch 212. The pixel clock clkw1 and the clear signal xlclr1 are supplied to the counter 211 from the clock generating unit 22b. The scan end signal edp1 is supplied to the latch 212 from the rear-end synchronization detection unit 17. The counter 211 starts a count of the pixel clock clkw1 on the basis of the time of the clear signal xlclr1 being supplied thereto. The latch 212 latches the count value (the number of pulses of the pixel clock) of the counter 211 at the input time when the scan end signal edp1 is supplied thereto. The Latch 212 outputs the count value as the measured value (time) T1 to the register 24. The count value corresponds to a number of pulses of the pixel clock from the time the clear signal xlclr1 is input to the counter 211 to the time the scan end signal edp1 is input to the latch 212.

Figure 17:
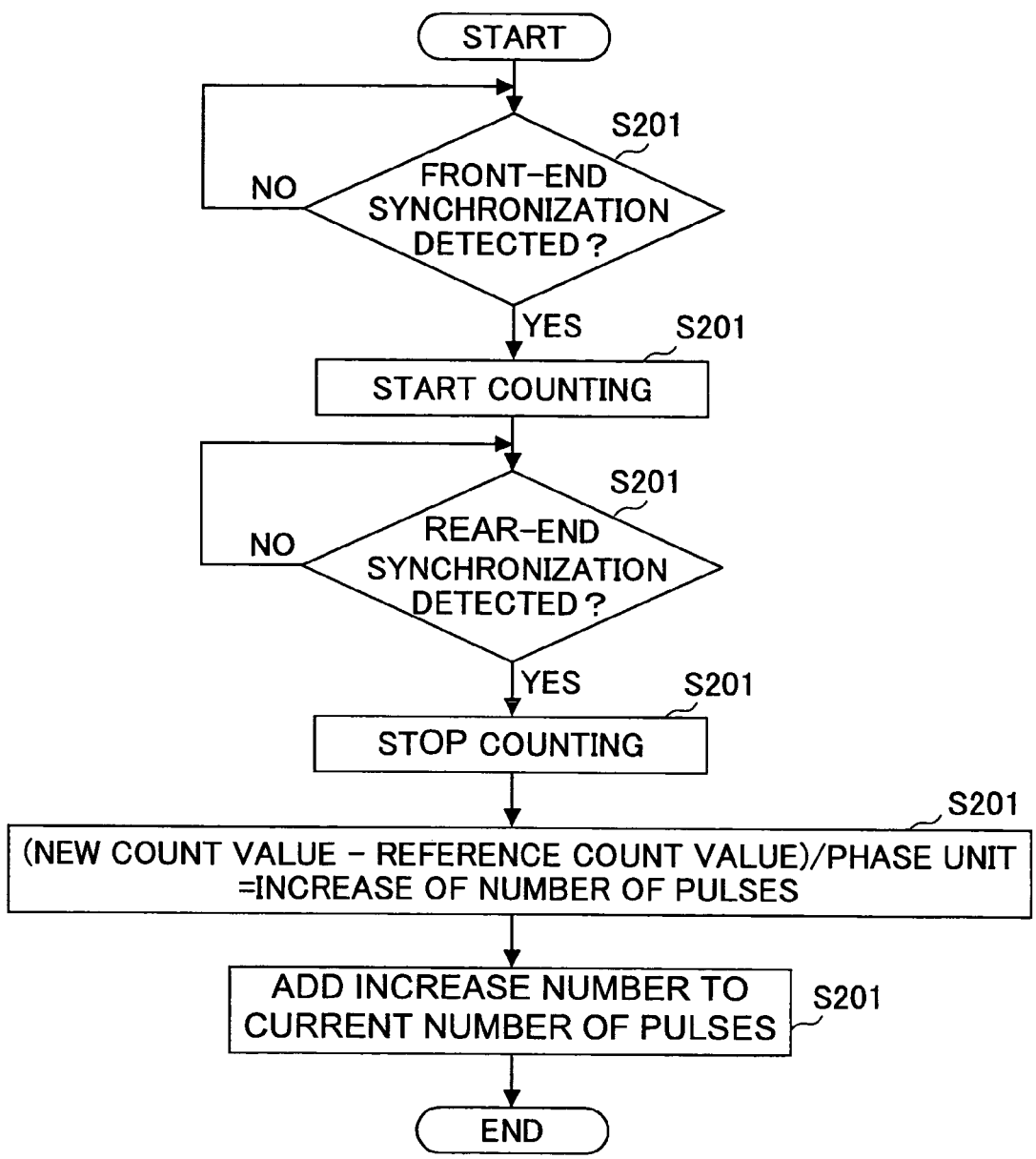
FIG. 17 is a flowchart of a phase adjusting operation of a pixel clock performed by the image forming apparatus according to the second embodiment of the present invention.

A description will now be given, with reference to FIG. 17, of an operation to adjust the phase of the pixel clock clkw0 by the image forming apparatus according to the present embodiment. FIG. 17 is a flowchart of the phase adjusting operation of the pixel clock by the image forming apparatus according to the second embodiment of the present invention.

First, the front-end synchronization detection unit 16 performs a detection operation until a laser beam is detected (No of step S201), and if a first laser beam (the laser beam from the laser light source LD0) is detected (Yes of step S201), the front-end synchronization detection unit 16 outputs the synchronization detection signal detp to the clock generating unit 22a. The clock generating unit 22a generates the clear signal xlclr0 on the basis of the time of the synchronization detection signal detp being input thereto, and outputs the generated clear signal xlclr0 to the scan time measuring unit 25a.

The counter 201 of the scan time measuring unit 25a starts the count of the pixel clock clkw0 on the basis of the time of the clear signal xlclr0 being input thereto (step S202).

The rear-end synchronization detection unit 17 performs a detection operation until a laser beam is detected (No of step S203), and if a first laser beam (the laser beam from the laser light source LD0) is detected (Yes of step S203), the rear-end synchronization detection unit 17 outputs the scan end signal detp0 to the scan time measuring unit 25a. The latch 202 of the scan time measuring unit 25a latches the count value of the counter 201 at the time when the scan end signal edp0 is supplied thereto (step S204). The count value latched at this time indicates the number of pulses of the pixel clock from the time when the clear signal xlclr0 is input to the counter 201 to the time when the scan end signal edp0 is input to the latch 202, that is, the number of pulses of the pixel clock from the time when the laser beam of the laser light source LD0 is incident on the front-end synchronization detection unit 16 to the time when the laser beam of the laser light source LD0 is incident on the rear-end synchronization detection unit 17. The latched count value is retained in the register 24 as the measured value T0.

Next, the CPU 30 computes the number of pulses to be increased or decreased by the pulse train generating unit 21a by using the measured value T0, the reference value Tref and a phase unit retained in the register 24 (step S205). It should be noted that the phase unit is a minimum unit that is capable of increasing or decreasing a phase shift of the pixel clock, and is represented by (frequency of pixel clock)/(frequency of basic clock). For example, in the example shown in FIG. 9, one pixel clock clkw0 includes eight basic clocks clok0. In this case, since the phase control can be performed by a unit of lclko, that is, a unit of 1/8 clock, the phase unit is "1/8".

A description will now be given of a method of computing the number of the output pulses that is increased or decreased by the pulse train generating unit 21a. The CPU 30 calculates (measured value T0−reference value Tref)/(phase unit) so as to compute the number of pulsed to be increased or decreased. For example, if the measured value T0 is "8(clkw)", the reference value is "5(clkw)" and the phase unit is "1/8", the CPU computes as (8−5)×8=24.

The CPU 30 newly sets the setting values prd0 and num0 and writes them in the register 24 so that the pulse train generating unit 21a increases or decreases the number of the output pulses computed (step S206). For example, as mentioned above, since the computed value is positive if the computed value is "24", the CPU 30 newly sets the setting values prd0 and num0 (last num0+computed value (24)) in the register 24 so that the number of output pulses is increased by "24", and outputs the phase progress control signal phase0m to the pulse train generating unit 21a. If the computed value is negative, the CPU 30 newly sets the setting values prd0 and num0 (last num0+computed value (a negative integer) in the register 24 so that the number of output pulses is decreased by "the negative integer", and outputs the phase delay control signal phase0p to the pulse train generating unit 21a.

It should be noted that the CPU 30 newly sets the setting values prd0 and num0, which satisfy the condition "xlclr0 interval>prd0×num0" so that the number num of the output pulses are contained in the interval (one scan period) of the clear signal xlclr0.

The process shown in FIG. 17 may be repeated each time a laser beam is detected by the front-end synchronization detection unit 16 and the rear-end synchronization detection unit 17 (each time the measured value T0 is generated). In such a case, it becomes possible to correct write errors caused by the laser light sources by adjusting the phase of the pixel clock on an individual main-scanning line basis.

Although the phase change operation of the pixel clock clkw has been explained in the above descriptions, the phase change operation of the pixel clock clkw1 can also be performed in the same manner. That is, the setting values prd1 and num1 are set after measuring the number of pixel clocks after the laser beam of the laser light source LD1 is incident on the front-end synchronization detection unit 16 until the laser beam of the laser light source LD1 is incident on the rear-end synchronization detection unit 17.

Moreover, although description has been given in the present embodiment of the case where the image forming apparatus performs a scanning operation using the two laser light sources LD0 and LD1, the number of laser light sources is not limited to two, and more than three laser light sources can be used to perform the scanning operation. In such a case, the image forming apparatus is provided with U scan time measuring units, U laser light source drivers, U pulse train generating units and U clock generating units, where U is an integer greater than two, so that each scan time measuring unit measures a time period from the time when a laser beam of the corresponding laser light source is incident on the front-end synchronization detection unit 16 until the laser beam is incident on the rear-end synchronization detection unit 17. The CPU 30 sets the setting values of each laser light source using the measured values.

As explained above, according to the present embodiment, the measured values T0 and T1 (numbers of pixel clocks) from the time when the laser beams of the laser light sources LD0 and LD1 are detected by the front-end synchronization detection unit 16 until the laser beams are detected by the rear-end synchronization detection unit 17 so as to compute the number of pulses of the pulse xpls0 and xpls1, which are generated and output by the pulse train generating units 21a and 21b, to be increased or decreased in accordance with the measured values T0 and T1. The pulse train generating units 21a and 21b output the external pulse trains xpls0 and xpls1 based on the number of the pulses to be increased or decreased, respectively. Therefore, an operation of an operator to input the setting values prd0, prd1, num0 and num1 can be omitted, and it is possible to easily correct the write magnification difference, which is caused by a difference in wavelength between more than two laser light sources (laser light sources LD0 and LD1). Moreover, even in a case where a write error of the laser light sources occurs due to an environmental fluctuation with time such as a temperature change during operation of the image forming apparatus, the correction of the write error can be performed on an individual scan line basis, which enables formation of an accurate image.

Third Embodiment

In the first embodiment of the present invention, the setting values (setting values prd0, prd1, num0, and num1) are input for each laser light source. On the other hand, in the present embodiment, it is possible to easily correct a write error of each laser light source, even in a case where the image forming apparatus has more than two laser light sources, by merely inputting setting values (an interval of the external pulse train and a number of pulses to be generated) to only one of the laser light sources.

A description will be given below of a structure and an operation of the image forming apparatus according to the present embodiment.

The image forming apparatus according to the present embodiment performs image formation using more than two laser light sources and sharing one optical system. If a write error due to more than two laser light sources is caused by a distortion of a lens in an optical system that is common to the laser light sources, a write magnification difference between more than two laser light sources, that is, the relative reference in the setting values (an interval of the external pulse train and a number of pulses to be generated) does not change due to environmental fluctuations. In such a case, the image forming apparatus is capable of correcting the write error difference of all of the laser light sources by merely inputting the setting values with respect to only one of the laser light sources by storing information indicating relative differences between the setting values of the laser light sources.

Figure 18:
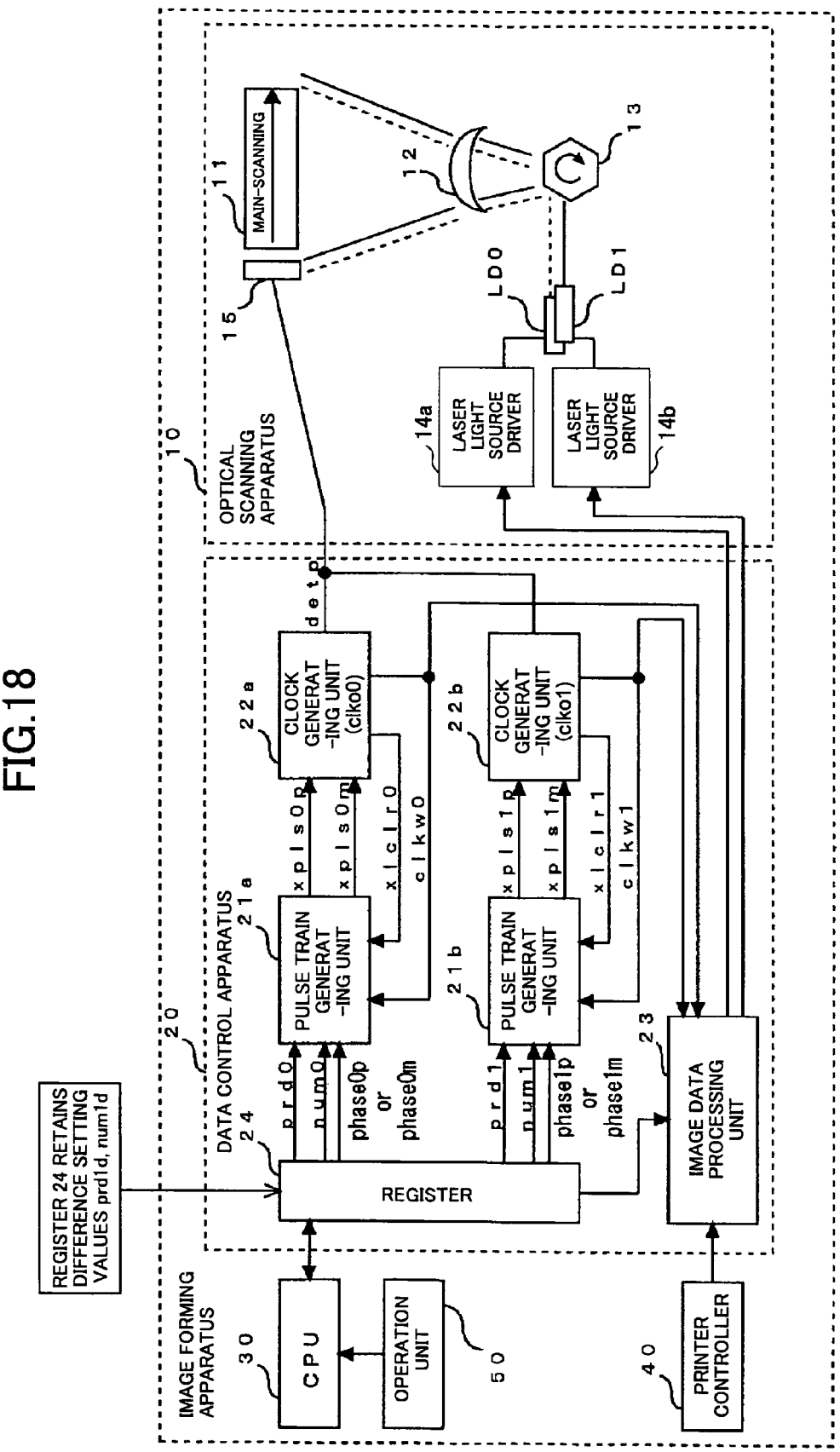
FIG. 18 is a block diagram of an image forming apparatus according to a third embodiment of the present invention.

FIG. 18 is a block diagram of the image forming apparatus according to the third embodiment of the present invention. It should be noted that the structure and operation of the image forming apparatus according to the present embodiment are the same as that of the image forming apparatus according to the above-mentioned first embodiment except for the parts specifically described below.

As shown in FIG. 18, the image forming apparatus comprises an optical scanning apparatus 10, a data control apparatus 20, a CPU 30 serving as scan time comparison means or setting value computation means, a printer controller 40, and an operation unit 50 serving as input means. It should be noted that the structure of the image forming apparatus shown in FIG. 18 is simplified, and the image forming apparatus may have structural parts other than the parts shown in FIG. 18.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14a and 14b, a synchronization detection unit 15 serving as synchronization detection means, and laser light sources LD0 and LD1.

The data control apparatus 20 outputs an image signal for controlling the laser light source drivers 14a and 14b so as to control a laser beam write operation performed by the optical scanning apparatus 10. The data control apparatus 20 comprises pulse train generating units 21a and 21b serving as phase control means, clock generating units 22a and 22b serving as pixel clock generation means, an image data processing unit 23, and a register 24 serving as setting value retaining means.

The register 24 according to the present embodiment retains further setting values for the laser light source LD1 and difference setting values prd1$d$ (setting value prd1 of LD1−setting value prd0 of LD0) and num1$d$ (setting value num1 of LD1−setting value num0 of LD0). That is, the difference setting value prd1$d$ corresponds to a difference in a pulse generation interval (pixel clock number) between the laser light source LD1 and the laser light source LD0, and the difference setting value num1$d$ corresponds to a difference in a number of pulses between the laser light source LD1 and the laser light source LD0. It should be noted that the difference setting values prd1$d$ and num1$d$ are set to integers.

Figure 19:
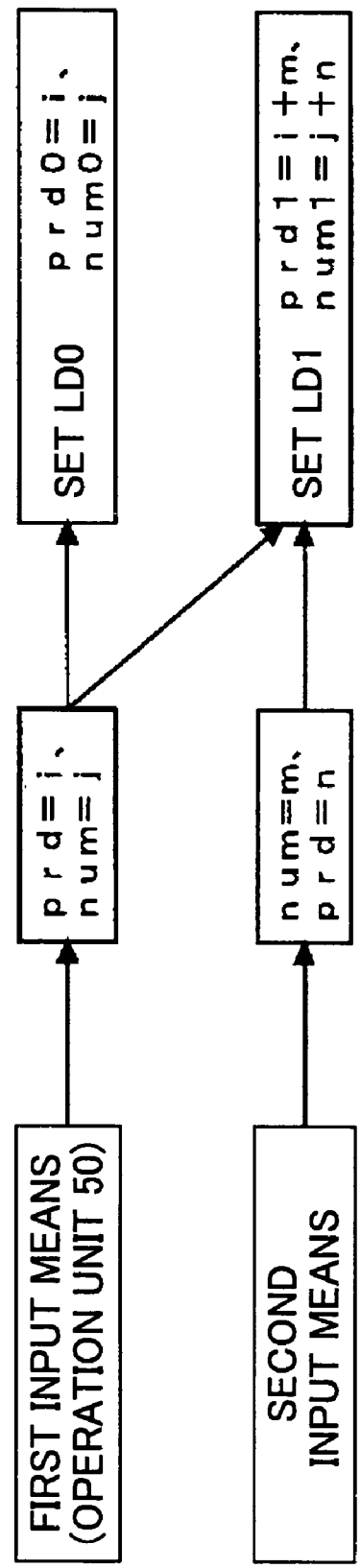
FIG. 19 is an illustration showing a setting operation of setting values of laser light sources according to the third embodiment of the present invention.
Figure 20:
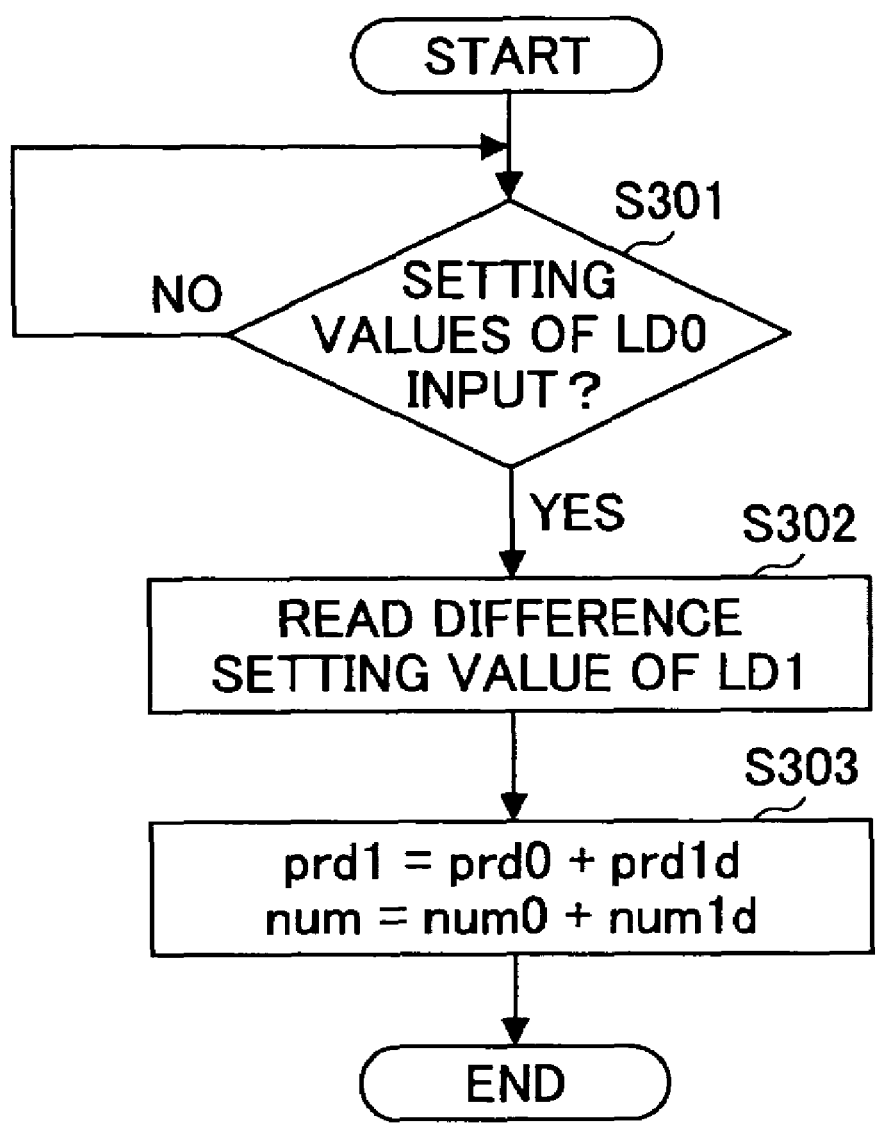
FIG. 20 is a flowchart of the setting operation of the setting values of the laser light sources according to the third embodiment of the present invention.

A description will now be given, with reference to FIGS. 18 through 20, of an operation of setting the setting values of each laser light source in the image forming apparatus according to the third embodiment of the present invention. FIG. 19 is an illustration showing the setting operation of the setting values of the laser light sources LD0 and LD1 according to the third embodiment of the present invention. FIG. 20 is a flowchart of the setting operation of the setting values of the laser light sources LD0 and LD1 according to the third embodiment of the present invention.

First, the operation unit 50 supplies the setting value prd0 (an interval of generation of the external pulse train) of the laser light source LD0, and the setting value num0 (a number of pulses of the external pulse train to be generated) in accordance with an operation of an operator.

The CPU 30 determines whether or not the setting values prd0 and num0 of the laser light source LD0 are supplied (step S301). If it is determined that the setting values prd0 and num0 have not been supplied (No of step S301), the operation of step S301 is repeated.

When the CPU 30 recognizes an input of the setting values prd0 and num0 (Yes of step S201), the CPU 30 reads the difference setting values prd1$d$ and num1$d$ (step S302).

Then, the CPU 30 computes the setting value prd1 of the laser light source LD1 by adding the difference setting value prd1$d$ to the setting value prd0 of the laser light source LD0. Additionally, the CPU 30 computes the setting value num1 of the laser light source LD1 by adding the difference setting value num1$d$ of LD0 to the setting value num0 of the laser light source LD0 (step S303).

Although the image forming apparatus according to the present embodiment uses two laser light sources LD0 and LD1 to perform the scanning operation, the number of laser light sources is not limited to two and three or more laser light sources may be used to perform a scanning operation. In such as case, the image forming apparatus is provided with the laser light driver, the pulse train generating unit and the clock generating unit for each laser light source. Additionally, the register 24 retains the difference setting value with respect to one of the laser light sources for each of the laser light sources so that the CPU 30 sets the setting values to each of the laser light sources by using the difference setting values retained in the register 24.

As mentioned above, according to the present embodiment, information (difference setting values) indicating a relative difference between each of the laser light sources and one reference laser light source is previously stored for each of the laser light sources, and if the setting values of the reference laser light source are input prior to a start of a laser beam scanning, the setting values of other laser light sources are computed and set in accordance with the previously stored difference setting values. Therefore, the setting value of other laser light sources are automatically set merely by setting the setting values of one of the laser light source, and the write magnification difference of each laser light source can be corrected easily.

Fourth Embodiment

An image forming apparatus according to a fourth embodiment of the present invention can be achieved by the image forming apparatus according to the second embodiment of the present invention, which is configured and arranged to be capable of performing the setting operation of the setting values that is performed by the image forming apparatus according to the third embodiment of the present invention.

Figure 21:
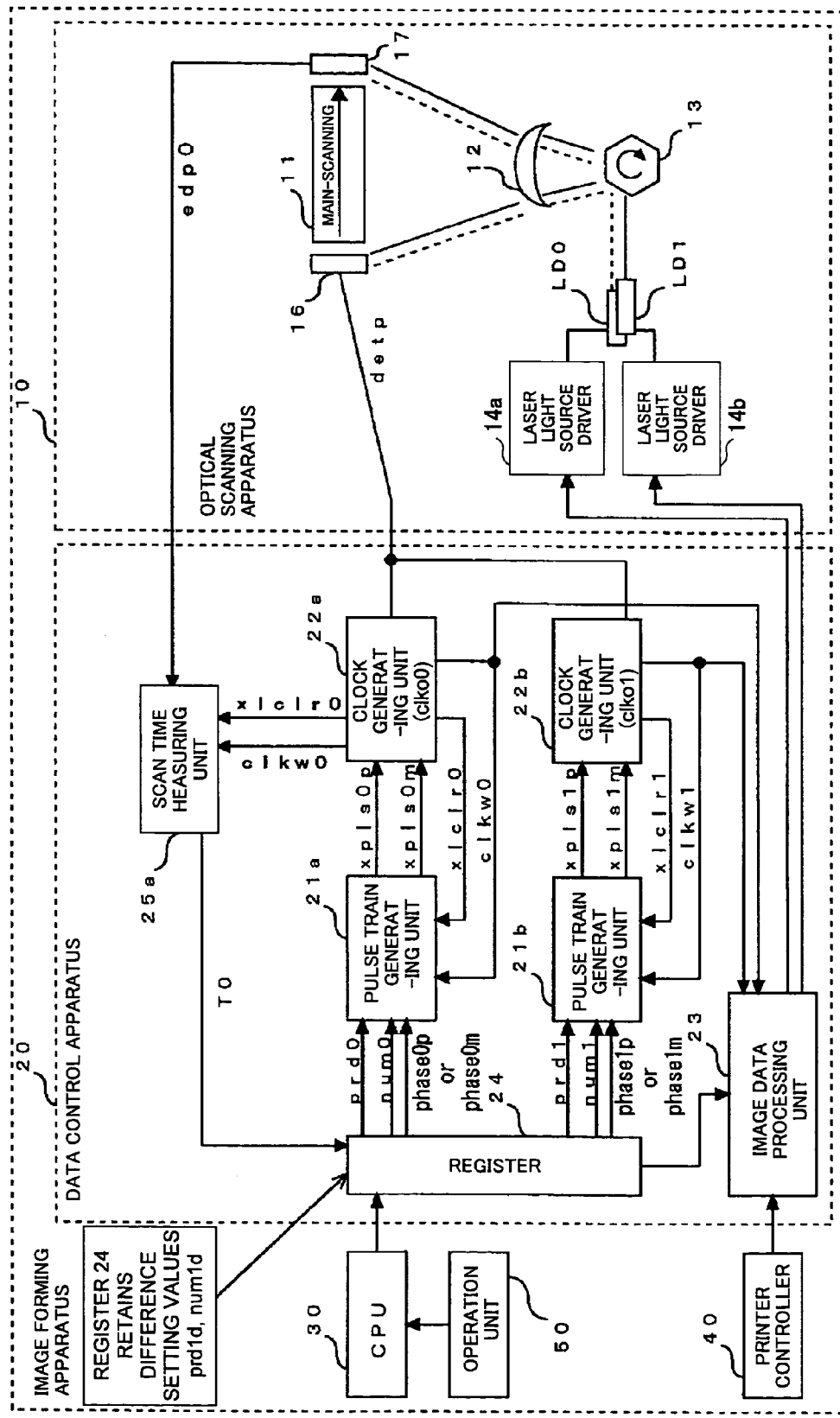
FIG. 21 is a block diagram of an image forming apparatus according to a fourth embodiment of the present invention.

A description will now be given, with reference to FIG. 21, of a structure of the image forming apparatus according to the fourth embodiment of the present invention. FIG. 21 is a block diagram of the image forming apparatus according to the fourth embodiment of the present invention. It should be noted that the structure and operation of the image forming apparatus according to the present embodiment are the same as that of the image forming apparatus according to the second embodiment except for the parts specifically described below.

As shown in FIG. 21, the image forming apparatus comprises an optical scanning apparatus 10, a data control apparatus 20, a CPU 30, a printer controller 40, and an operation unit 50. It should be noted that the structure of the image forming apparatus shown in FIG. 21 is simplified, and the image forming apparatus may have structural parts other than the parts shown in FIG. 21.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14$a$ and 14$b$, a front-end synchronization detection unit 16 and a rear-end synchronization detection unit 17 serving as synchronization detection means, and laser light sources LD0 and LD1.

The data control apparatus 20 outputs an image signal for controlling the laser light source drivers 14$a$ and 14$b$ so as to control a laser beam write operation performed by the optical scanning apparatus 10. The data control apparatus 20 comprises pulse train generating units 21$a$ and 21$b$ serving as phase control means, clock generating units 22$a$ and 22$b$ serving as pixel clock generation means, an image data processing unit 23, a register 24, and a scan time measuring unit 25$a$ serving as scan time measurement measuring means.

The register 24 according to the present embodiment retains, similar to the third embodiment, setting values for the laser light source LD1 and difference setting values prd1$d$ (setting value prd1 of LD1−setting value prd0 of LD0) and num1$d$ (setting value num1 of LD1−setting value num0 of LD0).

Figure 22:
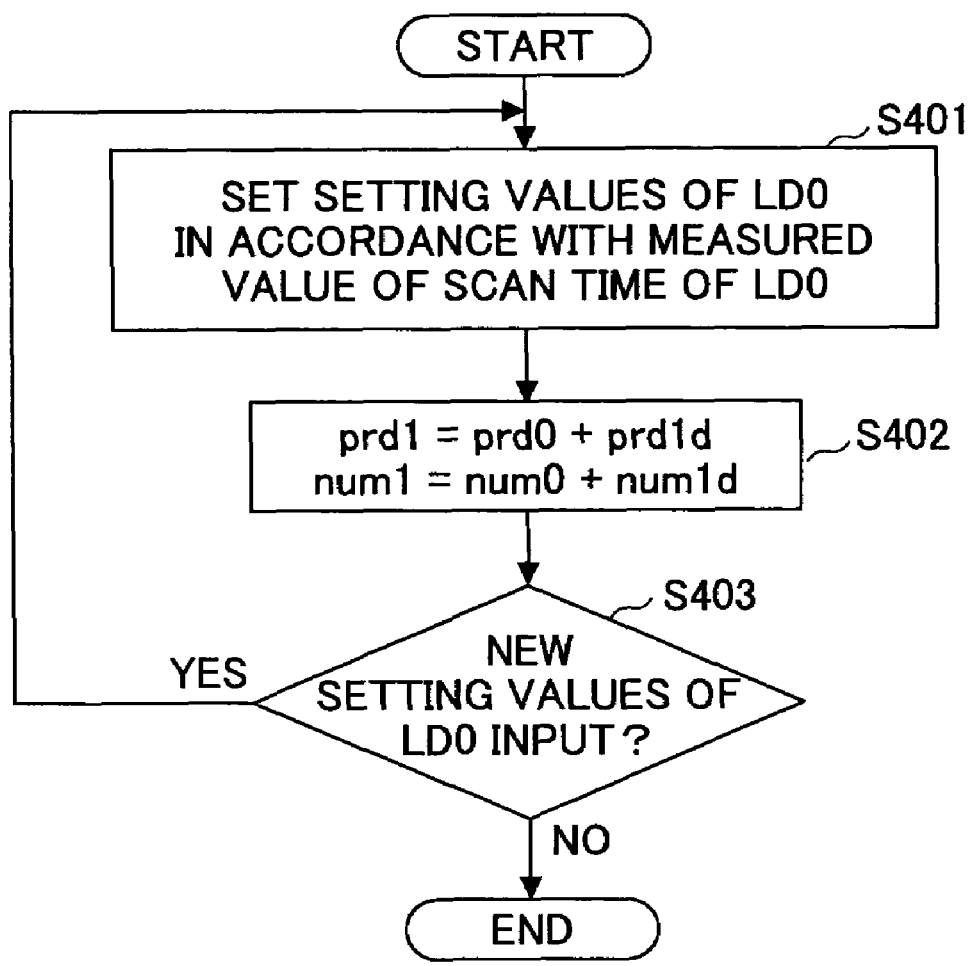
FIG. 22 is a flowchart of a setting operation of the setting values performed by the image forming apparatus according to the third embodiment of the present invention.

A description will now be given, with reference to FIG. 22, of an operation of setting the setting values of the setting values ped0, prd1, num0 and num1 performed by the CPU 30 according to the present embodiment. FIG. 22 is a flowchart of the setting operation of the setting values performed by the image forming apparatus according to the third embodiment of the present invention.

First, the CPU 30 newly sets the setting values prd0 and num0 of the laser light source LD0 in accordance with the measured value T0 that indicates the pixel clock number from the time when the laser beam of the laser light source LD0 is incident on the front-end synchronization detection signal 16 to the time when the laser beam of the laser light source is incident on the rear-end synchronization detection signal 17 (step S401). It should be noted that the process of step S401 can be the same as the process shown in FIG. 18.

Then, the CPU 30 computes the setting values prd1 and num1 of the laser light source LD1 in accordance with the newly set setting values prd0 and num0 of the laser light source LD0 and the difference setting values prd1$d$ and num1$d$ and the phase unit previously retained in the register 24, and writes the setting values prd1 and num 1 in the register 24 (No of step S403).

The CPU 30 newly computes the setting values prd0, prd1, num0 and num1 each time a new measured value T0 is input (Yes of step S403). If there is no input of a new measured value T0 (No of step S403), the setting operation of the setting values is ended.

Although the image forming apparatus according to the present embodiment uses two laser light sources LD0 and LD1 to perform the scanning operation, the number of laser light sources is not limited to two and three or more laser light sources may be used to perform a scanning operation. In such as case, the image forming apparatus is provided with the laser light driver, the pulse train generating unit and the clock generating unit for each laser light source. Additionally, the register 24 retains the difference setting value with respect to one of the laser light sources for each of the laser light sources so that the CPU 30 sets the setting values to each of the laser light sources by using the difference setting values retained in the register 24.

As explained above, according to the present embodiment, the measured value T0 (pixel clock number) from the time when the laser beams of the laser light source LD0 is detected by the front-end synchronization detection unit 16 until the laser beam is detected by the rear-end synchronization detection unit 17 is measured so as to set the setting values prd0 an dnum0 of the laser light source LD0 by using the measured value T0 and control the number of pulses of the pulse xpls0 output by the pulse train generating unit 21a.

Then, the number of pulses of the pulse xpls1, which is generated and output by the pulse train generating units 21b, is computed in accordance with the difference setting values prd1d and num1d, the setting values prd0 and num0 of the laser light source LD0 and the phase unit previously retained in the register 24 so at to control the number of pulses of the pulse xpls1 output by the pulse train generating unit 21b.

Therefore, an operation of an operator to input the setting values prd0, prd1, num0 and num1 can be omitted, and it is possible to easily correct the write magnification difference, which is caused by a difference in wavelength between more than two laser light sources (laser light sources LD0 and LD1). Moreover, even in a case where a write error of the laser light sources occurs due to an environmental fluctuation with time such as a temperature change during operation of the image forming apparatus, the correction of the write error can be performed on an individual scan line basis, which enables formation of an accurate image.

Moreover, the laser beam of only one of the laser light sources (laser light source LD0) is detected by the front-end synchronization detection unit 16 and the rear-end synchronization detection unit 17 so as to correct the write error, and write errors of other laser light sources are corrected according to program processing using the difference setting values previously retained in the register 24. Therefore, only one scan time measuring unit is provided (that is, there is no need to provide a number of scan time measuring units corresponding to a number of laser light sources), which achieves an easy correcting process of write errors.

Fifth Embodiment

If a phase change of the pixel clock is repeatedly performed at the same position in the main-scanning direction, there may occur a case in which a highly visible pattern such as a line extending in the longitudinal direction (sub-scanning direction) is formed in an output image (final image). The image forming apparatus according to the fifth embodiment of the present invention prevents formation of the above-mentioned highly visible pattern by varying the position in the main-scanning direction at which the phase change of the pixel clock is performed.

Figure 23:
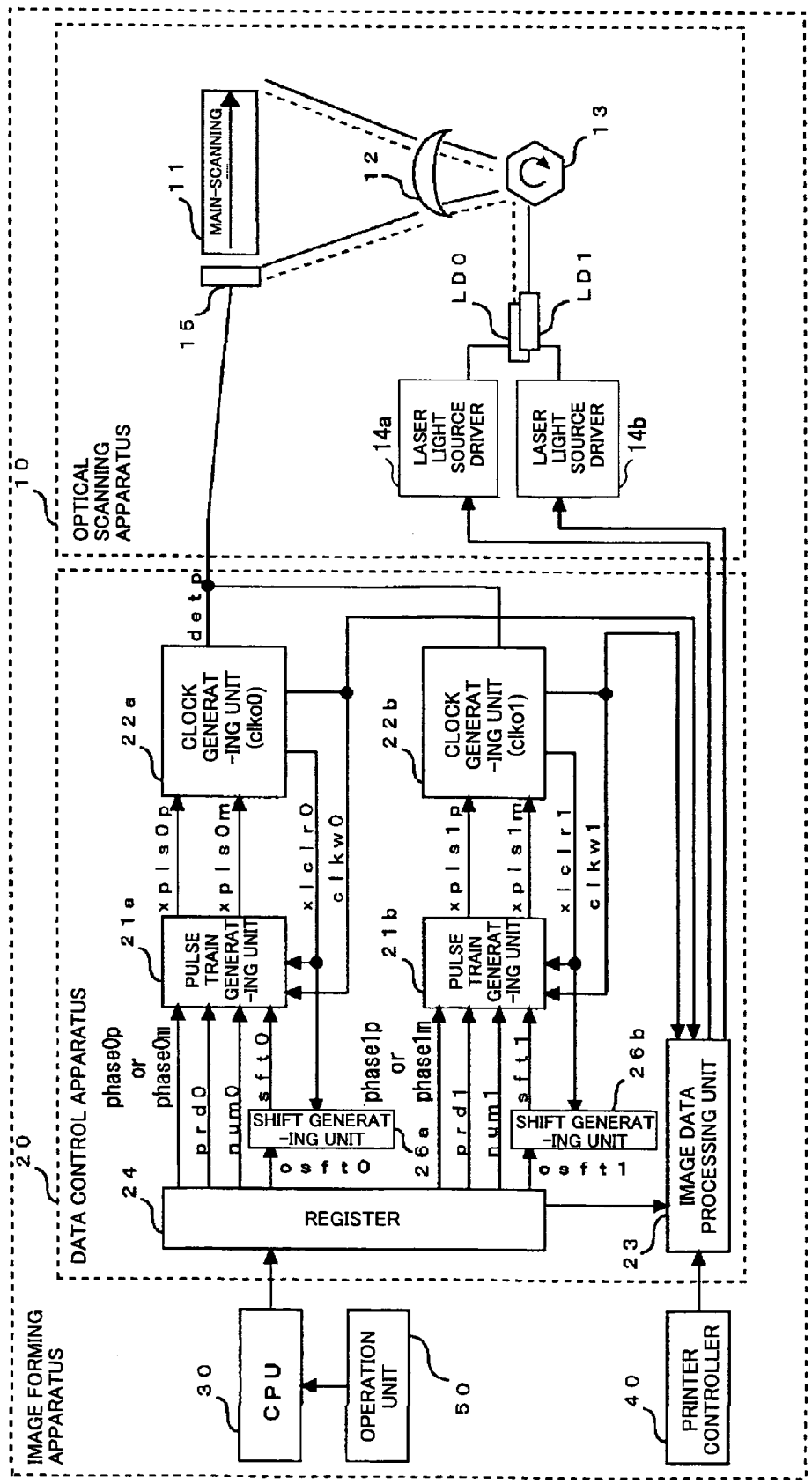
FIG. 23 is a block diagram of an image forming apparatus according to a fifth embodiment of the present invention.

A description will now be given, with reference to FIG. 23, of a structure of the image forming apparatus according to the fifth embodiment of the present invention. FIG. 23 is a block diagram of the image forming apparatus according to the fifth embodiment of the present invention. It should be noted that the structure and operation of the image forming apparatus according to the present embodiment are the same as that of the image forming apparatus according to the first embodiment except for the parts specifically described below.

As shown in FIG. 23, the image forming apparatus comprises an optical scanning apparatus 10, a data control apparatus 20, a CPU 30, a printer controller 40, and an operation unit 50. It should be noted that the structure of the image forming apparatus shown in FIG. 23 is simplified, and the image forming apparatus may have structural parts other than the parts shown in FIG. 23.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14a and 14b, a synchronization detection unit 15 as synchronization detection means, and laser light sources LD0 and LD1.

The data control apparatus 20 outputs an image signal for controlling the laser light source drivers 14a and 14b so as to control a laser beam write operation performed by the optical scanning apparatus 10. The data control apparatus 20 comprises pulse train generating units 21a and 21b serving as phase control means, clock generating units 22a and 22b serving as pixel clock generation means, an image data processing unit 23, a register 24, and shift generating units 26a and 26b.

The CPU 30 is a microcomputer comprising a central processing unit, a program ROM, etc., and generally controls an engine unit (a main part of the image forming apparatus) including the optical scanning apparatus 10 and the data control apparatus 20. The CPU 30 outputs information input from the operation unit 15, and sets the information in the register 24. The CPU 30 serves as scan time comparison means and setting value computation means.

The printer controller 40 sends image data of a page unit to the image data processing unit 23 for each line (one scan line) as an image signal (video signal)

The register 24 according to the present embodiment retains initial shift setting values osft0 and osft1, which are previously set by the CPU 30.

Additionally, the image forming apparatus according to the present embodiment has the shift generating units 26a and 26b in addition to the structure of the image forming apparatus according to the first embodiment of the present invention. The shift generating units 26a and 26b generate shift signals sft0 and sft1 by using the above-mentioned initial shift setting values osft0 and osft1 for changing positions of the phase change of the pixel clocks clkw0 and clkw1, respectively, and outputs the shift signals sft0 and sft1 to the respective pulse train generating units 21a and 21b.

Figure 24:
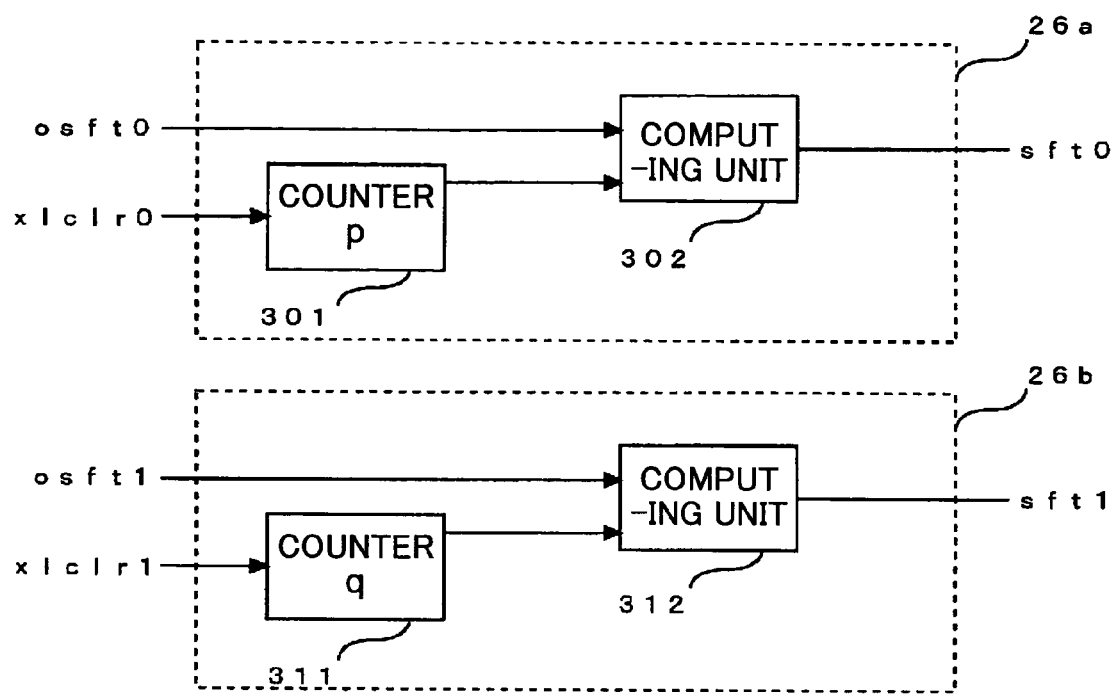
FIG. 24 is a block diagram of shift generating units according to the fifth embodiment of the present invention.

A description will now be given, with reference to FIG. 24, of a structure and an operation of the shift generating units 26a and 26b according to the fifth embodiment of the present invention. FIG. 24 is a block diagram of the shift generating units 26a and 26b according to the fifth embodiment of the present invention.

The shift generating unit 26a comprises a counter 301 and a computing unit 302. The counter 301 counts up or increments (+1) a count value p each time the clear signal xlclr0 is supplied from the clock generating unit 22a. That is, the counter 301 counts a number of lines extending in the sub-scanning direction (number of times of the main scanning), and outputs the count value p. The computing unit 302 computes the shift signal sft0 by applying an arithmetic process to the initial shift signal (initial shift setting value) sft0 supplied from the register 24 in accordance with the count value p supplied by the counter 301, and outputs the shift signal sft0 to the pulse generating unit 21a.

The shift generating unit 26b comprises a counter 311 and a computing unit 312. The counter 311 counts up or increments (+1) a count value q each time the clear signal xlclr1 is supplied from the clock generating unit 22b. That is, the counter 311 counts a number of lines extending in the sub-scanning direction (number of times of the main scanning), and outputs the count value q. The computing unit 302 computes the shift signal sft1 by applying an arithmetic process to the initial shift signal (initial shift setting value) sft1 supplied from the register 24 in accordance with the count value q supplied by the counter 311, and outputs the shift signal sft1 to the pulse generating unit 21b.

Figure 25:
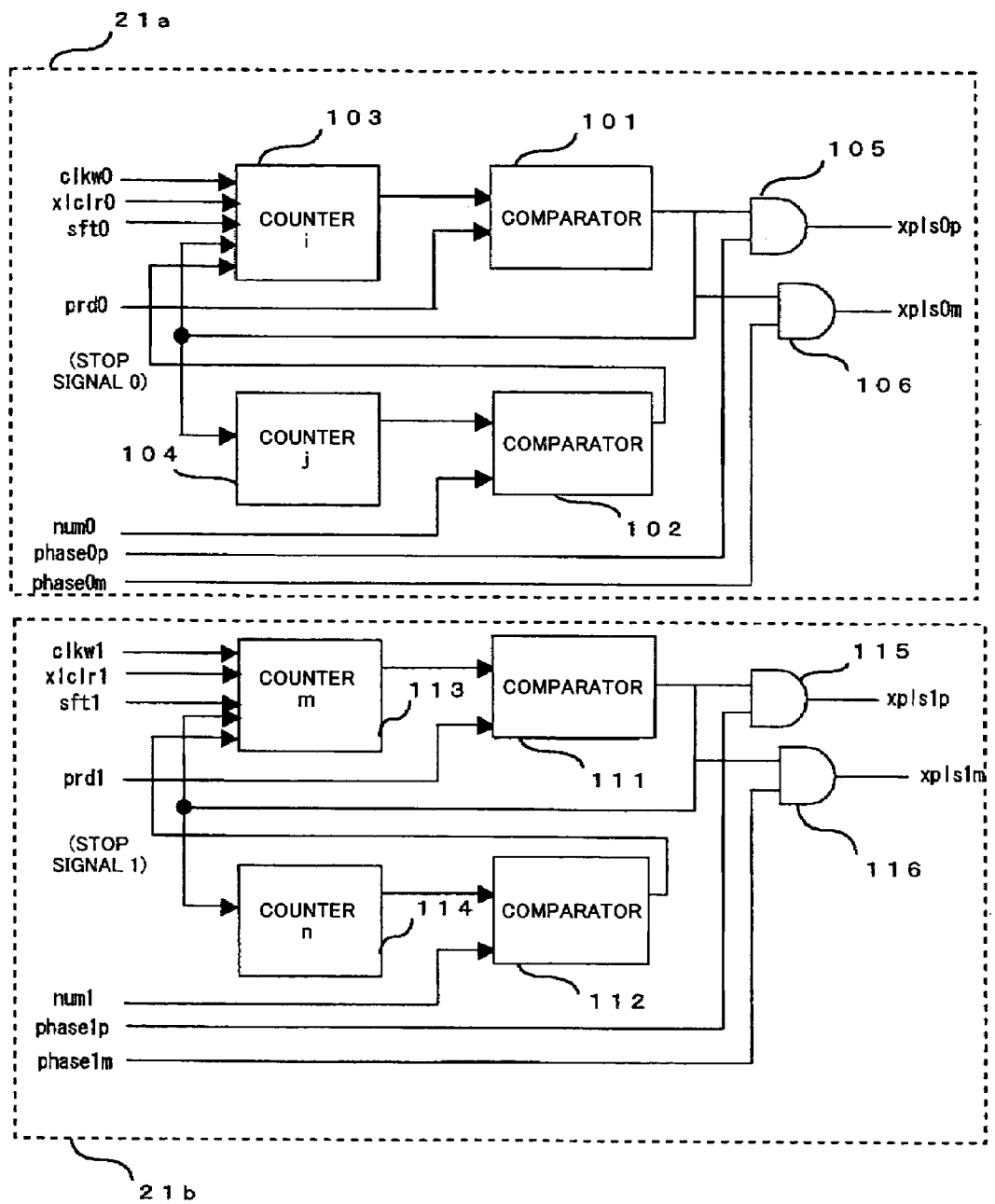
FIG. 25 is a block diagram of pulse train generating units according to the fifth embodiment of the present invention.

A description will now be given, with reference to FIG. 25, of a structure and an operation of the pulse train generating units 21a and 21b according to the fifth embodiment of the present invention. FIG. 25 is a block diagram of the pulse train generating units 21a and 21b according to the fifth embodiment of the present invention. It should be noted that the structure and the operation of the pulse train generating units 21a and 21b according to the present embodiment are the same as that of the first embodiment except for the parts specifically described below.

The pulse train generating unit 21a comprises comparators 101 and 102, counters 103 and 104, and AND circuits 105 and 106. The pulse train generating unit 21b comprises comparators 111 and 112, counters 113 and 114, and AND circuits 115 and 116.

The present embodiment differs from the first embodiment in that the shift signals sft0 and sft1 are input to the counters 103 and 113 from the shift generating units 26a and 26b, respectively. The output timings of the external pulse trains xpls0 and xpls1 from the pulse train generating units 21a and 21b are shifted (delayed) by the shifts values SFT0 and SFT1, respectively, by the counters 103 and 113 delaying a start of the counting operation on the pixel clocks clkw0 and clkw1 by shift values SFT0 and SFT1, which are indicated by the input shift signals sft0 and sft1, respectively.

A description will be given below of a shifting operation on the external pulse trains xpls0 and xpls1. Here, it is supposed that there is the following relationship between the interval of xlclr0, the interval prd0 of generation of the pulse xpls0, the number num0 of the pluses of the pulse xpls0 and the amount of shift (here, indicated by "SFT0") indicated by the shift signal sft0.

Interval of xlclr0>prd0×num0+SFT0 Accordingly, the amount of shift SFT0 is smaller than (xlclr0 interval−prd0×num0). If a process of shifting the external pulse train xpls0 for each line (one scan line) is performed, and produce a pattern in which the process of shifting is repeated four times and then return to the original external pulse train xpls0, the CPU 30 sets the initial shift setting value osft0 in the shift register 24 as data (xlclr0 interval−prd0×num0)×1/4.

The computing unit 302 outputs the shift signal sft0 each time the counter 301 counts up the count value p (+1). In this example, a product of the count value p and the initial setting value osft0 is computed each time the count up occurs.

Figure 26:
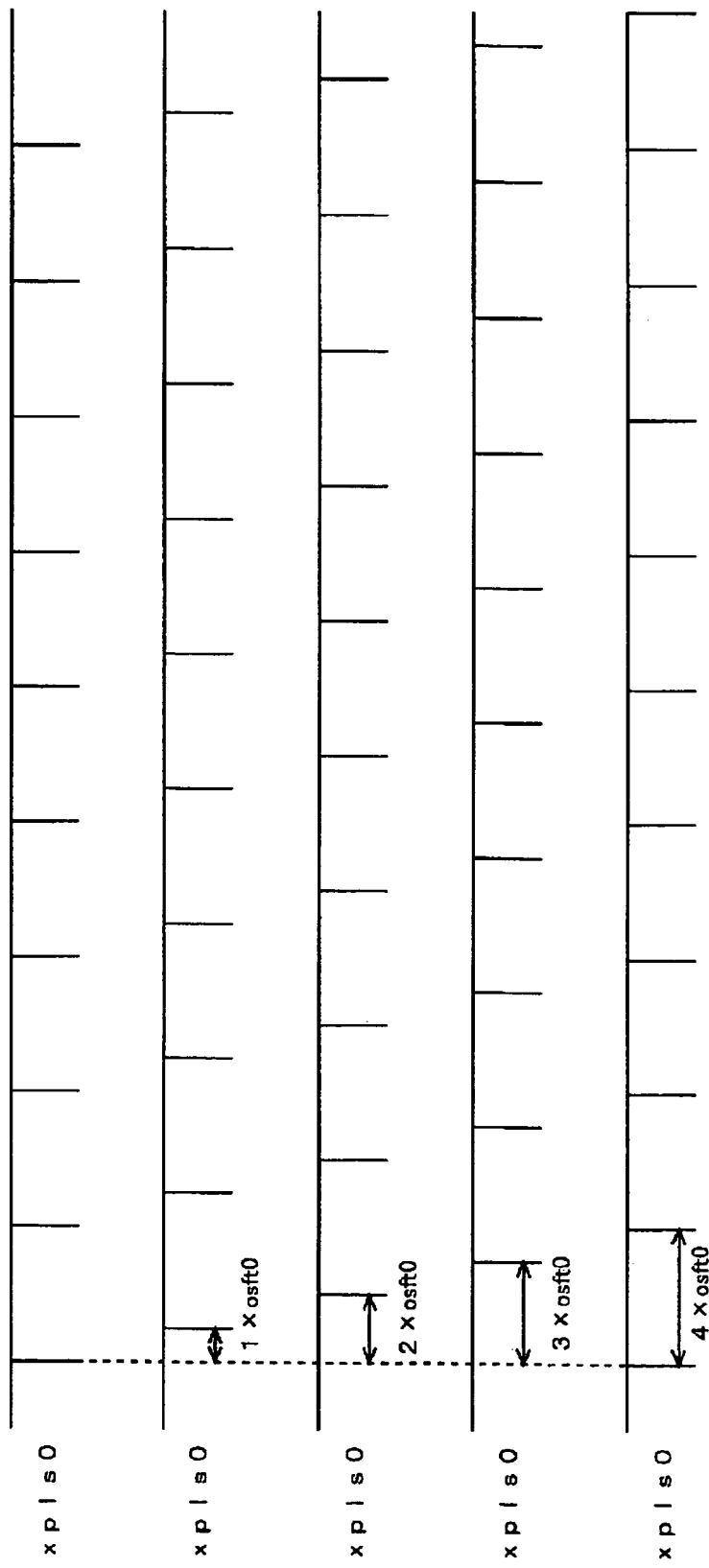
FIG. 26 is a time chart showing an expel of a shift of an external pulse train.

FIG. 26 is a time chart showing a shift of the external pulse train xpls0 in a case where the initial shift setting value osft0 is set to (xlclr0 interval−prd0×num0)×1/4 in the fifth embodiment of the present invention. As shown in FIG. 26, osft0 is output as the shift signal sft0 for a first count-up (p=1), twice the value of osft0 is output as the shift signal sft0 for a second count-up (p=2), three times the value of osft0 is output as the shift signal sft0 for a third count-up (p=3), and four times the value of osft0 is output as the shift signal sft0 for a fourth count-up (p=4). Then, if the count value p supplied from the counter 301 becomes equal to "5", that is, if the product of the count value p and osft0 exceeds (xlclr interval−prd0×num0), the count value of the counter 301 is cleared (reset) to "0", and, thus, the amount of shift indicated by the shift signal sft0 is set to "0" so as to repeat the above-mentioned operation.

Thus, the pulse train generating unit 21a can sequentially output the external pulse train xpls0 of which phase is shifted by the value of the shift signal sft0 for each line.

The case where the initial shift setting value osft0 is set to (xlclr0 interval−prd0×num0)×1/4 has been explained above.

A description will be given below, as another example, of a case where the initial shift setting value osft0 is set to (xlclr0 interval−prd0×num0)×3/7.

Figure 27:
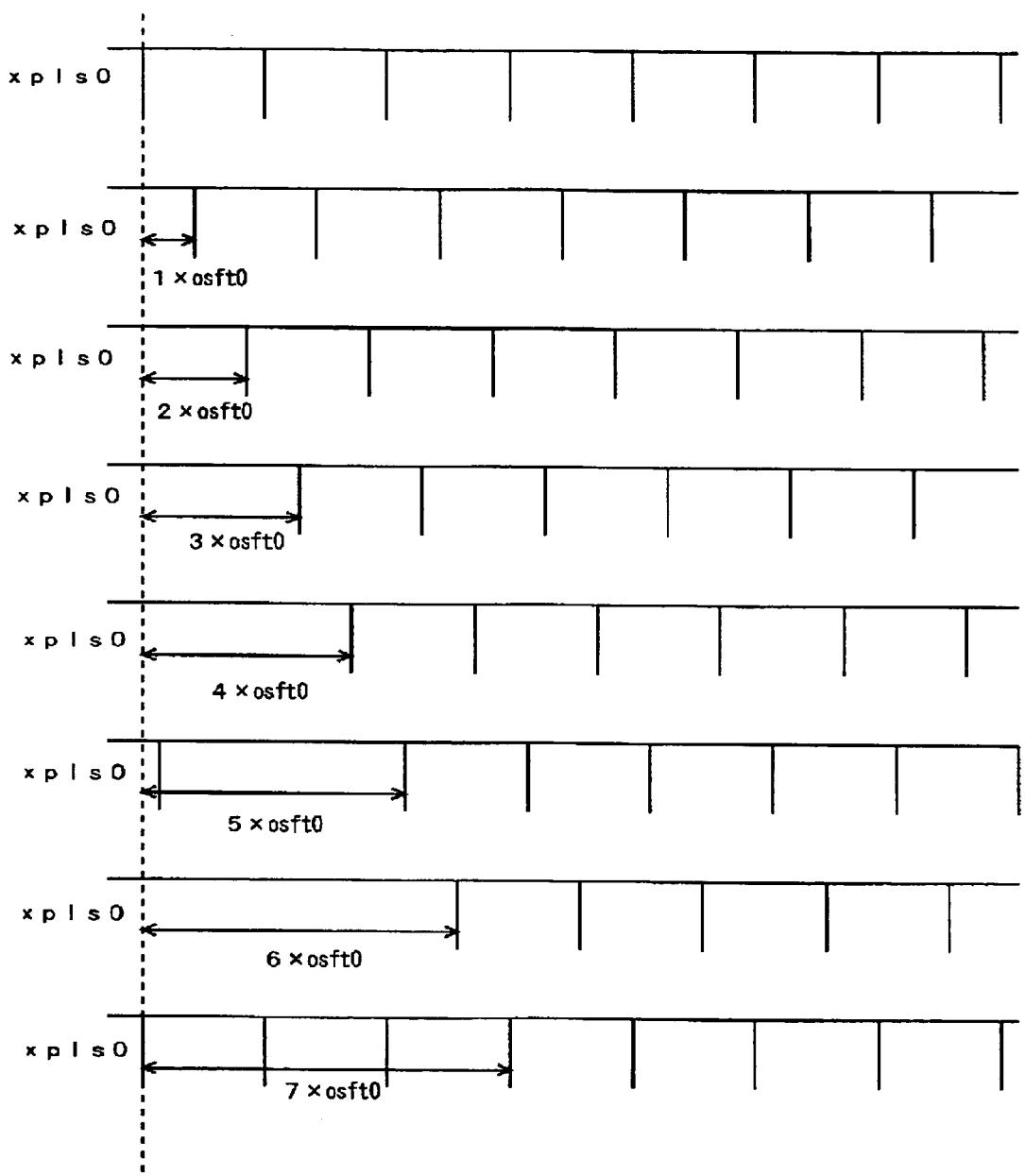
FIG. 27 is a time chart showing another example of a shift of the external pulse train.

FIG. 27 is a time chart showing a shift of the external pulse train xpls0 in a case where the initial shift setting value osft0 is set to (xlclr0 interval−prd0×num0)×3/7 in the fifth embodiment of the present invention. As shown in FIG. 27, osft0 is output as the shift signal sft0 for a first count-up (p=1), twice the value of osft0 is output as the shift signal sft0 for a second count-up (p=2), three times the value of osft0 is output as the shift signal sft0 for a third count-up (p=3), and goes on. Here, when three times the value of osft0 (osft0×3) is set to (xlclr0 interval−prd0×num0)×9/7, it exceeds (xlclr interval−prd0×num0). In this case, since the count value p of the counter 301 is cleared (reset) to "0" when the value of osft0×n exceeds (xlclr interval−prd0×num0), the amount of shift indicated by the shift signal sft0 is set to (xlclr0 interval−prd0×num0)×2/7 so as to continue the shifting operation.

As mentioned above, the count value p of the counter 301 is cleared to "0" when (xlclr0 interval−prd0×num0) exceeds (or matches) the value of the product of the count value p and the initial shift setting value osft0. Thus, when the initial shift setting value osft0 is set to (xlclr0 interval−prd0×num0)×3/7, the shift value is sequentially set to the following values:

(xlclr0 interval−prd0×num0)×3/7 (p=1);
(xlclr0 interval−prd0×num0)×6/7 (p=2);
(xlclr0 interval−prd0×num0)×2/7 (p=3);
(xlclr0 interval−prd0×num0)×5/7 (p=4);
(xlclr0 interval−prd0×num0)×1/7 (p=5);
(xlclr0 interval−prd0×num0)×4/7 (p=6); and
(xlclr0 interval−prd0×num0)×7/7 (p=7), at which the value is cleared to "0".

As mentioned above, if the initial shift setting value osft0 is set to (xlclr0 interval−prd0×num0)×A/B (A and B are prime numbers), the pulse generating timing of the external pulse train returns to the original generating timing (p=0 or q=0) when the count value p (or q) becomes equal to B. Therefore, as the denominator "B" is set to a larger number, the number of lines in the sub-scanning direction after the shift is started and until the shift is returned to the pattern of the original external pulse train xpls0 can be larger. Therefore, if a pattern formed in the output image due to the phase change of the pixel clock is highly visible, it can be made to invisible by setting the above-mentioned number "B" to a larger number by using the operation unit 50, thereby improving the image quality.

Although the image forming apparatus according to the present embodiment uses the two laser light beams LD0 and LD1, the number of laser light sources is not limited to two and U laser light sources (U is an integer greater than 2) may be used. In such as case, the shift generating unit for generating the shift value is provided for each laser light source so as to shift the output timing of the external pulse train for changing the phase of the laser beam of each laser light source. Additionally, the register 24 retains the initial shift setting value for each laser light source.

Moreover, although the present embodiment corresponds to the image forming apparatus according to the first embodiment, which is provided with an additional function (structure) of shifting the output timing of the external pulse train, such a function (structure) may be provided to the image forming apparatus according to the second embodiment or the fourth embodiment.

In the present embodiment, the image forming apparatus can shift the timing to perform the phase change of the laser beam of each laser light source for each scan of the laser beam so as to vary the timing, and, thus, the write magnification correction is more effective in a case of a plurality of lines. That is, formation of a pattern such as a highly visible line in an output image (side effects which are highly visible in the output image) can be positively prevented. Therefore, an image design can be performed more in real size, and it becomes possible to further improve an image quality.

Sixth Embodiment

In the image forming apparatus according to the first embodiment of the present invention, the interval prd0 and prd1 of generation of the pulses of the external pulse trains and the number num0 and num1 of the pulses of the external pulse trains are set over an entire main-scanning line. On the other hand, in an image forming apparatus according to a sixth embodiment of the present invention, 1 main-scanning line is divided into a plurality of sections so that an interval of generation of pulses and a number of pulses of the external pulse train are set on an individual section basis.

Figure 28:
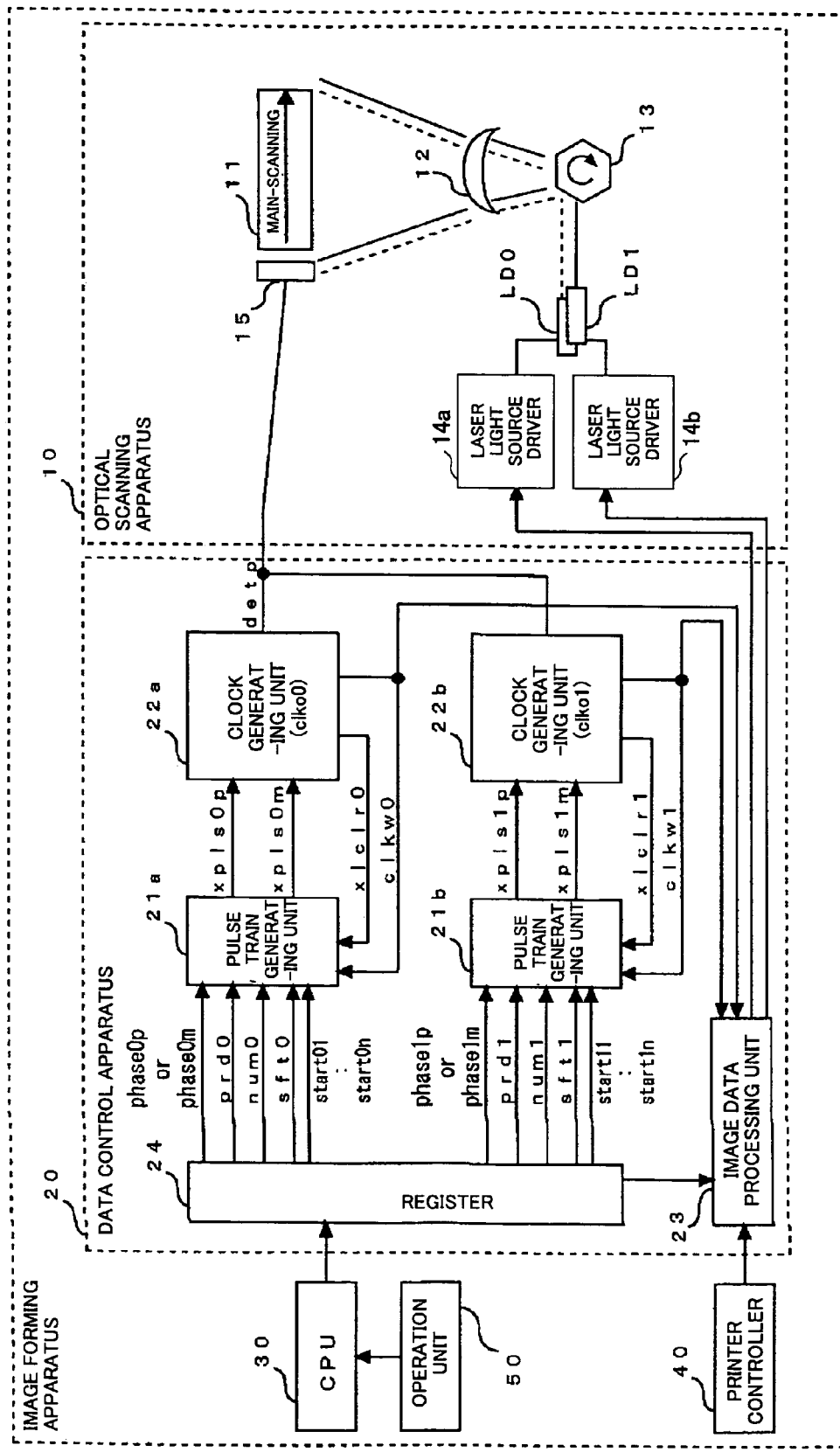
FIG. 28 is a block diagram of an image forming apparatus according to a sixth embodiment of the present invention.

A description will now be given, with reference to FIG. 28, of a structure of the image forming apparatus according to the sixth embodiment of the present invention. FIG. 28 is a block diagram of the image forming apparatus according to the sixth embodiment of the present invention. It should be noted that the structure and operation of the image forming apparatus according to the present embodiment are the same as that of the image forming apparatus according to the first embodiment except for the parts specifically described below.

As shown in FIG. 28, the image forming apparatus comprises an optical scanning apparatus 10, a data control apparatus 20, a CPU 30, a printer controller 40, and an operation unit 50. It should be noted that the structure of the image forming apparatus shown in FIG. 28 is simplified, and the image forming apparatus may have structural parts other than the parts shown in FIG. 28.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14a and 14b, a synchronization detection unit 15 as synchronization detection means, and laser light sources LD0 and LD1.

The data control apparatus 20 outputs an image signal for controlling the laser light source drivers 14a and 14b so as to control a laser beam write operation performed by the optical scanning apparatus 10. The data control apparatus 20 comprises pulse train generating units 21a and 21b serving as phase control means, clock generating units 22a and 22b serving as pixel clock generation means, an image data processing unit 23, a register 24, and shift generating units 26a and 26b.

Figure 29:
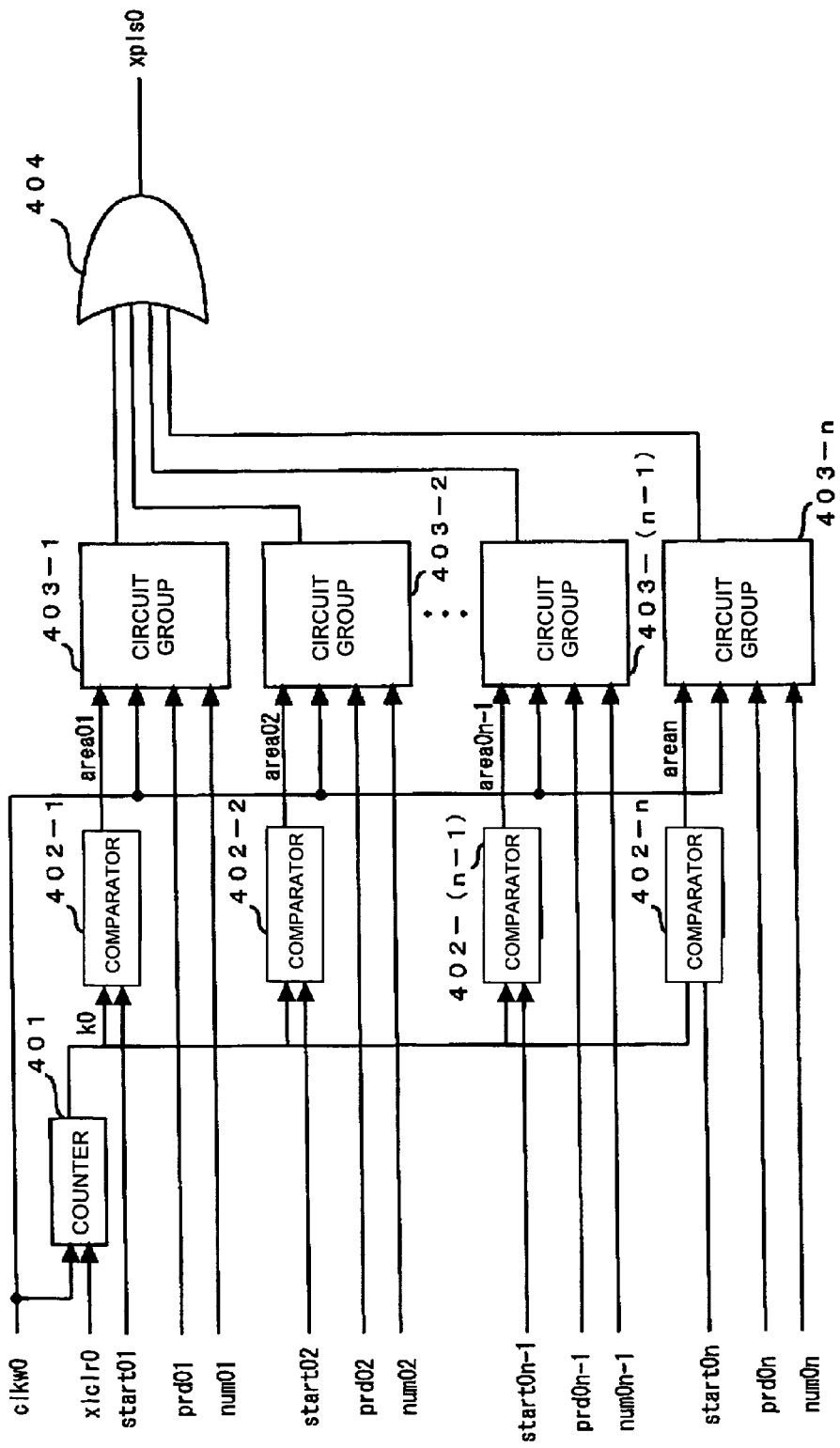
FIG. 29 is a circuit diagram of a pulse generating unit according to the sixth embodiment.
Figure 30:
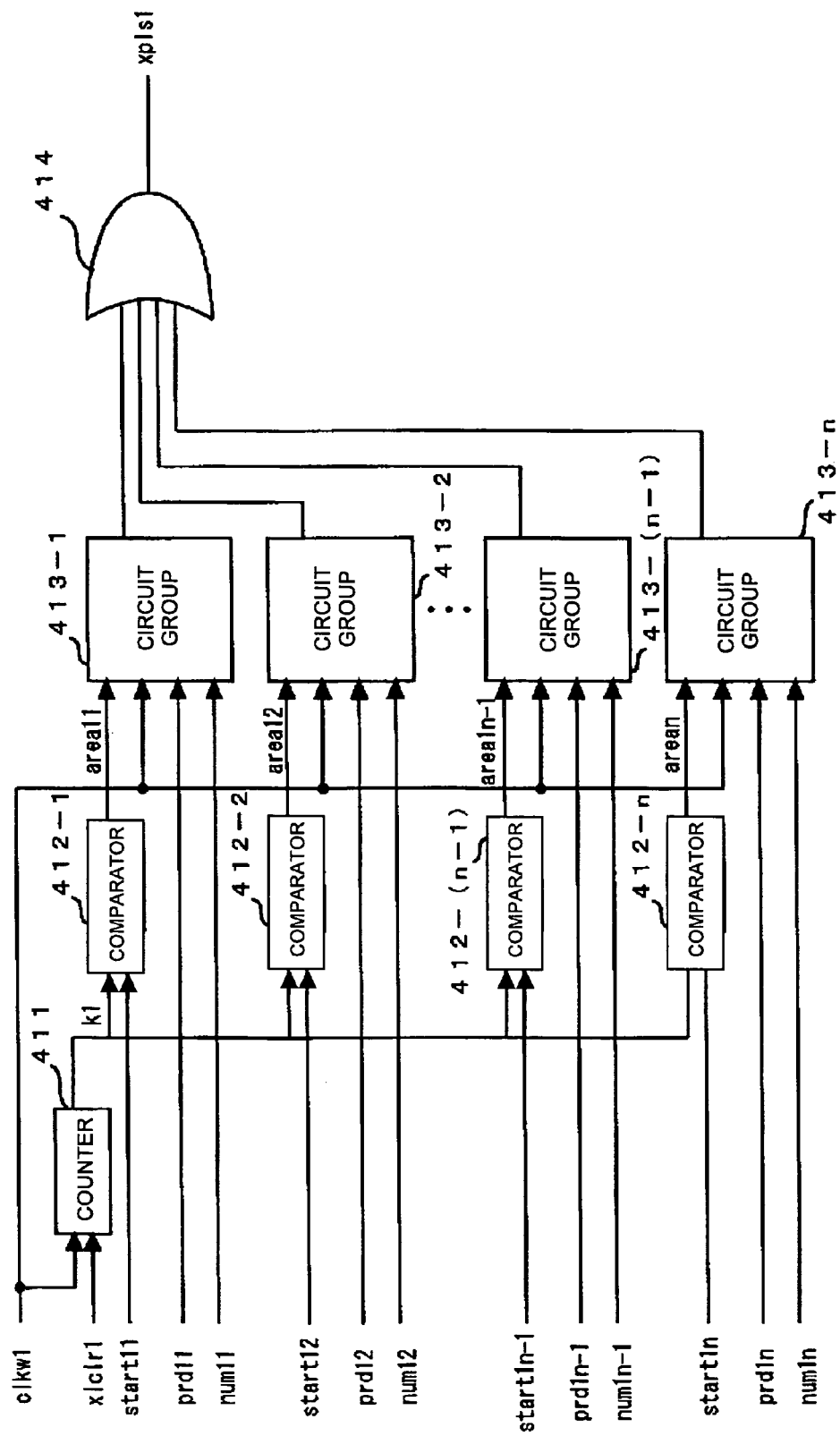
FIG. 30 is a circuit diagram of another pulse generating unit according to the sixth embodiment.

FIG. 29 is a circuit diagram of the pulse train generating unit 21a according to the sixth embodiment of the present invention. FIG. 30 is a circuit diagram of the pulse train generating unit 21b according to the sixth embodiment of the present invention. The structures and operations of the pulse train generating unit 21a and the pulse train generating unit 21b are the same with each other, and hear the structure and operation of the pulse train generating unit 21a will be described below with reference to FIG. 29.

The pulse train generating unit 21a shown in FIG. 29 comprises a counter 401; L comparators 402-1, 402-2, ..., 402-(L-1), and 402-L; L circuit groups 403-1, 403-2, ..., 403-(L-1), and 403-L; and an OR-circuit 404. The counter 401 receives the clear signal xlclr0 generated from the synchronization detection signal detp by the clock generating unit 22a, counts the number of the pixel clocks clkw0 on the basis of the input time, and outputs a count value k0. The count value k0 is used so as to divide 1 scanning period defined by the polygon mirror 13 into a plurality of periods and to set each period as a divided period.

The comparators 402-1, 402-2, ..., 402-(L-1), and 402-L are previously provided with start point values (a first start point value to an Lth start point value) of the divided periods (a first divided period to an Lth divided period) so as to compare the count value k0 with the start point values, respectively, and outputs a corresponding one of area signals (a first area signal to an Lth area signal) when the count value k0 reaches each of the start values. The start value of each of the divided periods is set according to start point signals (a first start point signal to an Lth start point signal) supplied by the CPU 30 to the respective comparators 402-1, 402-2, ..., 402-(L-1), and 402-L.

For example, the comparator 402-1 compares the count value k0 of the counter 401 with the start point value (first start point value) of the first divided period, and outputs the first area signal area01 when the count value k0 reaches the first start point value (start01). Similarly, the comparator 402-2 compares the count value k0 of the counter 401 with the start point value (second start point value) of the second divided period, and outputs the second area signal area02 when the count value k0 reaches the second start point value (start02).

Figure 1:
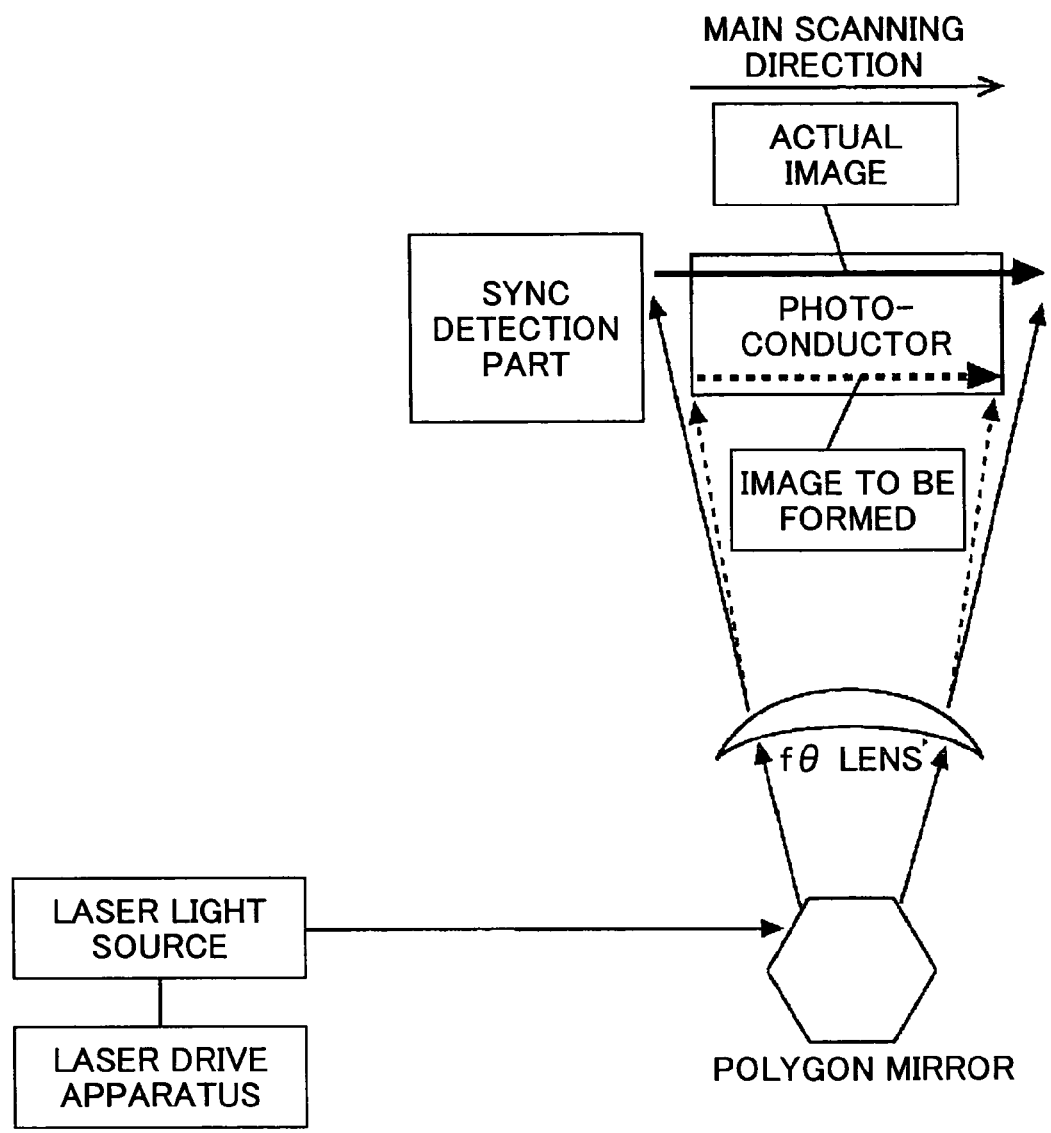
FIG. 1 is an illustration for explaining an image forming operation performed by an image forming apparatus using a conventional laser beam method.
Figure 2:
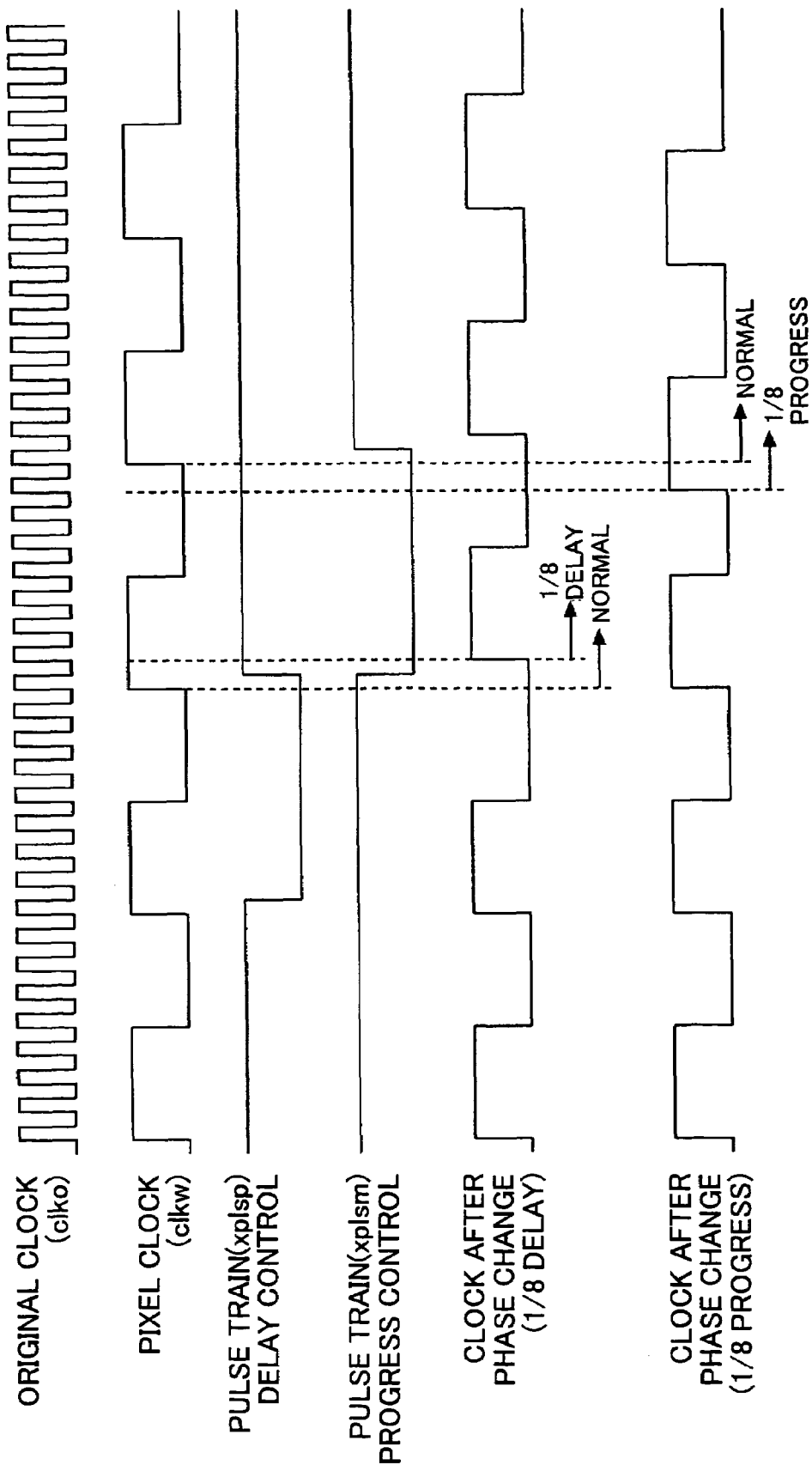
FIG. 2 is a timing chart showing a relationship between a conventional pixel clock and a phase change thereof.
Figure 3:
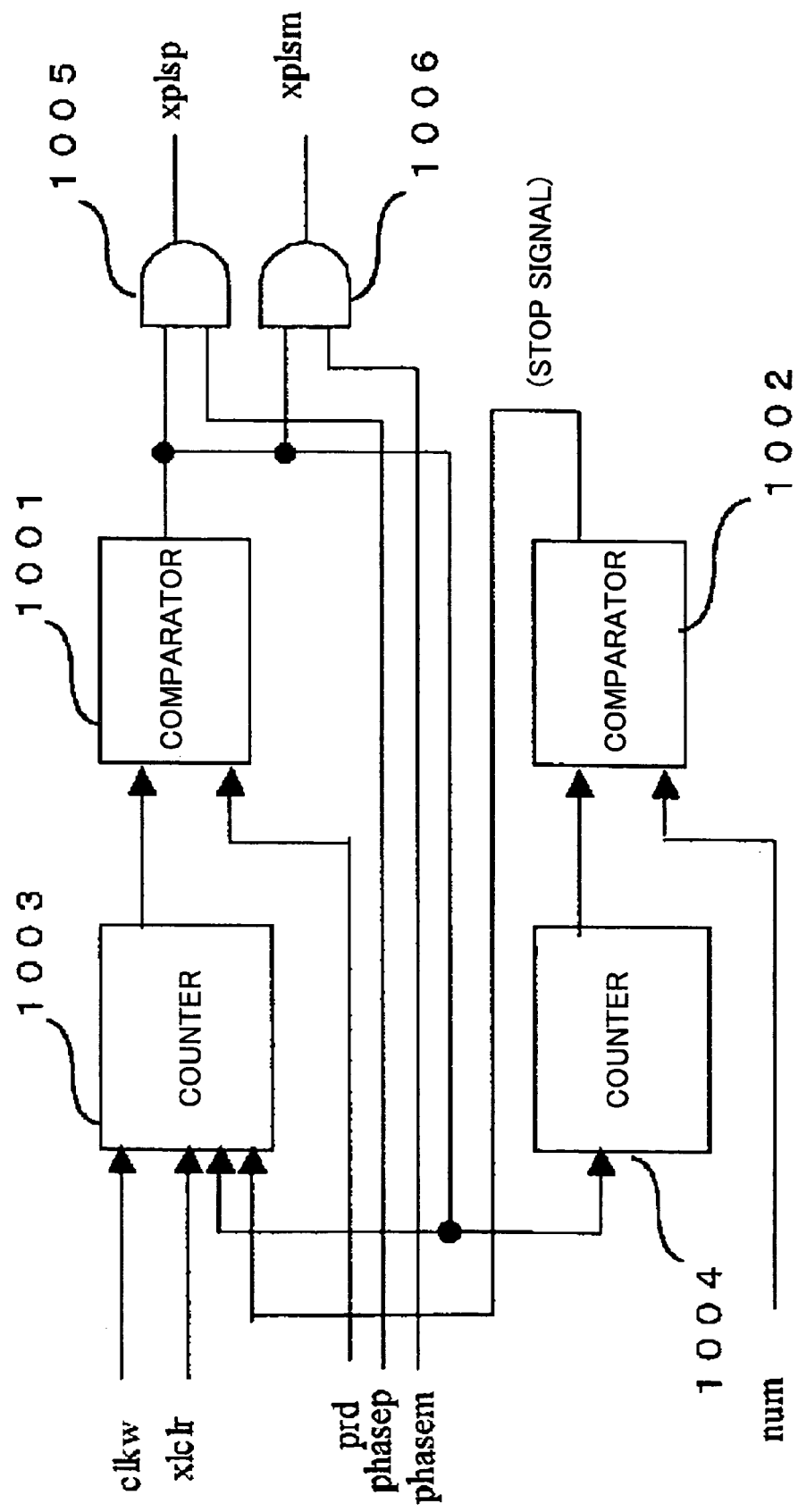
FIG. 3 is a block diagram of a conventional pulse generating circuit.
Figure 4:
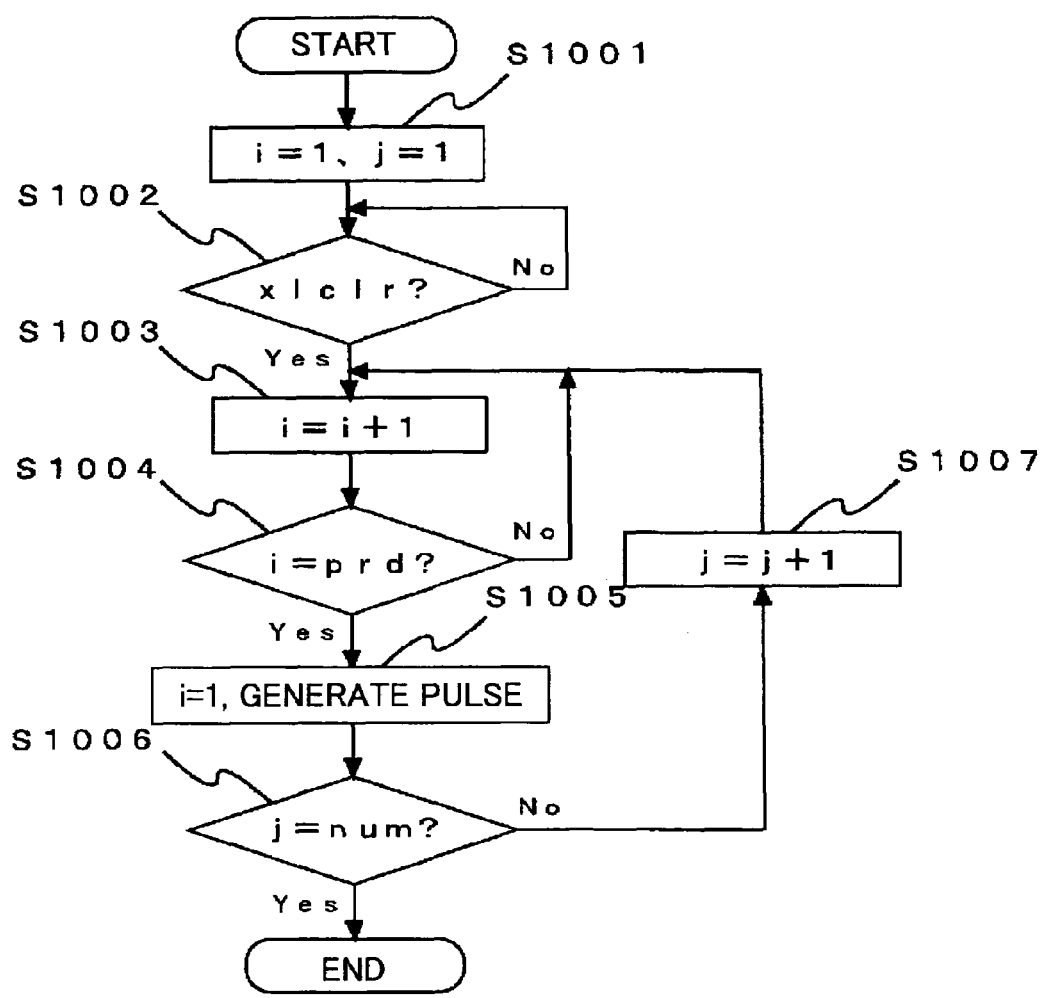
FIG. 4 is a flowchart of an operation of the pulse generating circuit shown in FIG. 3.
Figure 5:
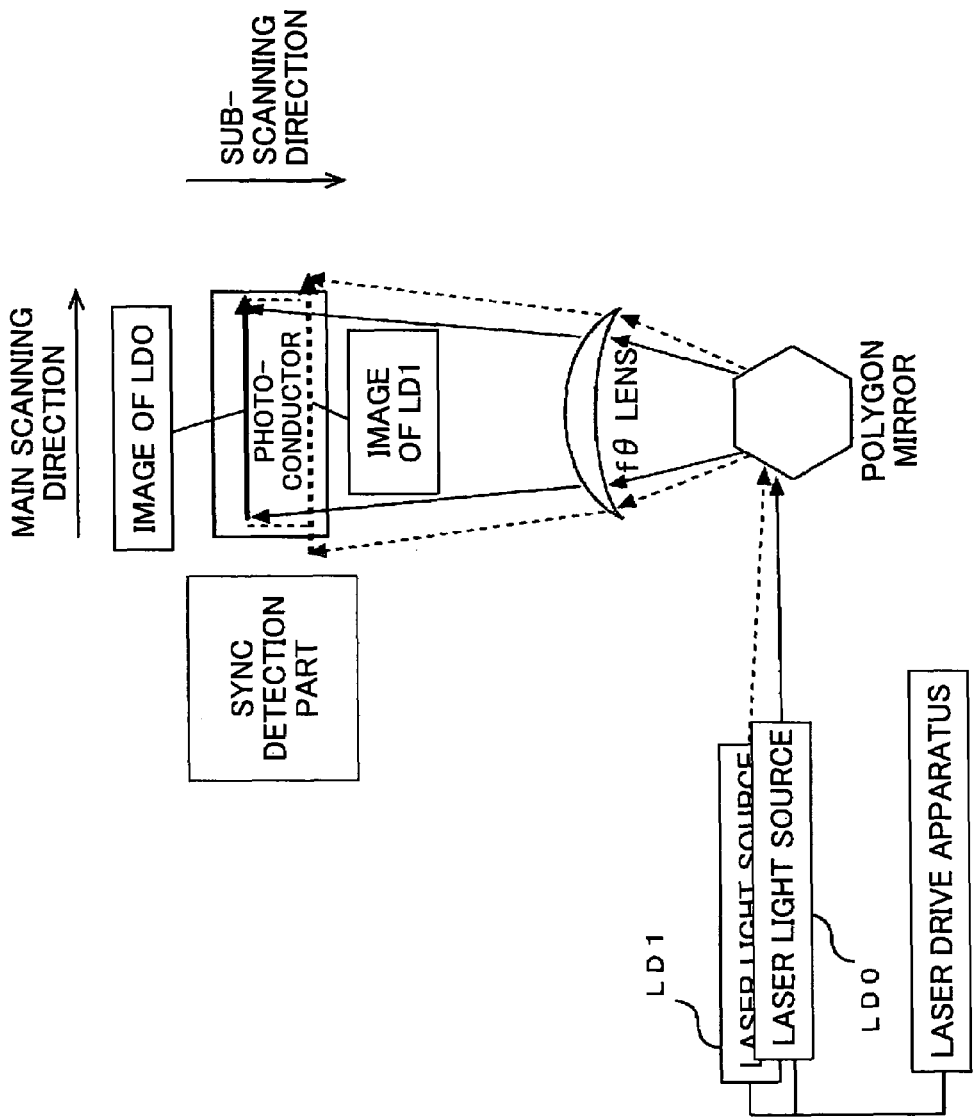
FIG. 5 is an illustration for explaining an image forming operation performed by a conventional image forming apparatus using the multi-beam method.

Each of the circuit groups 403-1, 403-2, ..., 403-(L-1), and 403-L is constituted parts that same as that shown in FIG. 5 (that is, the pulse train generating unit 21a or 21b), and performs an operation the same as the above-mentioned pulse generating operation explained with reference to FIG. 6. However, the clear signal xclr0 is replaced by the area signal. Accordingly, for example, the first area signal ara01 is input to the circuit group 403-1 instead of the clear signal xclr0, and the second area signal ara02 is input to the circuit group 403-2 instead of the clear signal xclr0. Moreover, the arbitrary pulse generation interval (setting value) prd1, prd2, ..., prdL-1, prdL and pulse number (setting value) num1, num2, ..., numL-1, and numL are set to the circuit groups 403-1, 403-2, ..., 403-(L-1), and 403-L, respectively. When the OR circuit 404 receives the external pulse train xpls0 from any one of the circuit groups 403-1, 403-2, ..., 403-(L-1), and 403-L, the OR circuit 404 outputs the external pulse train xpls0 without change.

Figure 31:
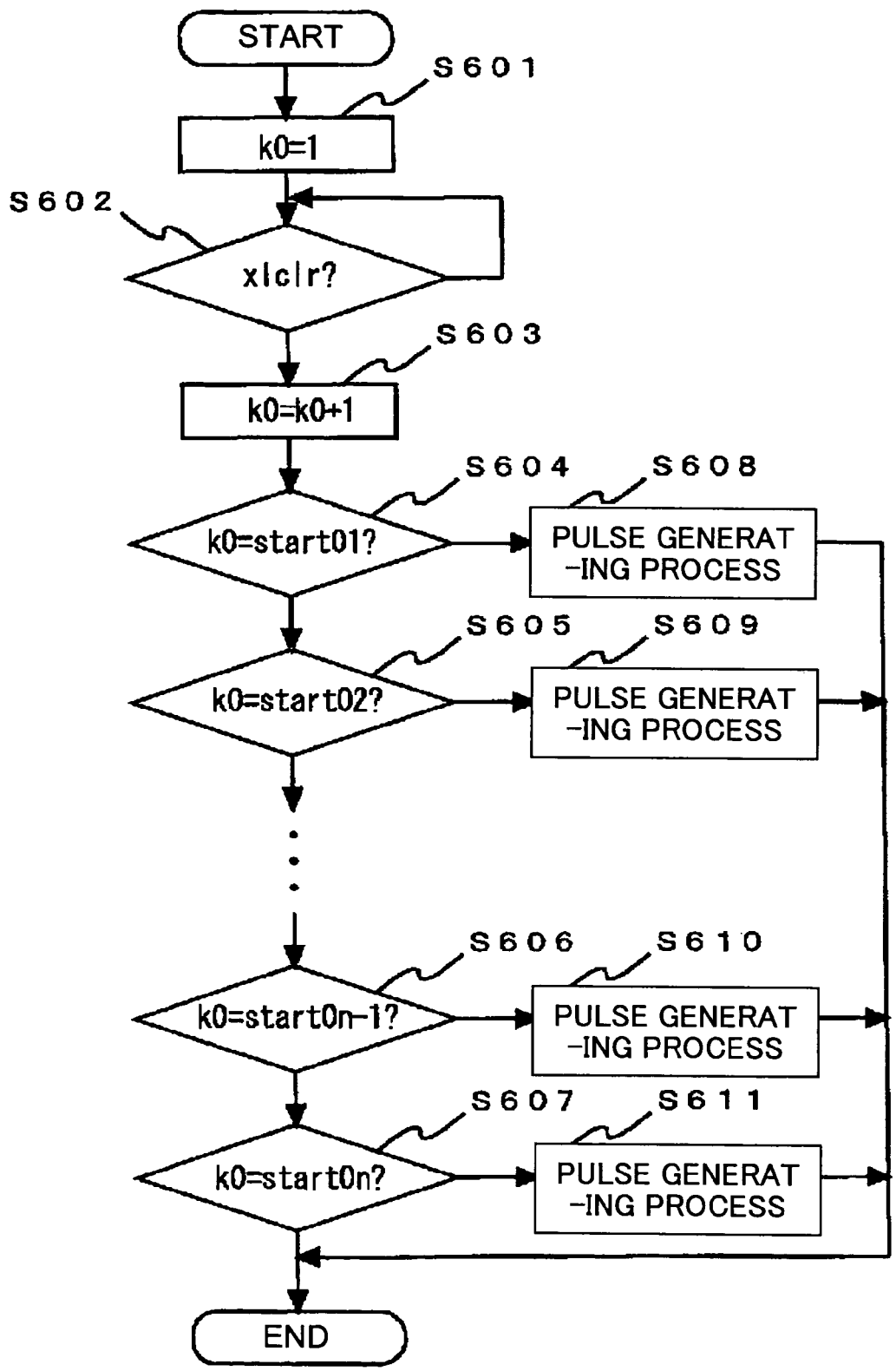
FIG. 31 is a flowchart of an operation of generating pulses performed by the pulse generating unit according to the sixth embodiment of the present invention.

A description will now be given, with reference to FIG. 31, of an operation of the pulse train generating unit 21a haven the above-mentioned structure. FIG. 31 is a flowchart of a pulse generating operation performed by the pulse generating unit 21a according to the sixth embodiment of the present invention. When a power is turned on, in the pulse train generating unit 21a, the counter 401 resets the count value k0 to "1" (step S601). Thereafter, upon reception of the clear signal xlclr0 (Yes of step S602), the counter 401 counts up or increments (+1) each time the pixel clock clkw0 is input (step S603). Then, each time the count value k0 reaches the start point values (start01, start02, and ..., start0L-1, and start0L) of the divided periods (steps S604-S607), the respective comparators 402-1, 402-2, ..., 402-(L-1), and 402-L output the respective first to Lth area signals (area01, area02, ..., area0L-1, area0L) (steps S608-S611).

Each of the circuit groups 403-1, 403-2, . . . , 403-(L−1), and 403-L performs an operation the same as the above-mentioned pulse generating operation of the pulse train generating unit 21a (steps S608-S611).

In this case, since the count value k0 of the counter 401 first reaches the start point value start1 of the first divided period, the comparator 402-1 outputs the area signal area01 at that time. Then, the circuit group 403-1 performs the operation the same as the above-mentioned pulse generating operation by using the parts (refer to FIG. 5) including the internal counters 103 and 104 so as to generate the external pulse train xpls0 corresponding to the first divided period and output the external pulse train xpls0 to the OR-circuit 404. The external pulse train xpls0 is output via the OR-circuit 404.

Then, since the count value k0 of the counter 401 reaches the start point value start02 of the second divided period, the comparator 402-2 outputs the area signal area02 at that time. Then, the circuit group 403-2 performs an operation the same as the above-mentioned pulse generating operation using each part containing the internal counters 103 and 104 so as to generate the external pulse train xpls0 corresponding to the second divided period and output the generated external pulse train xpls0 to the OR circuit 404. The external pulse train xpls0 is also output through via the OR-circuit 404.

Figure 32:
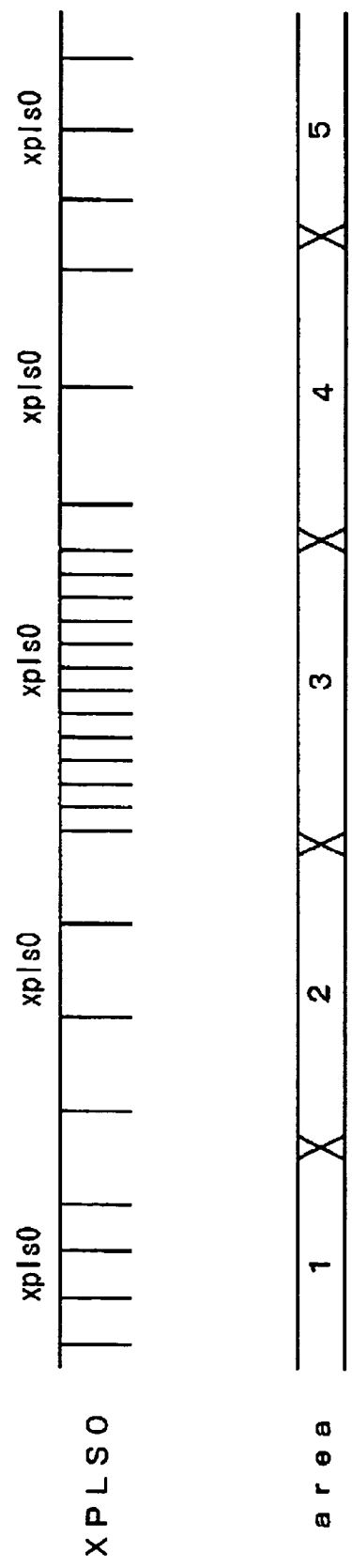
FIG. 32 is an illustration showing a pulse train an containing external pulse train in the sixth embodiment.

Thereafter, operations the same as the above-mentioned operation are performed until the Lth divided period is reached, and, finally, the external pulse train xpls0 corresponding to the Lth divided period is generated by the circuit group 403-L and is output via the OR circuit 404. In this way, the external pulse train (the last external pulse train) XPLS0 finally output from the OR circuit 404 turns into a pulse train containing the external pulse train xpls0 consisting of an arbitrary number of pulses in each divided period (area) as shown in FIG. 32.

Similarly, in the pulse train generating unit 21b, the start point values (the first to Lth start point values) of the divided periods (the first to Lth divided periods) are set beforehand to the comparators 412-1, 412-2, . . . , 412-(L−1), and 412-L, respectively. Then, the count value k1 of the counter 411 is compared with the start point values, and when the count value reaches the start point values, the area signals (the first to Lth area signals) are output, respectively. The start point values of the divided periods are set by the start signals (the first to Lth start signals) input by the CPU 30 to the comparators 412-1, 412-2, . . . , 412-(L−1) and 412-L, respectively. Similarly, a process of generating the external pulse train xpls1 the same as that of the pulse generating unit 21a is performed in the pulse train generating unit 21b.

Although the image forming apparatus according to the present embodiment uses two laser light sources LD0 and LD1 to perform a scanning operation, U laser light sources (U is an integer greater than two) may be used to perform a scanning operation. In this case, the laser light source driver, the pulse train generating unit and the clock generating unit are provided for each laser light source, and a main-scanning line of each laser light source is divided into a plurality of sections (areas) and a setting value is set to each of the divided areas so as to change the phase of the pixel clock of each laser light source.

Additionally, although the image forming apparatus according to the present embodiment is achieved by adding the function (structure) of changing a phase of a pixel clock of each laser light source to the image forming apparatus according to the first embodiment by dividing the main-scanning line of the laser beam of each laser light source and setting the setting value for each divided area, such a function (structure) may be added to the image forming apparatus according to the second through fifth embodiments.

As mentioned above, the pulse train generating units 21a and 21b are capable of performing the phase change (phase setting) of the pixel clock clkw0 by using the final external pulse train XPLS0 containing the external pulse train xpls0 generated for each of the first to Lth divided periods by dividing one scan period by the polygon mirror 13 into the plurality of sections (first to Lth divided areas). Therefore, the image forming apparatus according to the present embodiment is capable of performing the write magnification locally with respect to the pixel clocks clkw0 and clkw1 by using the respective external pulse trains xpls0 and xpls1 corresponding to each divided period. Thus, an image design of a real size can be performed and the image quality can be improved.

Seventh Embodiment

Figure 33:
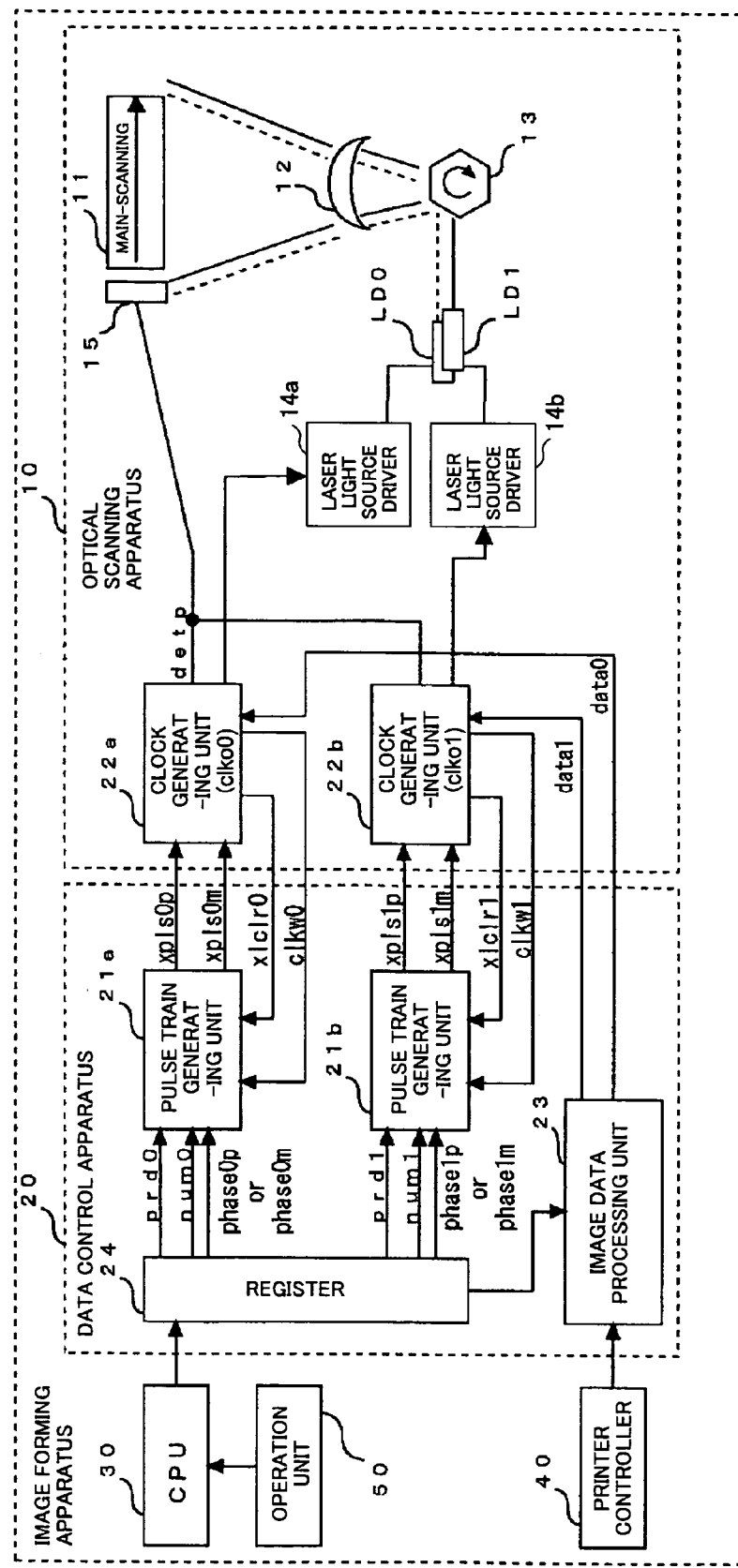
FIG. 33 is a block diagram of an image forming apparatus according to a seventh embodiment of the present invention.

A description will now be given, with reference to FIG. 33, of a structure of an image forming apparatus according to a seventh embodiment of the present invention. FIG. 33 is a block diagram of the image forming apparatus according to the seventh embodiment of the present invention. It should be noted that the structure and operation of the image forming apparatus according to the present embodiment are the same as that of the image forming apparatus according to the first embodiment except for the parts specifically described below.

As shown in FIG. 33, the image forming apparatus comprises an optical scanning apparatus 10, a data control apparatus 20, a CPU 30, a printer controller 40, and an operation unit 50. It should be noted that the structure of the image forming apparatus shown in FIG. 33 is simplified, and the image forming apparatus may have structural parts other than the parts shown in FIG. 33.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14a and 14b, a synchronization detection unit 15 as synchronization detection means, clock generating units 22a and 22b serving as pixel clock generation means, and laser light sources LD0 and LD1.

The data control apparatus 20 outputs an image signal for controlling the laser light source drivers 14a and 14b so as to control a laser beam write operation performed by the optical scanning apparatus 10. The data control apparatus 20 comprises pulse train generating units 21a and 21b serving as phase control means, an image data processing unit 23, a register 24, and shift generating units 26a and 26b.

The CPU 30 serves as scan time comparison means and setting value computation means.

Eighth Embodiment

Figure 34:
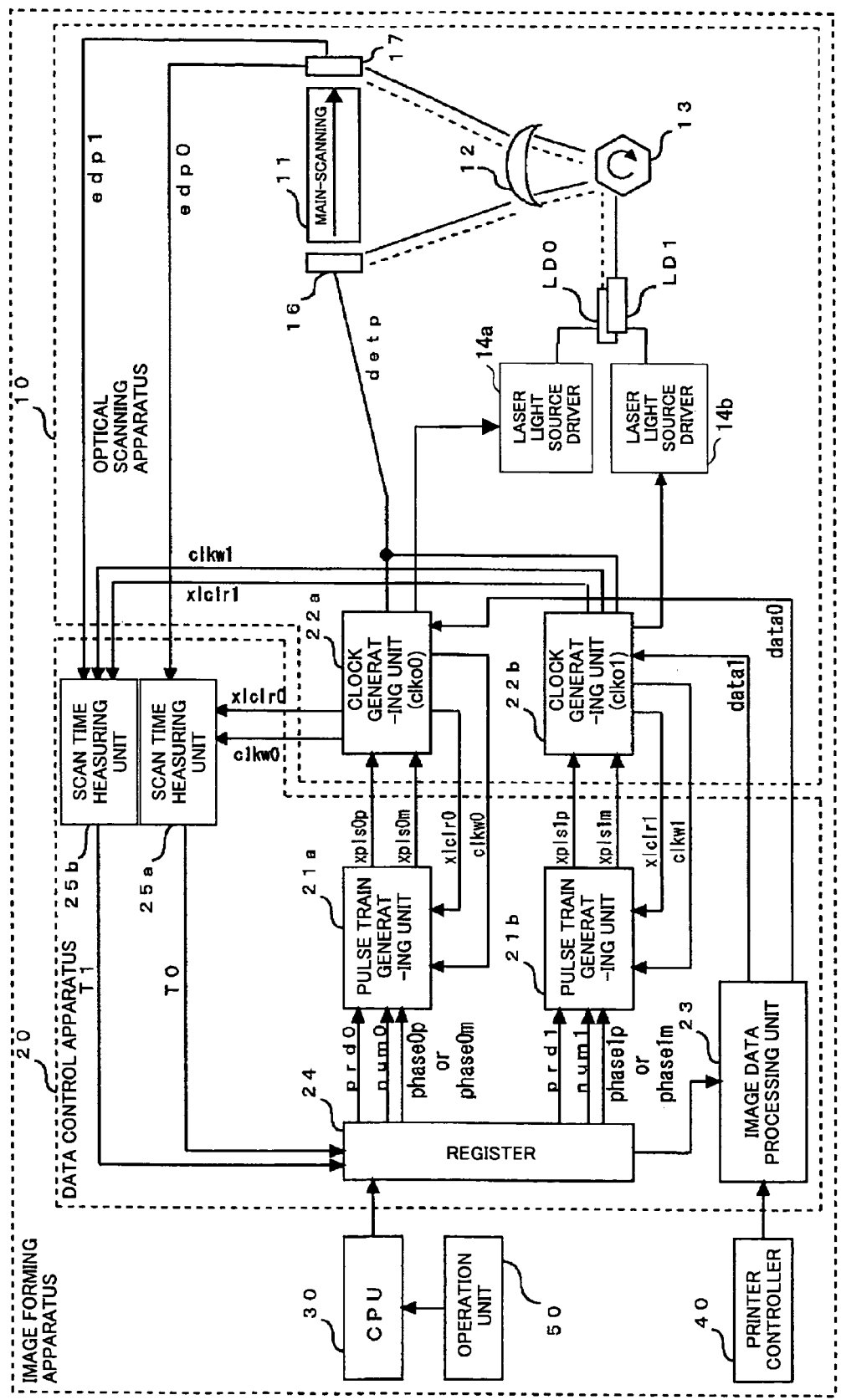
FIG. 34 is a block diagram of an image forming apparatus according to an eighth embodiment of the present invention.

A description will now be given, with reference to FIG. 34, of a structure of an image forming apparatus according to an eighth embodiment of the present invention. FIG. 34 is a block diagram of the image forming apparatus according to the eighth embodiment of the present invention. It should be noted that the structure and operation of the image forming apparatus according to the present embodiment are the same as that of the image forming apparatus according to the second embodiment except for the parts specifically described below.

As shown in FIG. 34, the image forming apparatus comprises an optical scanning apparatus 10, a data control apparatus 20, a CPU 30, a printer controller 40, and an operation unit 50. It should be noted that the structure of the image forming apparatus shown in FIG. 34 is simplified, and the image forming apparatus may have structural parts other than the parts shown in FIG. 34.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14a and 14b, a synchronization detection unit 15 serving as synchronization detection means, a front-end synchronization detection unit 16 and a rear-end synchronization detection unit 17 both serving as synchronization detection means, clock generating units 22a and 22b serving as pixel clock generation means, and laser light sources LD0 and LD1.

The data control apparatus 20 outputs an image signal for controlling the laser light source drivers 14a and 14b so as to control a laser beam write operation performed by the optical scanning apparatus 10. The data control apparatus 20 comprises pulse train generating units 21a and 21b serving as phase control means, an image data processing unit 23, a register 24, and scan time measuring units 25a and 25b serving as scan time measuring means.

The CPU 30 serves as scan time comparison means and setting value computation means.

Ninth Embodiment

Figure 35:
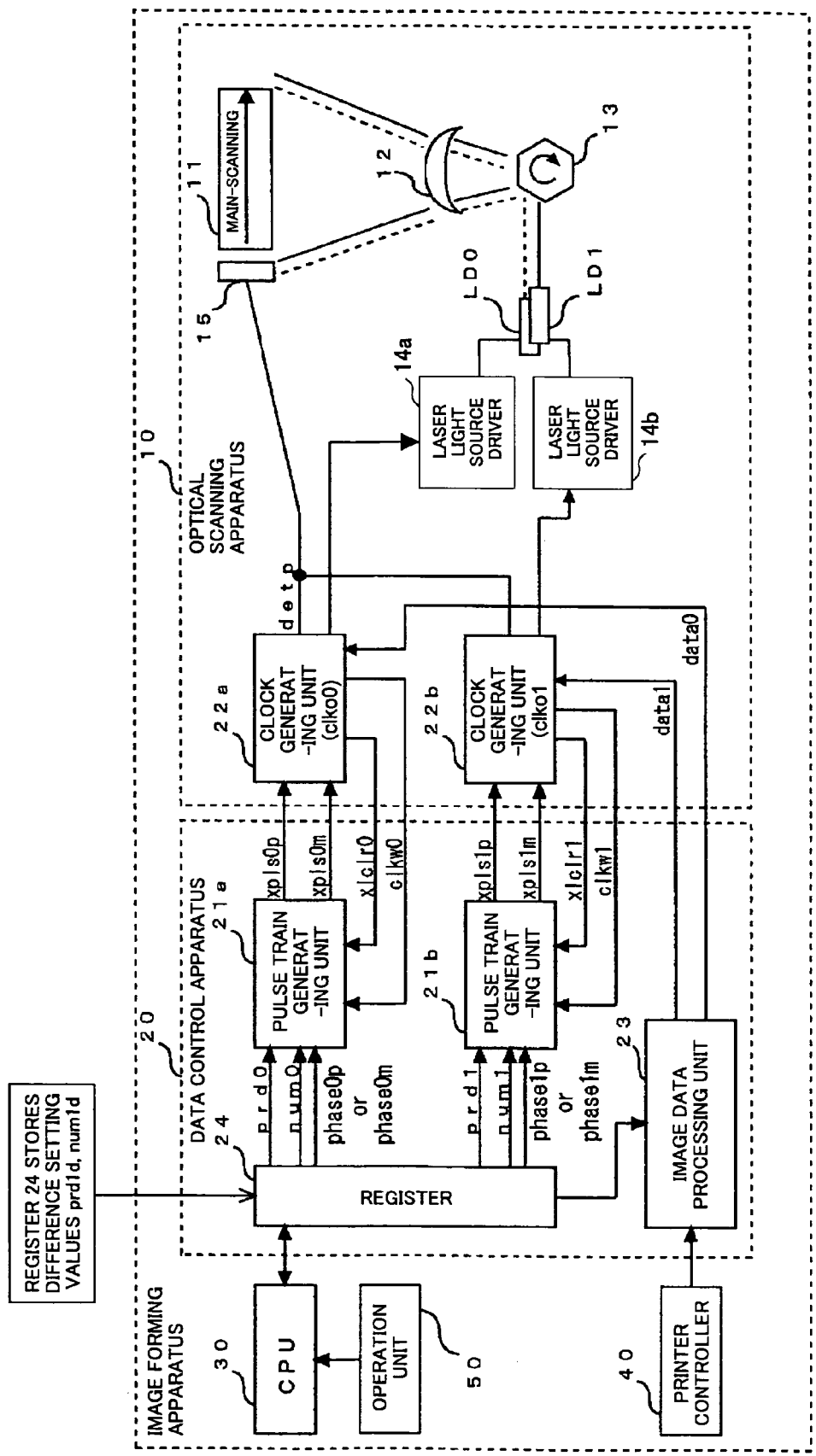
FIG. 35 is a block diagram of an image forming apparatus according to a ninth embodiment of the present invention.

A description will now be given, with reference to FIG. 35, of a structure of an image forming apparatus according to a ninth embodiment of the present invention. FIG. 35 is a block diagram of the image forming apparatus according to the ninth embodiment of the present invention. It should be noted that the structure and operation of the image forming apparatus according to the present embodiment are the same as that of the image forming apparatus according to the third embodiment except for the parts specifically described below.

As shown in FIG. 35, the image forming apparatus comprises an optical scanning apparatus 10, a data control apparatus 2Q, a CPU 30, a printer controller 40, and an operation unit 50. It should be noted that the structure of the image forming apparatus shown in FIG. 35 is simplified, and the image forming apparatus may have structural parts other than the parts shown in FIG. 35.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14a and 14b, a synchronization detection unit 15 as synchronization detection means, clock generating units 22a and 22b serving as pixel clock generation means, and laser light sources LD0 and LD1.

The data control apparatus 20 outputs an image signal for controlling the laser light source drivers 14a and 14b so as to control a laser beam write operation performed by the optical scanning apparatus 10. The data control apparatus 20 comprises pulse train generating units 21a and 21b serving as phase control means, an image data processing unit 23, and a register 24.

The CPU 30 serves as scan time comparison means and setting value computation means.

Tenth Embodiment

Figure 36:
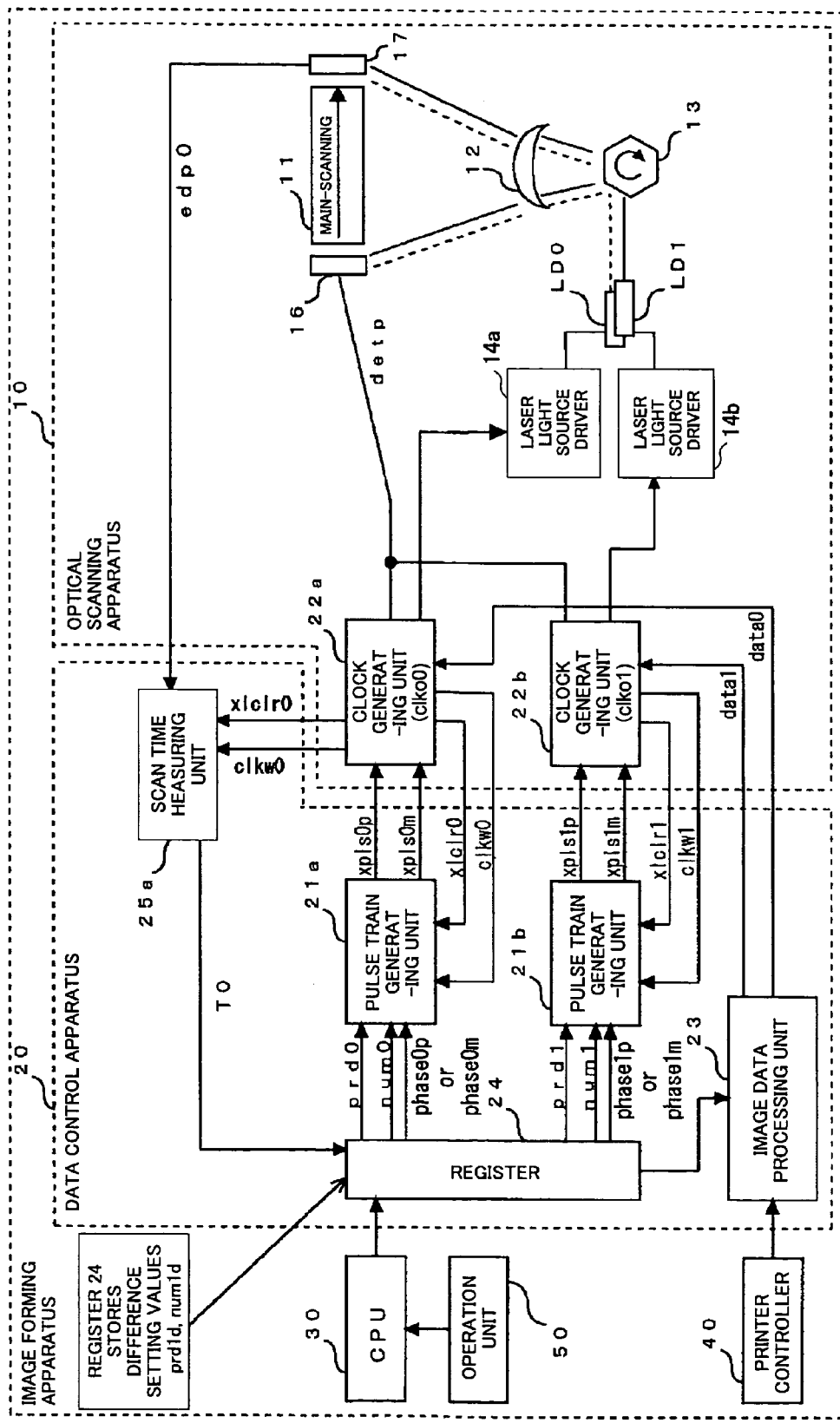
FIG. 36 is a block diagram of an image forming apparatus according to a tenth embodiment of the present invention.

A description will now be given, with reference to FIG. 36, of a structure of an image forming apparatus according to a tenth embodiment of the present invention. FIG. 36 is a block diagram of the image forming apparatus according to the tenth embodiment of the present invention. It should be noted that the structure and operation of the image forming apparatus according to the present embodiment are the same as that of the image forming apparatus according to the fourth embodiment except for the parts specifically described below.

As shown in FIG. 36, the image forming apparatus comprises an optical scanning apparatus 10, a data control apparatus 20, a CPU 30, a printer controller 40, and an operation unit 50. It should be noted that the structure of the image forming apparatus shown in FIG. 36 is simplified, and the image forming apparatus may have structural parts other than the parts shown in FIG. 36.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14a and 14b, a front-end synchronization detection unit 16 and a rear-end synchronization detection unit 17 both serving as synchronization detection means, clock generating units 22a and 22b serving as pixel clock generation means, and laser light sources LD0 and LD1.

The data control apparatus 20 outputs an image signal for controlling the laser light source drivers 14a and 14b so as to control a laser beam write operation performed by the optical scanning apparatus 10. The data control apparatus 20 comprises pulse train generating units 21a and 21b serving as phase control means, an image data processing unit 23, a register 24, and a scan time measuring unit 25a serving as scan time measuring means.

The CPU 30 serves as scan time comparison means and setting value computation means.

Eleventh Embodiment

Figure 37:
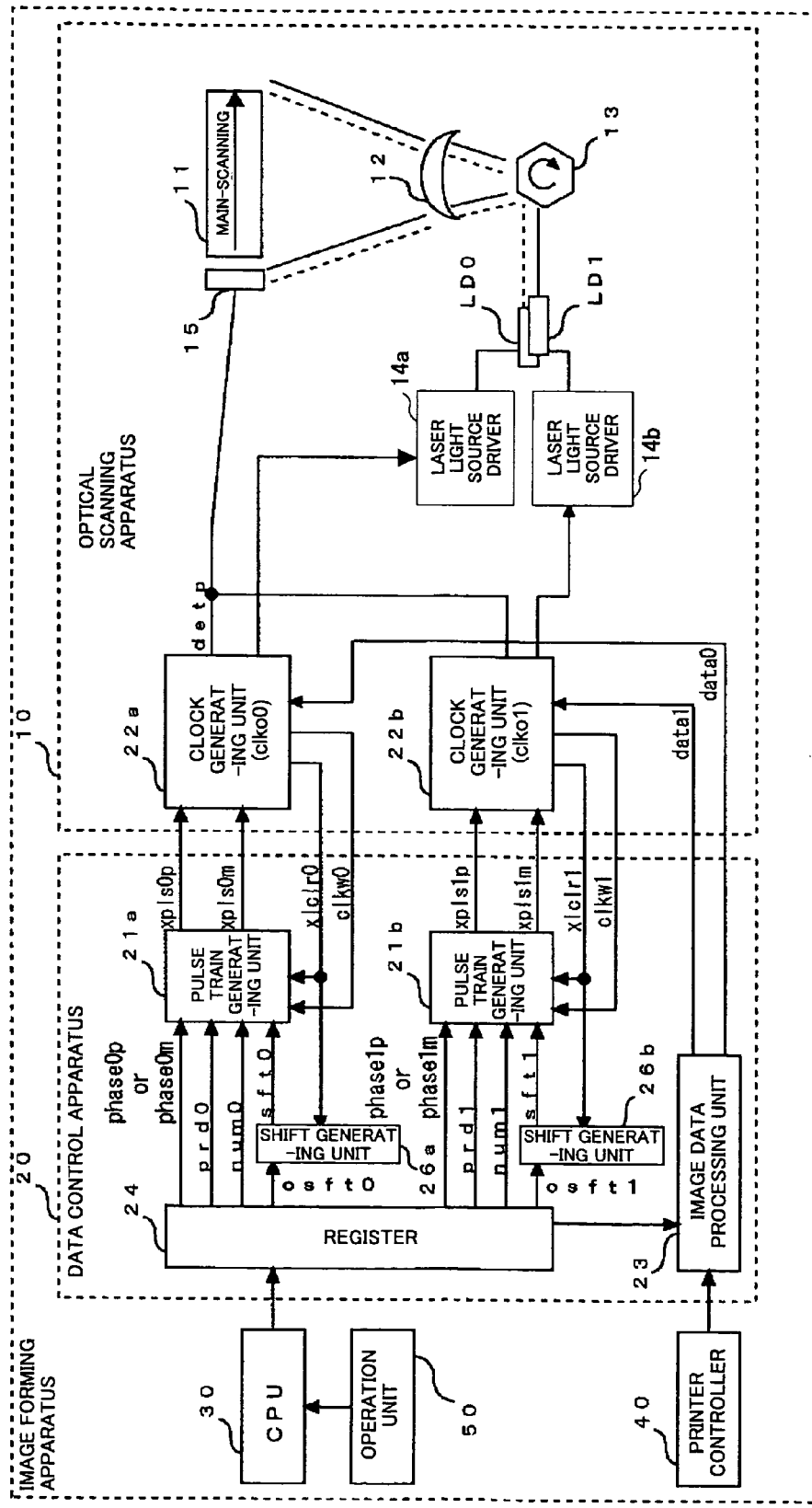
FIG. 37 is a block diagram of an image forming apparatus according to an eleventh embodiment of the present invention.

A description will now be given, with reference to FIG. 37, of a structure of an image forming apparatus according to an eleventh embodiment of the present invention. FIG. 37 is a block diagram of the image forming apparatus according to the eleventh embodiment of the present invention. It should be noted that the structure and operation of the image forming apparatus according to the present embodiment are the same as that of the image forming apparatus according to the fifth embodiment except for the parts specifically described below.

As shown in FIG. 37, the image forming apparatus comprises an optical scanning apparatus 10, a data control apparatus 20, a CPU 30, a printer controller 40, and an operation unit 50. It should be noted that the structure of the image forming apparatus shown in FIG. 37 is simplified, and the image forming apparatus may have structural parts other than the parts shown in FIG. 37.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14a and 14b, a synchronization detection unit 15 as synchronization detection means, clock generating units 22a and 22b serving as pixel clock generation means, and laser light sources LD0 and LD1.

The data control apparatus 20 outputs an image signal for controlling the laser light source drivers 14a and 14b so as to control a laser beam write operation performed by the optical scanning apparatus 10. The data control apparatus 20 comprises pulse train generating units 21a and 21b serving as phase control means, an image data processing unit 23, a register 24, and shift generating units 26a and 26b.

The CPU 30 serves as scan time comparison means and setting value computation means.

Twelfth Embodiment

Figure 38:
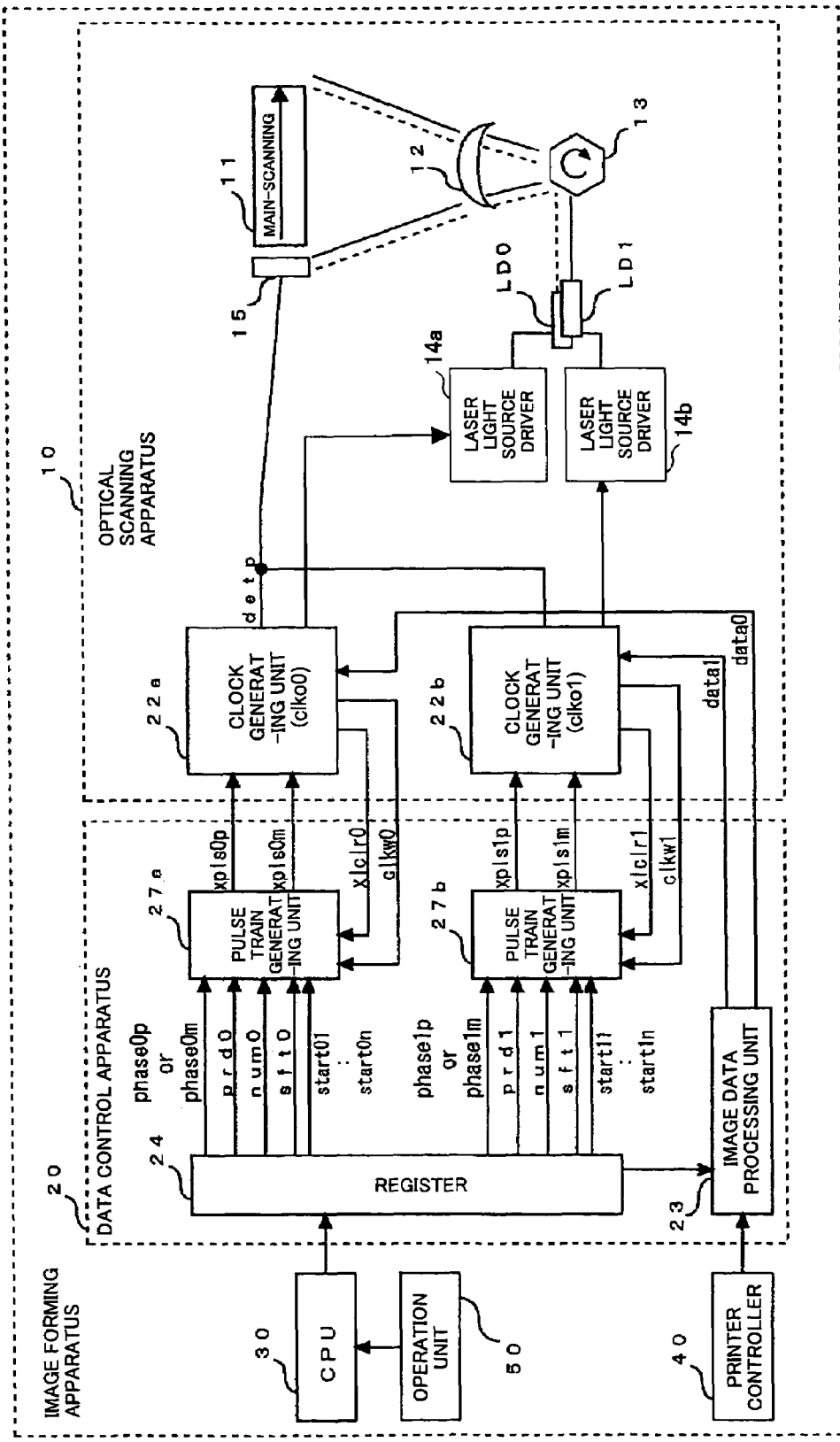
FIG. 38 is a block diagram of an image forming apparatus according to a twelfth embodiment of the present invention.

A description will now be given, with reference to FIG. 38, of a structure of an image forming apparatus according to a twelfth embodiment of the present invention. FIG. 38 is a block diagram of the image forming apparatus according to the twelfth embodiment of the present invention. It should be noted that the structure and operation of the image forming apparatus according to the present embodiment are the same as that of the image forming apparatus according to the sixth embodiment except for the parts specifically described below.

As shown in FIG. 38, the image forming apparatus comprises an optical scanning apparatus 10, a data control apparatus 20, a CPU 30, a printer controller 40, and an operation unit 50. It should be noted that the structure of the image forming apparatus shown in FIG. 38 is simplified, and the image forming apparatus may have structural parts other than the parts shown in FIG. 38.

The optical scanning apparatus 10 uses laser beams to form an image, and comprises a photoconductor 11 serving as a medium to be scanned, an fθ lens 12, a polygon mirror 13 serving as rotational deflection means, laser light source drivers 14a and 14b, a synchronization detection unit 15 as synchronization detection means, clock generating units 22a and 22b serving as pixel clock generation means, and laser light sources LD0 and LD1.

The data control apparatus 20 outputs an image signal for controlling the laser light source drivers 14a and 14b so as to control a laser beam write operation performed by the optical scanning apparatus 10. The data control apparatus 20 comprises pulse train generating units 21a and 21b serving as phase control means, an image data processing unit 23, and a register 24.

The CPU 30 serves as scan time comparison means and setting value computation means.

(Differences Between the First Through Sixth Embodiments and the Seventh to Twelfth Embodiments)

A description will now be given of differences between first through sixth embodiments and the seventh to twelfth embodiments. In the first through sixth embodiments, the clock generating units 22a and 22b are provided in the data control apparatus 20. On the other hand, the clock generating units 22a and 22b in the seventh through twelfth embodiments are provided in the optical scanning equipment 10.

In the first through sixth embodiments, the clock generating unit 22a outputs the pixel clock clkw0 and the clear signal xlclr0 to the pulse train generating section 21a and the image data processing section 23. On the other hand, the clock generating unit 22a in the seventh through twelfth embodiments output the pixel clock clkw0 and the clear signal xlclr0 to the pulse train generating unit 21a.

In the first through sixth embodiments, the clock generating unit 22b outputs the pixel clock clkw1 and the clear signal xlclr1 to the pulse train generating unit 21b and the image data processing unit 23. On the other hand, the clock generating section 22b in the seventh through twelfth embodiment output the pixel clock clkw1 and the clear signal xlclr1 to the pulse train generating unit 21b.

In the first through sixth embodiments, the image data processing unit 23 outputs the image signals input from the printer controller 40 to the laser light source drivers 14a and 14b in synchronization with the pixel clocks clkw0 and clkw1 from the clock generating units 22a and 22b. On the other hand, in the seventh through twelfth embodiments, the image data processing unit 23 outputs the image signals data0 and data1 input from the printer controller 40 to the clock generating units 22a and 22b, respectively. The clock generating unit 22a outputs the input image signal data0 to the laser light source driver 14a in synchronization with the generated pixel clock clkw0. The laser light source driver 14a outputs a drive control signal for controlling ON/OFF of luminescence to the laser light source LD0 according to the contents of data of the picture signal data0 according to the input timing of the image signal data0 based on the pixel clock clkw0 after phase change. Additionally, the clock generating unit 22b outputs the input image signal data1 to the laser light source driver 14b in synchronization with the generated pixel clock clkw1. Laser light source driver 14b outputs a drive control signal for controlling ON/OFF of luminescence to the laser light source LD1 according to the contents of data of the image signal data1 according to the input timing of the image signal data1 based on the pixel clock clkw1 after phase change.

As mentioned above, in the image forming apparatuses of the first through twelfth embodiments provided with two or more laser light sources, the laser light sources may write latent images of the toner images in the same color or write latent images in different colors such as yellow, magenta, cyan and black.

Moreover, the image forming apparatuses performs: a process of data writing; a process of data reading; a process of computing a number of pulses to be increased or decreased in accordance with a time period from a time when one synchronization detection means detects a laser beam to a time when another synchronization detection means detects the laser beam; a process of computing setting values of the laser light sources by adding the difference setting values to the setting values of one of the laser light sources that are input or computed; and a process of determining whether or not the measured values of the laser light sources are supplied. Although the above-mentioned processes are performed by a computer program (CPU 30) installed in the image forming apparatus, such a program may be recorded on a recording medium such as an optical recording medium, a magnetic recording medium, a magneto-optical recording medium or a semiconductor, and loaded to the image forming apparatus from the recording medium, or such a program may be downloaded to the image forming apparatus from an external apparatus which is connected to the image forming apparatus through a network such as a local area network or the Internet.

The present invention is not limited to the specifically disclosed embodiments, and variations and modifications may be made without departing from the scope of the present invention.

The present application is based on Japanese priority application No. 2003-54717 filed Feb. 28, 2003, the entire contents of which are hereby incorporated by reference.

What is claimed is:

1. An image forming apparatus that forms an electrostatic latent image on a medium to be scanned by laser beams, which are projected from a plurality of laser light sources and periodically deflected by a rotational deflecting unit, so that the laser beams scan the medium, which is uniformly charged and moving in a sub-scanning direction, in a main-scanning direction perpendicular to the sub-scanning direction, the image forming apparatus comprising:

a pixel clock generating unit that generates first and second pixel clocks, which are used for controlling timings of projection of said laser beams, separately for each of said laser light sources, and for performing a phase change of each of said first and second pixel clocks; and a phase control unit that controls said first and second pixel clocks such that a respective rising period of said first and second pixels clocks is set shorter or longer than a normal clock period a predetermined interval after detection of a respective synchronization detection signal, said phase control unit controlling said first pixel clock independent of said second pixel clock and controlling said second pixel clock independent of said first pixel clock.

2. The image forming apparatus as claimed in claim 1, wherein said phase control unit generates control pulse signals for controlling the phase change of the first and second pixel clocks generated by said pixel clock generation unit, respectively, and outputs the control pulse signals to said pixel clock generation unit, and said pixel clock generating unit performs the phase change of said first and second pixel clocks when said control pulse signals are supplied thereto.

3. The image forming apparatus as claimed in claim 2, further comprising an operation unit that inputs setting values, which indicate an interval and a number of pulses of said control pulse signals for each of said laser light sources, wherein said phase control unit generates said control pulse signals of said first and second pixel clocks, respectively, based on the setting values input by said operation unit, and outputs said control pulse signals to said pixel clock generating unit.

4. The image forming apparatus as claimed in claim 2, further comprising:
an operation unit that inputs setting values, which indicate an interval and a number of pulses of said control pulse signals for performing the phase change on one of said laser light sources; and
a setting value computing units that computes setting values for other laser light sources other than said one of the laser light sources by adding values, which is previously specified for each of said other laser light sources, to the setting values for said one of the laser light sources input by said operation unit,
wherein said phase control unit generates and outputs the control pulse signals corresponding to the respective laser light sources based on the setting values input by said operation means and the setting values computed by said setting value computing unit.

5. The image forming apparatus as claimed in claim 3, further comprising a synchronization detection unit that detects the laser beams from said laser light sources at a position outside an image formation area where the electrostatic latent image is formed on said medium to be scanned in the main-scanning direction and for outputting a synchronization detection signals, which specify scan start positions of said laser beams in the main-scanning direction, respectively,
wherein said pixel clock generating unit generates said pixel clocks in synchronization with said synchronization detection signals.

6. The image forming apparatus as claimed in claim 2, further comprising:
a synchronization detection unit that detects the laser beams from said laser light sources at positions outside an image formation area where the electrostatic latent image is formed on said medium to be scanned in the main-scanning direction, said synchronization detection unit including a first synchronization detection unit and a second synchronization detection unit located opposite to the first synchronization detection unit with respect to said image formation area;
a scan time measuring unit that measures a scan time after said first synchronization detection unit detects the laser beam until said second synchronization detection unit detects the laser beam on an individual laser light source basis; and
a scan time comparison unit that compares the scan time of each of the laser light sources measured by said scan time measuring unit with a value indicating a reference of the scan time so as to compute setting values based on a result of the comparison, the setting values indicating an interval and a number of pulses of each of the control pulse signals,
wherein said phase control unit generates and outputs the control pulse signals corresponding to the respective laser light sources base on the setting values computed by said scan time comparison unit.

7. The image forming apparatus as claimed in claim 6, wherein said scan time comparison unit computes a number of pulses to be increased or decreased with respect to each of said control pulse signals by multiplying a value, which is obtained by subtracting said reference of the scan time from the measured scan time, by a period of a respective one of said pixel clocks and dividing the multiplied value by a time unit of the phase change.

8. The image forming apparatus as claimed in claim 6, wherein said synchronization detection unit detects the laser beams from said laser light sources, respectively, at a position outside an image formation area where the electrostatic latent image is formed on said medium to be scanned in the main-scanning direction so as to output synchronization detection signals, which specify scan start positions of the respective laser beams in the main-scanning direction, and said pixel clock generating unit generates said pixel clocks in synchronization with said synchronization detection signals.

9. The image forming apparatus as claimed in claim 2, further comprising:
a synchronization detection unit that detects the laser beams from said laser light sources at positions outside an image formation area where the electrostatic latent image is formed on said medium to be scanned in the main-scanning direction, said synchronization detection unit including a first synchronization detection unit and a second synchronization detection unit located opposite to the first synchronization detection unit with respect to said image formation area;
a scan time measuring unit that measures a scan time after said first synchronization detection unit detects the laser beam until said second synchronization detection unit detects the laser beam on an individual laser light source basis; and
a scan time comparison unit that compares the scan time of each of the laser light sources measured by said scan time measuring unit with a value indicating a reference of the scan time so as to compute setting values for said one of said laser light sources based on a result of the comparison, the setting values indicating an interval and a number of pulses of the control pulse signal of said one of said laser light sources; and
a setting value computing unit that computes each of said setting values of said other laser light sources by adding setting values, which is previously specified for each of said other laser light sources, to the setting values for said one of said laser light sources,
wherein said phase control unit outputs the control pulse signals corresponding to said other laser light sources base on the setting values computed by said setting value computing unit.

10. The image forming apparatus as claimed in claim 9, wherein said scan time comparison unit computes a number of pulses to be increased or decreased with respect to each of said control pulse signals by multiplying a value, which is obtained by subtracting said reference of the scan time from the measured scan time, by a period of a respective one of said pixel clocks and dividing the multiplied value by a time unit of the phase change.

11. The image forming apparatus as claimed in claim 9, wherein said synchronization detection unit detects the laser beams from said laser light sources, respectively, at a position outside an image formation area where the electrostatic latent image is formed on said medium to be scanned in the main-scanning direction so as to output synchronization detection signals, which specify scan start positions of the respective laser beams in the main-scanning direction, and said pixel clock generating unit generates said pixel clocks in synchronization with said synchronization detection signals.

12. The image forming apparatus as claimed in claim 1, wherein said phase control unit controls a phase of each of said pixel clocks so that the phase is changed by a time unit shorter than a period of each of said pixel clocks.

13. The image forming apparatus as claimed in claim 1, wherein said phase control unit varies an output timing of said control pulse signals for each scan period.

14. The image forming apparatus as claimed in claim 13, wherein said phase control unit varies the output timing of said control pulse signals by a fixed unit time each time when one scan period has passed.

15. The image forming apparatus as claimed in claim 14, wherein said phase control unit varies the output timing of said control pulse signals based on said unit time that is obtained as a product of a value, which is obtained by subtracting a product of the interval of pulses and the number of pulses of each of said control signal pulses from the scan period, and a product of a fractional number having a numerator of a positive integer and a denominator of a positive integer, and wherein the output timing of said control pulse signals after change matches the output timing before change for the number of the denominator.

16. The image forming apparatus as claimed in claim 1, wherein said phase control unit varies a phase of each of said pixel clocks for each divided period obtained by dividing one scan period of each of said laser light sources.

17. An image forming apparatus that forms an electrostatic latent image on a medium to be scanned by laser beams, which are projected from a plurality of laser light sources and periodically deflected by a rotational deflecting unit, so that the laser beams scan the medium, which is uniformly charged and moving in a sub-scanning direction, in a main-scanning direction perpendicular to the sub-scanning direction, the image forming apparatus comprising:

a pixel clock generating unit that generates first and second pixel clocks for performing independently a modulation control of each of said laser light sources, and changes independently a phase of each of said first and second pixel clocks of said laser light sources based on control pulse signals supplied thereto from a phase control unit that controls said first and second pixel clocks such that a respective rising period of said first and second pixels clocks is set shorter or longer than a normal clock period a predetermined interval after detection of a respective synchronization detection signal, said phase control unit controlling said first pixel clock independent of said second pixel clock and controlling said second pixel clock independent of said first pixel clock.

18. The image forming apparatus as claimed in claim 17, further comprising a synchronization detection unit that detects the laser beams from said laser light sources at a position outside an image formation area where the electrostatic latent image is formed on said medium to be scanned in the main-scanning direction and for outputting a synchronization detection signals, which specify scan start positions of said laser beams in the main-scanning direction, respectively, wherein said pixel clock generating unit generates said first and second pixel clocks in synchronization with said synchronization detection signals.

19. An optical scanning apparatus as claimed in claim 18, wherein said synchronization detection unit detects said laser beams at two positions outside said image formation area in the main-scanning direction, and outputs said synchronization detection signals for measuring a scan time spent on scanning between said two positions.

20. The image forming apparatus as claimed in claim 17, wherein said pixel clock generating unit controls a phase of each of said first and second pixel clocks so that the phase is changed by a time unit shorter than a period of each of said first and second pixel clocks.

21. The image forming apparatus as claimed in claim 17, wherein said pixel clock generating unit varies an output timing of said control pulse signals for each scan period.

22. The image forming apparatus as claimed in claim 21, wherein said pixel clock generating unit varies the output timing of said control pulse signals by a fixed unit time each time when one scan period has passed.

23. The image forming apparatus as claimed in claim 17, wherein said pixel clock generating unit varies the output timing of said control pulse signals based on said unit time that is obtained as a product of a value, which is obtained by subtracting a product of the interval of pulses and the number of pulses of each of said control signal pulses from the scan period, and a product of a fractional number having a numerator of a positive integer and a denominator of a positive integer, and wherein the output timing of said control pulse signals after change matches the output timing before change for the number of the denominator.

24. An image forming method that forms an electrostatic latent image on a medium to be scanned by laser beams, which are projected from a plurality of laser light sources and periodically deflected in a rotational deflecting process, so that the laser beams scan the medium, which is uniformly charged and moving in a sub-scanning direction, in a main-scanning direction perpendicular to the sub-scanning direction, the image forming apparatus comprising:

a pixel clock generation step of generating first and second pixel clocks, which are used for controlling timings of projection of said laser beams, separately for each of said laser light sources;

a phase control step of controlling a phase control of first pixel clock independent of said second pixel clock and controlling a phase control said second pixel clock independent of said first pixel clock such that a respective rising period of said first and second pixels clocks is set shorter or longer than a normal clock period a predetermined interval after detection of a respective synchronization detection signal; and a phase change step of performing the phase change of each of said first and second pixel clocks in accordance with the phase control step.

25. The image forming method as claimed in claim 24, wherein said phase control step generates control pulse signals for controlling the phase change of the first and second pixel clocks generated in said pixel clock generation step, respectively, and outputs the control pulse signals to said pixel clock generation step, and said pixel clock generation step performs the phase change of said first and second pixel clocks when said control pulse signals are supplied thereto.

26. The image forming method as claimed in claim 25, further comprising an input step of inputting setting values, which indicate an interval and a number of pulses of said control pulse signals for each of said laser light sources, wherein said phase control step generates said control pulse signals of said first and second pixel clocks, respectively, based on the setting values input in said input step, and outputs said control pulse signals to said pixel clock generation step.

27. The image forming method as claimed in claim 26, further comprising a synchronization detection step of detecting the laser beams from said laser light sources at a position outside an image formation area where the electrostatic latent image is formed on said medium to be scanned in the main-scanning direction and outputting a synchronization detection signals, which specify scan start positions of said laser beams in the main-scanning direction, respectively, wherein said pixel clock generation step generates said first and second pixel clocks in synchronization with said synchronization detection signals.

28. The image forming method as claimed in claim 25, further comprising:

an input step of inputting setting values, which indicate an interval and a number of pulses of said control pulse signals for performing the phase change on one of said laser light sources; and a setting value computation step of computing setting values for other laser light sources other than said one of the laser light sources by adding values, which is previously specified for each of said other laser light sources, to the setting values for said one of the laser light sources input in said input step, wherein said phase control step generates and outputs the control pulse signals corresponding to the respective laser light sources based on the setting values input in said input step and the setting values computed in said setting value computation step.

29. The image forming method as claimed in claim 28, further comprising a synchronization detection step of detecting the laser beams from said laser light sources at a position outside an image formation area where the electrostatic latent image is formed on said medium to be scanned in the main-scanning direction and outputting a synchronization detection signals, which specify scan start positions of said laser beams in the main-scanning direction, respectively, wherein said pixel clock generation step generates said pixel clocks in synchronization with said synchronization detection signals.

30. The image forming method as claimed in claim 25, further comprising:

a first synchronization detection step of detecting the laser beams from said laser light sources at a first position outside an image formation area where the electrostatic latent image is formed on said medium to be scanned in the main-scanning direction;

a second synchronization detection step of detecting the laser beams from said laser light sources at a second position outside said image formation area;

a scan time measuring step of measuring a scan time after the laser beam is detected in said first synchronization detection step and until the laser beam is detected in said second synchronization detection step on an individual laser light source basis; and a scan time comparison step of comparing the scan time of each of the laser light sources measured by said scan time measuring means with a value indicating a reference of the scan time so as to compute setting values based on a result of the comparison, the setting values indicating an interval and a number of pulses of each of the control pulse signals, wherein said phase control step generates and outputs the control pulse signals corresponding to the respective laser light sources base on the setting values computed in said scan time comparison step.

31. The image forming method as claimed in claim 30, wherein said scan time comparison step computes a number of pulses to be increased or decreased with respect to each of said control pulse signals by multiplying a value, which is obtained by subtracting said reference of the scan time from the measured scan time, by a period of a respective one of said pixel clocks and dividing the multiplied value by a time unit of the phase change.

32. Then image forming method as claimed in claim 30, wherein said first synchronization detection step detects the laser beams from said laser light sources, respectively, at said first position so as to output synchronization detection signals, which specify scan start positions of the respective laser beams in the main-scanning direction, and said pixel clock generation step generates said pixel clocks in synchronization with said synchronization detection signals.

33. The image forming method as claimed in claim 25, further comprising:

a first synchronization detection step of detecting the laser beams from said laser light sources at a first position outside an image formation area where the electrostatic latent image is formed on said medium to be scanned in the main-scanning direction;

a second synchronization detection step of detecting the laser beams from said laser light sources at a second position outside said image formation area;

a scan time measuring step of measuring a scan time after the laser beam is detected in said first synchronization detection step and until the laser beam is detected in said second synchronization detection step on an individual laser light source basis;

a scan time comparison step of comparing the scan time of each of the laser light sources measured in said scan time measuring step with a value indicating a reference of the scan time so as to compute setting values for said one of said laser light sources based on a result of the comparison, the setting values indicating an interval and a number of pulses of the control pulse signal of said one of said laser light sources; and a setting value computation step of computing each of said setting values of said other laser light sources by adding setting values, which is previously specified for each of said other laser light sources, to the setting values for said one of said laser light sources, wherein said phase control step outputs the control pulse signals corresponding to said other laser light sources base on the setting values computed in said setting value computation step.

34. The image forming method as claimed in claim 33, wherein said scan time comparison step computes a number of pulses to be increased or decreased with respect to each of said control pulse signals by multiplying a value, which is obtained by subtracting said reference of the scan time from the measured scan time, by a period of a respective one of said pixel clocks and dividing the multiplied value by a time unit of the phase change.

35. The image forming method as claimed in claim 33, wherein said scan time comparison step computes a number of pulses to be increased or decreased with respect to each of said control pulse signals by multiplying a value, which is obtained by subtracting said reference of the scan time from the measured scan time, by a period of a respective one of said pixel clocks and dividing the multiplied value by a time unit of the phase change.

36. The image forming method as claimed in claim 24, wherein said phase control step controls a phase of each of said first and second pixel clocks so that the phase is changed by a time unit shorter than a period of each of said first and second pixel clocks.

37. The image forming method as claimed in claim 24, wherein said phase control step varies an output timing of said control pulse signals for each scan period.

38. The image forming method as claimed in claim 37, wherein said phase control step varies the output timing of said control pulse signals by a fixed unit time each time when one scan period has passed.

39. The image forming method as claimed in claim 38, wherein said phase control step varies the output timing of said control pulse signals based on said unit time that is obtained as a product of a value, which is obtained by subtracting a product of the interval of pulses and the number of pulses of each of said control signal pulses from the scan period, and a product of a fractional number having a numerator of a positive integer and a denominator of a positive integer, and wherein the output timing of said control pulse signals after change matches the output timing before change for the number of the denominator.

40. The image forming method as claimed in claim 24, wherein said phase change step varies a phase of each of said pixel clocks for each divided period obtained by dividing one scan period of each of said laser light sources.

41. An image forming apparatus that forms an electrostatic latent image on a medium to be scanned by laser beams, which are projected from a plurality of laser light sources and periodically deflected by a rotational deflecting unit, so that the laser beams scan the medium, which is uniformly charged and moving in a sub-scanning direction, in a main-scanning direction perpendicular to the sub-scanning direction, the image forming apparatus comprising:
pixel clock generation means for generating first and second pixel clocks, which are used for controlling timings of projection of said laser beams, separately for each of said laser light sources, and for performing a phase change of each of said first and second pixel clocks; and
phase control means for controlling said first and second pixel clocks such that a respective rising period of said first and second pixels clocks is set shorter or longer than a normal clock period a predetermined interval after detection of a respective synchronization detection signal, said phase control means controlling said first pixel clock independent of said second pixel clock and controls said second pixel clock independent of said first pixel clock.

42. The image forming apparatus as claimed in claim 41, wherein said phase control means generates control pulse signals for controlling the phase change of the first and second pixel clocks generated by said pixel clock generation means, respectively, and outputs the control pulse signals to said pixel clock generation means, and said pixel clock generation means performs the phase change of said first and second pixel clocks when said control pulse signals are supplied thereto.

43. The image forming apparatus as claimed in claim 42, further comprising input means for inputting setting values, which indicate an interval and a number of pulses of said control pulse signals for each of said laser light sources, wherein said phase control means generates said control pulse signals of said first and second pixel clocks, respectively, based on the setting values input by said input means, and outputs said control pulse signals to said pixel clock generation means.

44. The image forming apparatus as claimed in claim 42, further comprising:
input means for inputting setting values, which indicate an interval and a number of pulses of said control pulse signals for performing the phase change on one of said laser light sources; and
setting value computation means for computing setting values for other laser light sources other than said one of the laser light sources by adding values, which is previously specified for each of said other laser light sources, to the setting values for said one of the laser light sources input by said input means,
wherein said phase control means generates and outputs the control pulse signals corresponding to the respective laser light sources based on the setting values input by said input means and the setting values computed by said setting value computation means.

45. The image forming apparatus as claimed in claim 43, further comprising synchronization detection means for detecting the laser beams from said laser light sources at a position outside an image formation area where the electrostatic latent image is formed on said medium to be scanned in the main-scanning direction and for outputting a synchronization detection signals, which specify scan start positions of said laser beams in the main-scanning direction, respectively,
wherein said pixel clock generation means generates said pixel clocks in synchronization with said synchronization detection signals.

46. The image forming apparatus as claimed in claim 42, further comprising:
synchronization detection means for detecting the laser beams from said laser light sources at positions outside an image formation area where the electrostatic latent image is formed on said medium to be scanned in the main-scanning direction, said synchronization detection means including a first synchronization detection unit and a second synchronization detection unit located opposite to the first synchronization detection unit with respect to said image formation area;
scan time measuring means for measuring a scan time after said first synchronization detection unit detects the laser beam until said second synchronization detection unit detects the laser beam on an individual laser light source basis; and
scan time comparison means for comparing the scan time of each of the laser light sources measured by said scan time measuring means with a value indicating a reference of the scan time so as to compute setting values based on a result of the comparison, the setting values indicating an interval and a number of pulses of each of the control pulse signals,
wherein said phase control means generates and outputs the control pulse signals corresponding to the respective laser light sources base on the setting values computed by said scan time comparison means.

47. The image forming apparatus as claimed in claim 46, wherein said scan time comparison means computes a number of pulses to be increased or decreased with respect to each of said control pulse signals by multiplying a value, which is obtained by subtracting said reference of the scan time from the measured scan time, by a period of a respective one of said pixel clocks and dividing the multiplied value by a time unit of the phase change.

48. The image forming apparatus as claimed in claim 46, wherein said synchronization detection means detects the laser beams from said laser light sources, respectively, at a position outside an image formation area where the electrostatic latent image is formed on said medium to be scanned in the main-scanning direction so as to output synchronization detection signals, which specify scan start positions of the respective laser beams in the main-scanning direction, and said pixel clock generation means generates said pixel clocks in synchronization with said synchronization detection signals.

49. The image forming apparatus as claimed in claim 42, further comprising:

synchronization detection means for detecting the laser beams from said laser light sources at positions outside an image formation area where the electrostatic latent image is formed on said medium to be scanned in the main-scanning direction, said synchronization detection means including a first synchronization detection unit and a second synchronization detection unit located opposite to the first synchronization detection unit with respect to said image formation area;

scan time measuring means for measuring a scan time after said first synchronization detection unit detects the laser beam until said second synchronization detection unit detects the laser beam on an individual laser light source basis; and scan time comparison means for comparing the scan time of each of the laser light sources measured by said scan time measuring unit with a value indicating a reference of the scan time so as to compute setting values for said one of said laser light sources based on a result of the comparison, the setting values indicating an interval and a number of pulses of the control pulse signal of said one of said laser light sources; and setting value computation means for computing each of said setting values of said other laser light sources by adding setting values, which is previously specified for each of said other laser light sources, to the setting values for said one of said laser light sources, wherein said phase control means outputs the control pulse signals corresponding to said other laser light sources base on the setting values computed by said setting value computation means.

50. The image forming apparatus as claimed in claim 49, wherein said scan time comparison means computes a number of pulses to be increased or decreased with respect to each of said control pulse signals by multiplying a value, which is obtained by subtracting said reference of the scan time from the measured scan time, by a period of a respective one of said pixel clocks and dividing the multiplied value by a time unit of the phase change.

51. The image forming apparatus as claimed in claim 49, wherein said synchronization detection means detects the laser beams from said laser light sources, respectively, at a position outside an image formation area where the electrostatic latent image is formed on said medium to be scanned in the main-scanning direction so as to output synchronization detection signals, which specify scan start positions of the respective laser beams in the main-scanning direction, and said pixel clock generation means generates said pixel clocks in synchronization with said synchronization detection signals.

52. The image forming apparatus as claimed in claim 41, wherein said phase control means controls a phase of each of said pixel clocks so that the phase is changed by a time unit shorter than a period of each of said pixel clocks.

53. The image forming apparatus as claimed in claim 41, wherein said phase control means varies an output timing of said control pulse signals for each scan period.

54. The image forming apparatus as claimed in claim 53, wherein said phase control means varies the output timing of said control pulse signals by a fixed unit time each time when one scan period has passed.

55. The image forming apparatus as claimed in claim 54, wherein said phase control means varies the output timing of said control pulse signals based on said unit time that is obtained as a product of a value, which is obtained by subtracting a product of the interval of pulses and the number of pulses of each of said control signal pulses from the scan period, and a product of a fractional number having a numerator of a positive integer and a denominator of a positive integer, and wherein the output timing of said control pulse signals after change matches the output timing before change for the number of the denominator.

56. The image forming apparatus as claimed in claim 51, wherein said phase change means varies a phase of each of said pixel clocks for each divided period obtained by dividing one scan period of each of said laser light sources.

* * * * *